US009542775B2

(12) United States Patent
Hunt et al.

(10) Patent No.: US 9,542,775 B2
(45) Date of Patent: Jan. 10, 2017

(54) VOLUME DIMENSIONING SYSTEMS AND METHODS

(75) Inventors: Jeffrey Mark Hunt, Kirkland, WA (US); Edward J. Jennings, Seattle, WA (US); Nancy Wojack, Lynnwood, WA (US); Scott Xavier Houle, Seattle, WA (US)

(73) Assignee: Intermec IP Corp., Everett, WA (US)

( * ) Notice: Subject to any disclaimer, the term of this patent is extended or adjusted under 35 U.S.C. 154(b) by 802 days.

(21) Appl. No.: 13/464,799

(22) Filed: May 4, 2012

(65) Prior Publication Data
US 2013/0293539 A1  Nov. 7, 2013

(51) Int. Cl.
*G06T 17/20* (2006.01)
*G01B 11/00* (2006.01)

(52) U.S. Cl.
CPC ............... *G06T 17/20* (2013.01); *G01B 11/00* (2013.01)

(58) Field of Classification Search
None
See application file for complete search history.

(56) References Cited

U.S. PATENT DOCUMENTS

| 3,971,065 A | 7/1976 | Bayer |
| 4,398,811 A | 8/1983 | Nishioka et al. |
| 4,495,559 A * | 1/1985 | Gelatt, Jr. ............ G06F 17/5072 700/28 |
| 4,730,190 A | 3/1988 | Win et al. |
| 4,803,639 A | 2/1989 | Steele et al. |
| 5,220,536 A | 6/1993 | Stringer et al. |
| 5,331,118 A | 7/1994 | Jensen |
| 5,359,185 A | 10/1994 | Hanson |
| 5,384,901 A | 1/1995 | Glassner et al. |
| 5,548,707 A | 8/1996 | LoNegro |

(Continued)

FOREIGN PATENT DOCUMENTS

| AU | 2004212587 A1 | 4/2005 |
| DE | 3335760 A1 | 4/1985 |

(Continued)

OTHER PUBLICATIONS

Tom Drummond, Roberto Cipolla, Real-Time Visual Tracking of Complex Structures, 2002, IEEE Transactions on Pattern Analysis and Machine Intelligence, 24(7):932-946.*

(Continued)

*Primary Examiner* — Michael J Cobb
(74) *Attorney, Agent, or Firm* — Additon, Higgins & Pendleton, P.A.

(57) ABSTRACT

Systems and methods for volume dimensioning packages are provided. A method of operating a volume dimensioning system may include the receipt of image data of an area at least a first three-dimensional object to be dimensioned from a first point of view as captured using at least one image sensor. The system can determine from the received image data a number of features in three dimensions of the first three-dimensional object. Based at least on part on the determined features of the first three-dimensional object, the system can fit a first three-dimensional packaging wireframe model about the first three-dimensional object. The system can display of an image of the first three-dimensional packaging wireframe model fitted about an image of the first three-dimensional object on a display device.

39 Claims, 15 Drawing Sheets

(56) References Cited

U.S. PATENT DOCUMENTS

| | | | |
|---|---|---|---|
| 5,555,090 A | 9/1996 | Schmutz | |
| 5,590,060 A | 12/1996 | Granville et al. | |
| 5,606,534 A | 2/1997 | Stringer et al. | |
| 5,619,245 A | 4/1997 | Kessler et al. | |
| 5,655,095 A | 8/1997 | LoNegro et al. | |
| 5,661,561 A | 8/1997 | Wurz et al. | |
| 5,699,161 A | 12/1997 | Woodworth | |
| 5,729,750 A | 3/1998 | Ishida | |
| 5,730,252 A | 3/1998 | Herbinet | |
| 5,734,476 A | 3/1998 | Dlugos | |
| 5,737,074 A | 4/1998 | Haga et al. | |
| 5,831,737 A | 11/1998 | Stringer et al. | |
| 5,850,370 A | 12/1998 | Stringer et al. | |
| 5,850,490 A | 12/1998 | Johnson | |
| 5,869,827 A | 2/1999 | Rando | |
| 5,870,220 A | 2/1999 | Migdal et al. | |
| 5,900,611 A | 5/1999 | Hecht | |
| 5,923,428 A | 7/1999 | Woodworth | |
| 5,929,856 A | 7/1999 | LoNegro et al. | |
| 5,969,823 A | 10/1999 | Wurz et al. | |
| 5,978,512 A | 11/1999 | Kim et al. | |
| 5,979,760 A | 11/1999 | Freyman et al. | |
| 5,988,862 A | 11/1999 | Kacyra et al. | |
| 5,991,041 A | 11/1999 | Woodworth | |
| 6,025,847 A * | 2/2000 | Marks | 345/419 |
| 6,049,386 A | 4/2000 | Stringer et al. | |
| 6,053,409 A | 4/2000 | Brobst et al. | |
| 6,064,759 A | 5/2000 | Buckley et al. | |
| 6,067,110 A | 5/2000 | Nonaka et al. | |
| 6,069,696 A | 5/2000 | McQueen et al. | |
| 6,137,577 A | 10/2000 | Woodworth | |
| 6,177,999 B1 | 1/2001 | Wurz et al. | |
| 6,236,403 B1 * | 5/2001 | Chaki | G06T 17/00 345/419 |
| 6,246,468 B1 | 6/2001 | Dimsdale | |
| 6,333,749 B1 | 12/2001 | Reinhardt et al. | |
| 6,336,587 B1 | 1/2002 | He et al. | |
| 6,369,401 B1 | 4/2002 | Lee | |
| 6,373,579 B1 | 4/2002 | Ober et al. | |
| 6,429,803 B1 | 8/2002 | Kumar | |
| 6,457,642 B1 | 10/2002 | Good et al. | |
| 6,507,406 B1 | 1/2003 | Yagi et al. | |
| 6,517,004 B2 | 2/2003 | Good et al. | |
| 6,674,904 B1 | 1/2004 | McQueen | |
| 6,705,526 B1 | 3/2004 | Zhu et al. | |
| 6,781,621 B1 | 8/2004 | Gobush et al. | |
| 6,824,058 B2 | 11/2004 | Patel et al. | |
| 6,832,725 B2 | 12/2004 | Gardiner et al. | |
| 6,858,857 B2 | 2/2005 | Pease et al. | |
| 6,971,580 B2 | 12/2005 | Zhu et al. | |
| 6,995,762 B1 | 2/2006 | Pavlidis et al. | |
| 7,085,409 B2 | 8/2006 | Sawhney et al. | |
| 7,086,162 B2 | 8/2006 | Tyroler | |
| 7,104,453 B1 | 9/2006 | Zhu et al. | |
| 7,128,266 B2 | 10/2006 | Zhu et al. | |
| 7,137,556 B1 * | 11/2006 | Bonner | B07C 3/14 235/462.01 |
| 7,159,783 B2 | 1/2007 | Walczyk et al. | |
| 7,161,688 B1 * | 1/2007 | Bonner | G01B 11/04 356/625 |
| 7,214,954 B2 | 5/2007 | Schopp | |
| 7,277,187 B2 | 10/2007 | Smith et al. | |
| 7,307,653 B2 | 12/2007 | Dutta | |
| 7,310,431 B2 | 12/2007 | Gokturk et al. | |
| 7,413,127 B2 | 8/2008 | Ehrhart et al. | |
| 7,527,205 B2 * | 5/2009 | Zhu | B82Y 15/00 235/462.14 |
| 7,586,049 B2 | 9/2009 | Wurz | |
| 7,602,404 B1 * | 10/2009 | Reinhardt et al. | 345/629 |
| 7,639,722 B1 | 12/2009 | Paxton et al. | |
| 7,726,575 B2 | 6/2010 | Wang et al. | |
| 7,780,084 B2 | 8/2010 | Zhang et al. | |
| 7,788,883 B2 | 9/2010 | Buckley et al. | |
| 7,974,025 B2 | 7/2011 | Topliss | |
| 8,027,096 B2 | 9/2011 | Feng et al. | |
| 8,028,501 B2 | 10/2011 | Buckley et al. | |
| 8,050,461 B2 | 11/2011 | Shpunt et al. | |
| 8,055,061 B2 | 11/2011 | Katano | |
| 8,102,395 B2 | 1/2012 | Kondo et al. | |
| 8,132,728 B2 | 3/2012 | Dwinell et al. | |
| 8,134,717 B2 | 3/2012 | Pangrazio et al. | |
| 8,149,224 B1 * | 4/2012 | Kuo et al. | 345/173 |
| 8,194,097 B2 * | 6/2012 | Xiao | G06K 9/00261 345/419 |
| 8,212,889 B2 | 7/2012 | Chanas et al. | |
| 8,228,510 B2 | 7/2012 | Pangrazio et al. | |
| 8,294,969 B2 | 10/2012 | Plesko | |
| 8,305,458 B2 | 11/2012 | Hara | |
| 8,310,656 B2 | 11/2012 | Zalewski | |
| 8,313,380 B2 | 11/2012 | Zalewski et al. | |
| 8,317,105 B2 | 11/2012 | Kotlarsky et al. | |
| 8,322,622 B2 | 12/2012 | Liu | |
| 8,339,462 B2 | 12/2012 | Stec et al. | |
| 8,350,959 B2 | 1/2013 | Topliss et al. | |
| 8,366,005 B2 | 2/2013 | Kotlarsky et al. | |
| 8,371,507 B2 | 2/2013 | Haggerty et al. | |
| 8,376,233 B2 | 2/2013 | Van Horn et al. | |
| 8,381,976 B2 | 2/2013 | Mohideen et al. | |
| 8,381,979 B2 | 2/2013 | Franz | |
| 8,390,909 B2 | 3/2013 | Plesko | |
| 8,408,464 B2 | 4/2013 | Zhu et al. | |
| 8,408,468 B2 | 4/2013 | Horn et al. | |
| 8,408,469 B2 | 4/2013 | Good | |
| 8,424,768 B2 | 4/2013 | Rueblinger et al. | |
| 8,437,539 B2 | 5/2013 | Komatsu et al. | |
| 8,441,749 B2 | 5/2013 | Brown et al. | |
| 8,448,863 B2 | 5/2013 | Xian et al. | |
| 8,457,013 B2 | 6/2013 | Essinger et al. | |
| 8,459,557 B2 | 6/2013 | Havens et al. | |
| 8,463,079 B2 | 6/2013 | Ackley et al. | |
| 8,469,272 B2 | 6/2013 | Kearney | |
| 8,474,712 B2 | 7/2013 | Kearney et al. | |
| 8,479,992 B2 | 7/2013 | Kotlarsky et al. | |
| 8,490,877 B2 | 7/2013 | Kearney | |
| 8,517,271 B2 | 8/2013 | Kotlarsky et al. | |
| 8,523,076 B2 | 9/2013 | Good | |
| 8,528,818 B2 | 9/2013 | Ehrhart et al. | |
| 8,544,737 B2 | 10/2013 | Gomez et al. | |
| 8,548,420 B2 | 10/2013 | Grunow et al. | |
| 8,550,335 B2 | 10/2013 | Samek et al. | |
| 8,550,354 B2 | 10/2013 | Gannon et al. | |
| 8,550,357 B2 | 10/2013 | Kearney | |
| 8,556,174 B2 | 10/2013 | Kosecki et al. | |
| 8,556,176 B2 | 10/2013 | Van Horn et al. | |
| 8,556,177 B2 | 10/2013 | Hussey et al. | |
| 8,559,767 B2 | 10/2013 | Barber et al. | |
| 8,561,895 B2 | 10/2013 | Gomez et al. | |
| 8,561,903 B2 | 10/2013 | Sauerwein | |
| 8,561,905 B2 | 10/2013 | Edmonds et al. | |
| 8,565,107 B2 | 10/2013 | Pease et al. | |
| 8,571,307 B2 | 10/2013 | Li et al. | |
| 8,576,390 B1 | 11/2013 | Nunnink | |
| 8,579,200 B2 | 11/2013 | Samek et al. | |
| 8,583,924 B2 | 11/2013 | Caballero et al. | |
| 8,584,945 B2 | 11/2013 | Wang et al. | |
| 8,587,595 B2 | 11/2013 | Wang | |
| 8,587,697 B2 | 11/2013 | Hussey et al. | |
| 8,588,869 B2 | 11/2013 | Sauerwein et al. | |
| 8,590,789 B2 | 11/2013 | Nahill et al. | |
| 8,596,539 B2 | 12/2013 | Havens et al. | |
| 8,596,542 B2 | 12/2013 | Havens et al. | |
| 8,596,543 B2 | 12/2013 | Havens et al. | |
| 8,599,271 B2 | 12/2013 | Havens et al. | |
| 8,599,957 B2 | 12/2013 | Peake et al. | |
| 8,600,158 B2 | 12/2013 | Li et al. | |
| 8,600,167 B2 | 12/2013 | Showering | |
| 8,602,309 B2 | 12/2013 | Longacre et al. | |
| 8,608,053 B2 | 12/2013 | Meier et al. | |
| 8,608,071 B2 | 12/2013 | Liu et al. | |
| 8,611,309 B2 | 12/2013 | Wang et al. | |
| 8,615,487 B2 | 12/2013 | Gomez et al. | |
| 8,621,123 B2 | 12/2013 | Caballero | |
| 8,622,303 B2 | 1/2014 | Meier et al. | |
| 8,628,013 B2 | 1/2014 | Ding | |

(56) References Cited

U.S. PATENT DOCUMENTS

| | | |
|---|---|---|
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,792,688 B2 | 7/2014 | Unsworth |
| 8,810,779 B1 | 8/2014 | Hilde |
| 8,897,596 B1 | 11/2014 | Passmore et al. |
| 9,233,470 B1 | 1/2016 | Bradski et al. |
| 9,299,013 B1 | 3/2016 | Curlander et al. |
| 2001/0027995 A1 | 10/2001 | Patel et al. |
| 2001/0032879 A1 | 10/2001 | He et al. |
| 2002/0054289 A1 | 5/2002 | Thibault et al. |
| 2002/0118874 A1 | 8/2002 | Chung et al. |
| 2002/0158873 A1 | 10/2002 | Williamson |
| 2002/0167677 A1 | 11/2002 | Okada et al. |
| 2002/0179708 A1 | 12/2002 | Zhu et al. |
| 2003/0038179 A1 | 2/2003 | Tsikos et al. |
| 2003/0053513 A1 | 3/2003 | Vatan et al. |
| 2003/0063086 A1* | 4/2003 | Baumberg ............ 345/420 |
| 2003/0091227 A1 | 5/2003 | Chang et al. |
| 2003/0156756 A1 | 8/2003 | Gokturk et al. |
| 2003/0197138 A1 | 10/2003 | Pease et al. |
| 2003/0235331 A1 | 12/2003 | Kawaike et al. |
| 2004/0008259 A1 | 1/2004 | Gokturk et al. |
| 2004/0024754 A1 | 2/2004 | Mane et al. |
| 2004/0066329 A1* | 4/2004 | Zeitfuss et al. ......... 342/357.07 |
| 2004/0118928 A1 | 6/2004 | Patel et al. |
| 2004/0122779 A1 | 6/2004 | Stickler et al. |
| 2004/0155975 A1 | 8/2004 | Hart et al. |
| 2004/0165090 A1 | 8/2004 | Ning |
| 2004/0184041 A1 | 9/2004 | Schopp |
| 2004/0211836 A1 | 10/2004 | Patel et al. |
| 2004/0233461 A1 | 11/2004 | Armstrong et al. |
| 2004/0258353 A1 | 12/2004 | Gluckstad et al. |
| 2005/0006477 A1 | 1/2005 | Patel |
| 2005/0117215 A1 | 6/2005 | Lange |
| 2005/0128196 A1 | 6/2005 | Popescu et al. |
| 2005/0211782 A1 | 9/2005 | Martin |
| 2005/0264867 A1 | 12/2005 | Cho et al. |
| 2006/0112023 A1 | 5/2006 | Horhann et al. |
| 2006/0151604 A1 | 7/2006 | Zhu et al. |
| 2006/0159307 A1 | 7/2006 | Anderson et al. |
| 2006/0159344 A1 | 7/2006 | Shao et al. |
| 2006/0232681 A1 | 10/2006 | Okada |
| 2006/0255150 A1 | 11/2006 | Longacre |
| 2006/0269165 A1 | 11/2006 | Viswanathan |
| 2007/0031064 A1 | 2/2007 | Zhao et al. |
| 2007/0063048 A1 | 3/2007 | Havens et al. |
| 2007/0127022 A1 | 6/2007 | Cohen et al. |
| 2007/0153293 A1 | 7/2007 | Gruhlke et al. |
| 2007/0171220 A1* | 7/2007 | Kriveshko ......... A61C 13/0004 345/419 |
| 2007/0181685 A1 | 8/2007 | Zhu et al. |
| 2007/0237356 A1 | 10/2007 | Dwinell et al. |
| 2007/0299338 A1 | 12/2007 | Stevick et al. |
| 2008/0013793 A1 | 1/2008 | Hillis et al. |
| 2008/0035390 A1 | 2/2008 | Wurz |
| 2008/0056536 A1 | 3/2008 | Hildreth et al. |
| 2008/0077265 A1* | 3/2008 | Boyden .................... A61F 2/06 700/98 |
| 2008/0164074 A1 | 7/2008 | Wurz |
| 2008/0185432 A1 | 8/2008 | Caballero et al. |
| 2008/0212168 A1 | 9/2008 | Olmstead et al. |
| 2008/0247635 A1 | 10/2008 | Davis et al. |
| 2008/0273191 A1 | 11/2008 | Kim et al. |
| 2008/0278790 A1 | 11/2008 | Boesser et al. |
| 2009/0059004 A1 | 3/2009 | Bochicchio |
| 2009/0134221 A1 | 5/2009 | Zhu et al. |
| 2009/0195790 A1 | 8/2009 | Zhu et al. |
| 2009/0225333 A1 | 9/2009 | Bendall et al. |
| 2009/0237411 A1* | 9/2009 | Gossweiler et al. .......... 345/473 |
| 2009/0268023 A1 | 10/2009 | Hsieh |
| 2009/0272724 A1 | 11/2009 | Gubler et al. |
| 2009/0273770 A1 | 11/2009 | Bauhahn et al. |
| 2009/0313948 A1 | 12/2009 | Buckley et al. |
| 2009/0323084 A1 | 12/2009 | Dunn et al. |
| 2010/0035637 A1* | 2/2010 | Varanasi ............ G01C 21/3682 455/457 |
| 2010/0128109 A1 | 5/2010 | Banks |
| 2010/0161170 A1* | 6/2010 | Siris .................. G06Q 10/0835 701/31.4 |
| 2010/0172567 A1 | 7/2010 | Prokoski |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0202702 A1 | 8/2010 | Benos et al. |
| 2010/0208039 A1 | 8/2010 | Stettner |
| 2010/0211355 A1 | 8/2010 | Horst et al. |
| 2010/0217678 A1 | 8/2010 | Goncalves |
| 2010/0220849 A1 | 9/2010 | Colbert et al. |
| 2010/0220894 A1 | 9/2010 | Ackley et al. |
| 2010/0245850 A1 | 9/2010 | Lee et al. |
| 2010/0254611 A1 | 10/2010 | Arnz |
| 2010/0303336 A1* | 12/2010 | Abraham ............ G01B 11/2755 382/154 |
| 2011/0040192 A1 | 2/2011 | Brenner et al. |
| 2011/0043609 A1 | 2/2011 | Choi et al. |
| 2011/0099474 A1* | 4/2011 | Grossman et al. ........... 715/709 |
| 2011/0169999 A1 | 7/2011 | Grunow et al. |
| 2011/0188054 A1 | 8/2011 | Petronius et al. |
| 2011/0188741 A1 | 8/2011 | Sones et al. |
| 2011/0202554 A1 | 8/2011 | Powilleit et al. |
| 2011/0249864 A1 | 10/2011 | Venkatesan et al. |
| 2011/0254840 A1* | 10/2011 | Halstead ................. G06T 15/04 345/421 |
| 2011/0279916 A1 | 11/2011 | Brown et al. |
| 2011/0286007 A1 | 11/2011 | Pangrazio et al. |
| 2011/0286628 A1 | 11/2011 | Goncalves et al. |
| 2011/0288818 A1* | 11/2011 | Thierman .............. G01B 11/00 702/159 |
| 2011/0301994 A1 | 12/2011 | Tieman |
| 2012/0024952 A1 | 2/2012 | Chen |
| 2012/0056982 A1 | 3/2012 | Katz et al. |
| 2012/0057345 A1 | 3/2012 | Kuchibhotla |
| 2012/0074227 A1 | 3/2012 | Ferren et al. |
| 2012/0081714 A1 | 4/2012 | Pangrazio et al. |
| 2012/0111946 A1 | 5/2012 | Golant |
| 2012/0113223 A1 | 5/2012 | Hilliges et al. |
| 2012/0138685 A1 | 6/2012 | Qu et al. |
| 2012/0140300 A1 | 6/2012 | Freeman |
| 2012/0168511 A1 | 7/2012 | Kotlarsky et al. |
| 2012/0168512 A1 | 7/2012 | Kotlarsky et al. |
| 2012/0179665 A1 | 7/2012 | Baarman et al. |
| 2012/0185094 A1 | 7/2012 | Rosenstein et al. |
| 2012/0193407 A1 | 8/2012 | Barten |

(56) References Cited

U.S. PATENT DOCUMENTS

| | | |
|---|---|---|
| 2012/0193423 A1 | 8/2012 | Samek |
| 2012/0197464 A1 | 8/2012 | Wang et al. |
| 2012/0203647 A1 | 8/2012 | Smith |
| 2012/0218436 A1 | 8/2012 | Rodriguez et al. |
| 2012/0223141 A1 | 9/2012 | Good et al. |
| 2012/0224026 A1 | 9/2012 | Bayer et al. |
| 2012/0228382 A1 | 9/2012 | Havens et al. |
| 2012/0236288 A1 | 9/2012 | Stanley |
| 2012/0242852 A1 | 9/2012 | Hayward et al. |
| 2012/0248188 A1 | 10/2012 | Kearney |
| 2012/0262558 A1 | 10/2012 | Boger et al. |
| 2012/0280908 A1 | 11/2012 | Rhoads et al. |
| 2012/0282905 A1 | 11/2012 | Owen |
| 2012/0282911 A1 | 11/2012 | Davis et al. |
| 2012/0284012 A1 | 11/2012 | Rodriguez et al. |
| 2012/0284122 A1 | 11/2012 | Brandis |
| 2012/0284339 A1 | 11/2012 | Rodriguez |
| 2012/0284593 A1 | 11/2012 | Rodriguez |
| 2012/0293610 A1 | 11/2012 | Doepke et al. |
| 2012/0294549 A1 | 11/2012 | Doepke |
| 2012/0299961 A1 | 11/2012 | Ramkumar et al. |
| 2012/0300991 A1 | 11/2012 | Free |
| 2012/0313848 A1 | 12/2012 | Galor et al. |
| 2012/0314030 A1* | 12/2012 | Datta .......... G06T 7/2046 348/44 |
| 2012/0314058 A1 | 12/2012 | Bendall et al. |
| 2012/0316820 A1 | 12/2012 | Nakazato et al. |
| 2013/0038881 A1 | 2/2013 | Pesach et al. |
| 2013/0038941 A1 | 2/2013 | Pesach et al. |
| 2013/0043312 A1 | 2/2013 | Van Horn |
| 2013/0050426 A1 | 2/2013 | Sarmast et al. |
| 2013/0056285 A1 | 3/2013 | Meagher |
| 2013/0070322 A1 | 3/2013 | Fritz et al. |
| 2013/0075168 A1 | 3/2013 | Amundsen et al. |
| 2013/0082104 A1 | 4/2013 | Kearney et al. |
| 2013/0094069 A1 | 4/2013 | Lee et al. |
| 2013/0101158 A1 | 4/2013 | Lloyd et al. |
| 2013/0175341 A1 | 7/2013 | Kearney et al. |
| 2013/0175343 A1 | 7/2013 | Good |
| 2013/0200150 A1 | 8/2013 | Reynolds et al. |
| 2013/0200158 A1 | 8/2013 | Feng et al. |
| 2013/0201288 A1 | 8/2013 | Billerbeck et al. |
| 2013/0214048 A1 | 8/2013 | Wilz |
| 2013/0256418 A1 | 10/2013 | Havens et al. |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0278425 A1 | 10/2013 | Cunningham et al. |
| 2013/0287258 A1 | 10/2013 | Kearney |
| 2013/0291998 A1* | 11/2013 | Konnerth .......... B65B 55/20 141/1 |
| 2013/0292474 A1 | 11/2013 | Xian et al. |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306730 A1 | 11/2013 | Brady et al. |
| 2013/0306731 A1 | 11/2013 | Pedraro |
| 2013/0306734 A1 | 11/2013 | Xian et al. |
| 2013/0307964 A1 | 11/2013 | Bremer et al. |
| 2013/0308013 A1 | 11/2013 | Li et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0313326 A1 | 11/2013 | Ehrhart |
| 2013/0327834 A1 | 12/2013 | Hennick et al. |
| 2013/0329012 A1 | 12/2013 | Bartos et al. |
| 2013/0341399 A1 | 12/2013 | Xian et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008430 A1 | 1/2014 | Soule et al. |
| 2014/0008439 A1 | 1/2014 | Wang |
| 2014/0021256 A1 | 1/2014 | Qu et al. |
| 2014/0021259 A1 | 1/2014 | Moed et al. |
| 2014/0025584 A1 | 1/2014 | Liu et al. |
| 2014/0027518 A1 | 1/2014 | Edmonds et al. |
| 2014/0034723 A1 | 2/2014 | Van Horn et al. |
| 2014/0034731 A1 | 2/2014 | Gao et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061305 A1 | 3/2014 | Nahill et al. |
| 2014/0061306 A1 | 3/2014 | Wu et al. |
| 2014/0061307 A1 | 3/2014 | Wang et al. |
| 2014/0063289 A1 | 3/2014 | Hussey et al. |
| 2014/0066136 A1 | 3/2014 | Sauerwein et al. |
| 2014/0067104 A1* | 3/2014 | Osterhout .......... G06Q 50/28 700/97 |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0075846 A1 | 3/2014 | Woodburn |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0084068 A1 | 3/2014 | Gillet et al. |
| 2014/0086348 A1 | 3/2014 | Peake et al. |
| 2014/0091147 A1 | 4/2014 | Evans et al. |
| 2014/0097249 A1 | 4/2014 | Gomez et al. |
| 2014/0098284 A1 | 4/2014 | Oberpriller et al. |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano |
| 2014/0104451 A1 | 4/2014 | Todeschini et al. |
| 2014/0104664 A1 | 4/2014 | Lee |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131445 A1 | 5/2014 | Ding et al. |
| 2014/0133379 A1 | 5/2014 | Wang et al. |
| 2014/0135984 A1 | 5/2014 | Hirata |
| 2014/0140585 A1 | 5/2014 | Wang |
| 2014/0151453 A1 | 6/2014 | Meier et al. |
| 2014/0152975 A1 | 6/2014 | Ko |
| 2014/0160329 A1 | 6/2014 | Ren et al. |
| 2014/0168380 A1 | 6/2014 | Heidemann et al. |
| 2014/0192187 A1 | 7/2014 | Atwell et al. |
| 2014/0192551 A1 | 7/2014 | Masaki |
| 2014/0225918 A1 | 8/2014 | Mittal et al. |
| 2014/0225985 A1 | 8/2014 | Klusza et al. |
| 2014/0247279 A1 | 9/2014 | Nicholas et al. |
| 2014/0247280 A1 | 9/2014 | Nicholas et al. |
| 2014/0267609 A1 | 9/2014 | Laffargue |
| 2014/0268093 A1 | 9/2014 | Tohme et al. |
| 2014/0270361 A1 | 9/2014 | Amma et al. |
| 2014/0313527 A1 | 10/2014 | Askan |
| 2014/0320408 A1 | 10/2014 | Zagorsek et al. |
| 2014/0347553 A1 | 11/2014 | Ovsiannikov et al. |
| 2014/0350710 A1 | 11/2014 | Gopalkrishnan et al. |
| 2015/0009301 A1 | 1/2015 | Ribnick et al. |
| 2015/0009338 A1 | 1/2015 | Laffargue et al. |

(56) References Cited

U.S. PATENT DOCUMENTS

| | | | |
|---|---|---|---|
| 2015/0036876 | A1 | 2/2015 | Marrion et al. |
| 2015/0049347 | A1 | 2/2015 | Laffargue et al. |
| 2015/0063676 | A1 | 3/2015 | Lloyd et al. |
| 2015/0149946 | A1 | 5/2015 | Benos et al. |
| 2015/0163474 | A1 | 6/2015 | You |
| 2015/0204662 | A1 | 7/2015 | Kobayashi et al. |
| 2015/0213647 | A1 | 7/2015 | Laffargue et al. |
| 2015/0269403 | A1 | 9/2015 | Lei et al. |
| 2015/0308816 | A1 | 10/2015 | Laffargue et al. |
| 2015/0355470 | A1 | 12/2015 | Herschbach |
| 2016/0063429 | A1 | 3/2016 | Varley et al. |
| 2016/0202478 | A1 | 7/2016 | Masson et al. |

FOREIGN PATENT DOCUMENTS

| | | |
|---|---|---|
| DE | 10210813 A1 | 10/2003 |
| DE | 102007037282 A1 | 3/2008 |
| EP | 1111435 A2 | 6/2001 |
| EP | 1443312 A1 | 8/2004 |
| EP | 2381421 A2 | 10/2011 |
| EP | 2533009 A2 | 12/2012 |
| EP | 2722656 A1 | 4/2014 |
| EP | 2779027 A1 | 9/2014 |
| EP | 2843590 A1 | 3/2015 |
| EP | 2845170 A1 | 3/2015 |
| EP | 2966595 A1 | 1/2016 |
| EP | 3006893 A1 | 3/2016 |
| EP | 3012601 A1 | 3/2016 |
| EP | 3007096 A1 | 4/2016 |
| GB | 2503978 A | 1/2014 |
| GB | 2531928 A | 5/2016 |
| JP | H04129902 A | 4/1992 |
| JP | 2008210276 A | 9/2008 |
| JP | 2014210646 A | 11/2014 |
| KR | 20110013200 A | 2/2011 |
| KR | 20110117020 A | 10/2011 |
| KR | 20120028109 A | 3/2012 |
| WO | 0114836 A1 | 3/2001 |
| WO | 2006095110 A1 | 9/2006 |
| WO | 2007015059 A1 | 2/2007 |
| WO | 2011017241 A1 | 2/2011 |
| WO | 2012175731 A1 | 12/2012 |
| WO | 2013021157 A1 | 2/2013 |
| WO | 2013033442 A1 | 3/2013 |
| WO | 2013163789 A1 | 11/2013 |
| WO | 2013166368 A1 | 11/2013 |
| WO | 2013173985 A1 | 11/2013 |
| WO | 2014019130 A1 | 2/2014 |
| WO | 2014102341 A1 | 7/2014 |
| WO | 2014149702 A1 | 9/2014 |
| WO | 2014151746 A2 | 9/2014 |
| WO | 2016020038 A1 | 2/2016 |
| WO | 2016061699 A1 | 4/2016 |

OTHER PUBLICATIONS

Zhaoxiang Zhang, Tieniu Tan, Kaiqi Huang, Yunhong Wang, Three-Dimensional Deformable-Model-Based Localization and Recognition of Road Vehicles, 2011, IEEE Transactions on Image Processing, 21(1):1-13.*

Matthew Leotta, Joseph Mundy, Predicting High Resolution Image Edges with a Generic, Adaptive, 3-D Vehicle Model, 2009, IEEE Conference on Computer Vision and Pattern Recognition, pp. 1311-1318.*

Jonathan Spiller, Object Localization Using Deformable Templates, 2007, Masters Dissertation, University of the Witwatersrand, Johannesburg, South Africa.*

Matthew Leotta, Generic, Deformable Models for 3-D Vehicle Surveillance, 2010, Doctoral Dissertation, Brown University, Providence, Rhode Island.*

Benjamin Ward, Interactive 3D Reconstruction from Video, 2012, Doctoral Thesis, University of Adelaide, Adelaide, South Australia.*

Frederick W. Hood, William A. Hoff, Robert King, Evaluation of an Interactive Technique for Creating Site Models from Range Data, 1997, Proceedings of the ANS 7th Topical Meeting on Robotics & Remote Systems, pp. 1-9.*

Alok Gupta, Range Image Segmentation for 3-D Object Recognition, 1988, Technical Reports (CIS), Paper 736, University of Pennsylvania Department of Computer and Information Science, retrieved from <<http://repository.upenn.edu/cis_reports/736>>, Accessed May 31, 2015.*

Irene Reisner-Kollmann, Anton L. Fuhrmann, Werner Purgathofer, Interactive Reconstruction of Industrial Sites using Parametric Models, 2010, Proceedings of the 26th Spring Conference on Computer Graphics SCCG '10, pp. 101-108.*

M.Zahid Gürbüz, Selim Akyokuç, İbrahim Emiroğlu, Aysun Güran, An Efficient Algorithm for 3D Rectangular Box Packing, 2009, Applied Automatic Systems: Proceedings of Selected AAS 2009 Papers, pp. 131-134.*

U.S. Appl. No. 14/274,858 for Mobile Printer With Optional Battery Accessory, filed May 12, 2014, (Marty et al.), 26 pages.

U.S. Appl. No. 14/264,173 for Autofocus Lens System for Indicia Readers filed Apr. 29, 2014, (Ackley et al.), 39 pages.

U.S. Appl. No. 14/230,322 for Focus Module and Components with Actuator filed Mar. 31, 2014 (Feng et al.); 92 pages.

U.S. Appl. No. 14/222,994 for Method and Apparatus for Reading Optical Indicia Using a Plurality of Data filed Mar. 24, 2014 (Smith et al.); 30 pages.

U.S. Appl. No. 14/231,898 for Hand-Mounted Indicia-Reading Device with Finger Motion Triggering filed Apr. 1, 2014 (Van Horn et al.); 36 pages.

U.S. Appl. No. 29/486,759 for an Imaging Terminal, filed Apr. 2, 2014 (Oberpriller et al.); 8 pages.

U.S. Appl. No. 29/436,337 for an Electronic Device, filed Nov. 5, 2012 (Fitch et al.); 19 pages.

U.S. Appl. No. 29/458,405 for an Electronic Device, filed Jun. 19, 2013 (Fitch et al.); 22 pages.

U.S. Appl. No. 29/459,620 for an Electronic Device Enclosure, filed Jul. 2, 2013 (London et al.); 21 pages.

U.S. Appl. No. 29/459,681 for an Electronic Device Enclosure, filed Jul. 2, 2013 (Chaney et al.); 14 pages.

U.S. Appl. No. 29/459,785 for a Scanner and Charging Base, filed Jul. 3, 2013 (Fitch et al.); 21 pages.

U.S. Appl. No. 29/459,823 for a Scanner, filed Jul. 3, 2013 (Zhou et al.); 13 pages.

U.S. Appl. No. 29/468,118 for an Electronic Device Case, filed Sep. 26, 2013 (Oberpriller et al.); 44 pages.

U.S. Appl. No. 13/367,978, filed Feb. 7, 2012, (Feng et al.); now abandoned.

U.S. Appl. No. 13/736,139 for an Electronic Device Enclosure, filed Jan. 8, 2013 (Chaney); 40 pages.

U.S. Appl. No. 13/771,508 for an Optical Redirection Adapter, filed Feb. 20, 2013 (Anderson); 26 pages.

U.S. Appl. No. 13/780,356 for a Mobile Device Having Object Identification Interface, filed Feb. 28, 2013 (Samek et al.); 21 pages.

U.S. Appl. No. 13/852,097 for a System and Method for Capturing and Preserving Vehicle Event Data, filed Mar. 28, 2013 (Barker et al.); 20 pages.

U.S. Appl. No. 13/902,110 for a System and Method for Display of Information Using a Vehicle-Mount Computer, filed May 24, 2013 (Hollifield); 29 pages.

U.S. Appl. No. 13/902,144, for a System and Method for Display of Information Using a Vehicle-Mount Computer, filed May 24, 2013 (Chamberlin); 23 pages.

U.S. Appl. No. 13/902,242 for a System for Providing a Continuous Communication Link With a Symbol Reading Device, filed May 24, 2013 (Smith et al.); 24 pages.

U.S. Appl. No. 13/912,262 for a Method of Error Correction for 3D Imaging Device, filed Jun. 7, 2013 (Jovanovski et al.); 33 pages.

U.S. Appl. No. 13/912,702 for a System and Method for Reading Code Symbols at Long Range Using Source Power Control, filed Jun. 7, 2013 (Xian et al.); 24 pages.

U.S. Appl. No. 13/922,339 for a System and Method for Reading Code Symbols Using a Variable Field of View, filed Jun. 20, 2013 (Xian et al.); 23 pages.

(56) References Cited

OTHER PUBLICATIONS

U.S. Appl. No. 13/927,398 for a Code Symbol Reading System Having Adaptive Autofocus, filed Jun. 26, 2013 (Todeschini); 24 pages.
U.S. Appl. No. 13/930,913 for a Mobile Device Having an Improved User Interface for Reading Code Symbols, filed Jun. 28, 2013 (Gelay et al.); 24 pages.
U.S. Appl. No. 13/933,415 for an Electronic Device Case, filed Jul. 2, 2013 (London et al.); 47 pages.
U.S. Appl. No. 13/947,296 for a System and Method for Selectively Reading Code Symbols, filed Jul. 22, 2013 (Rueblinger et al.); 29 pages.
U.S. Appl. No. 13/950,544 for a Code Symbol Reading System Having Adjustable Object Detection, filed Jul. 25, 2013 (Jiang); 28 pages.
U.S. Appl. No. 13/961,408 for a Method for Manufacturing Laser Scanners, filed Aug. 7, 2013 (Saber et al.); 26 pages.
U.S. Appl. No. 14/018,729 for a Method for Operating a Laser Scanner, filed Sep. 5, 2013 (Feng et al.); 24 pages.
U.S. Appl. No. 14/019,616 for a Device Having Light Source to Reduce Surface Pathogens, filed Sep. 6, 2013 (Todeschini); 23 pages.
U.S. Appl. No. 14/023,762 for a Handheld Indicia Reader Having Locking Endcap, filed Sep. 11, 2013 (Gannon); 31 pages.
U.S. Appl. No. 14/035,474 for Augmented-Reality Signature Capture, filed Sep. 24, 2013 (Todeschini); 33 pages.
U.S. Appl. No. 14/047,896 for Terminal Having Illumination and Exposure Control filed Oct. 7, 2013 (Jovanovski et al.); 32 pages.
U.S. Appl. No. 14/053,175 for Imaging Apparatus Having Imaging Assembly, filed Oct. 14, 2013 (Barber); 39 pages.
U.S. Appl. No. 14/055,234 for Dimensioning System, filed Oct. 16, 2013 (Fletcher); 26 pages.
U.S. Appl. No. 14/053,314 for Indicia Reader, filed Oct. 14, 2013 (Huck); 29 pages.
U.S. Appl. No. 14/065,768 for Hybrid System and Method for Reading Indicia, filed Oct. 29, 2013 (Meier et al.); 22 pages.
U.S. Appl. No. 14/074,746 for Self-Checkout Shopping System, filed Nov. 8, 2013 (Hejl et al.); 26 pages.
U.S. Appl. No. 14/345,735 for Optical Indicia Reading Terminal with Combined Illumination filed Mar. 19, 2014 (Ouyang); 19 pages.
U.S. Appl. No. 14/101,965 for High Dynamic-Range Indicia Reading System, filed Dec. 10, 2013 (Xian); 28 pages.
U.S. Appl. No. 14/118,400 for Indicia Decoding Device with Security Lock, filed Nov. 18, 2013 (Liu); 28 pages.
U.S. Appl. No. 14/150,393 for Incicia-reader Having Unitary Construction Scanner, filed Jan. 8, 2014 (Colavito et al.); 28 pages.
U.S. Appl. No. 14/154,207 for Laser Barcode Scanner, filed Jan. 14, 2014 (Hou et al.); 26 pages.
U.S. Appl. No. 14/154,915 for Laser Scanning Module Employing a Laser Scanning Assembly having Elastomeric Wheel Hinges, filed Jan. 14, 2014 (Havens et al.); 24 pages.
U.S. Appl. No. 14/158,126 for Methods and Apparatus to Change a Feature Set on Data Collection Devices, filed Jan. 17, 2014 (Berthiaume et al.); 53 pages.
U.S. Appl. No. 14/342,551 for Terminal Having Image Data Format Conversion filed Mar. 4, 2014 (Lui et al.); 25 pages.
U.S. Appl. No. 14/342,544 for Imaging Based Barcode Scanner Engine with Multiple Elements Supported on a Common Printed Circuit Board filed Mar. 4, 2014 (Liu et al.); 27 pages.
U.S. Appl. No. 14/257,174 for Reading Apparatus Having Partial Frame Operating Mode filed Apr. 21, 2014, (Barber et al.), 67 pages.
U.S. Appl. No. 14/200,405 for Indicia Reader for Size-Limited Applications filed Mar. 7, 2014 (Feng et al.); 42 pages.
U.S. Appl. No. 14/166,103 for Indicia Reading Terminal Including Optical Filter filed Jan. 28, 2014 (Lu et al.); 29 pages.
Peter Clarke, Actuator Developer Claims Anti-Shake Breakthrough for Smartphone Cams, Electronic Engineering Times, p. 24, May 16, 2011.
U.S. Appl. No. 14/055,234, not yet published, Hand Held Products, Inc. Filed Oct. 16, 2013; 26 pages.
U.S. Appl. No. 13/912,262, not yet published, Filed Jun. 7, 2013, Hand Held Products Inc., Method of Error Correction for 3D Imaging Device: 33 pages.
European Search Report for application No. EP13186043 (now EP2722656 (Apr. 23, 2014)): Total pp. 7.
International Search Report for PCT/US2013/039438 (WO2013166368), Oct. 1, 2013, 7 pages.
U.S. Appl. No. 14/453,019, not yet published, Filed Aug. 6, 2014, Hand Held Products Inc., Dimensioning System With Guided Alignment: 31 pages.
European Office Action for application EP 13186043, dated Jun. 12, 2014(now EP2722656 (Apr. 23, 2014)), Total of 6 pages.
U.S. Appl. No. 14/461,524, not yet published, Filed Aug. 18, 2014, Hand Held Products Inc., System and Method for Package Dimensioning: 21 pages.
European Patent Office Action for Application No. 14157971.4-1906, Dated Jul. 16, 2014, 5 pages.
European Patent Search Report for Application No. 14157971.4-1906, Dated Jun. 30, 2014, 6 pages.
Caulier, Yannick et al., "A New Type of Color-Coded Light Structures for an Adapted and Rapid Determination of Point Correspondences for 3D Reconstruction." Proc. of SPIE, vol. 8082 808232-3; 2011; 8 pages.
Kazantsev, Aleksei et al. "Robust Pseudo-Random Coded Colored STructured Light Techniques for 3D Object Model Recovery"; Rose 2008 IEEE International Workshop on Robotic and Sensors Environments (Oct. 17-18, 2008) , 6 pages.
Mouaddib E. et al. "Recent Progress in Structured Light in order to Solve the Correspondence Problem in Stereo Vision" Proceedings of the 1997 IEEE International Conference on Robotics and Automation, Apr. 1997; 7 pages.
U.S. Appl. No. 14/490,989 for Volume Dimensioning Calibration Systems and Methods, filed Sep. 19, 2014 (Laffargue et al.); 41 pages.
Wikipedia, YUV description and definition, downloaded from http://www.wikipedia.org/wiki/YUV on Jun. 29, 2012, 10 pages.
YUV Pixel Format, downloaded from http://www.fource.org/yuv.php on Jun. 29, 2012; 13 pages.
YUV to RGB Conversion, downloaded from http://www.fource.org/fccyvrgb.php on Jun. 29, 2012; 5 pages.
Benos et al., "Semi-Automariv Dimensioning with Imager of a Portable Device," U.S. Appl. No. 61/149,912, filed Feb. 4, 2009 (now expired), 56 pages.
Dimensional Weight—Wikipedia, the Free Encyclopedia, URL=http://en.wikipedia.org/wiki/Dimensional_weight, download Aug. 1, 2008, 2 pages.
Dimensioning—Wikipedia, the Free Emcyclopedia, URL=http://en.wikipedia.org/wiki/Dimensioning, download date Aug. 1, 2008, 1 page.
U.S. Appl. No. 14/519,179, Serge Thuries et al., filed Oct. 21, 2014, not published yet. 40 pages.
U.S. Appl. No. 14/519,249, H. Sprague Ackley et al., filed Oct. 21, 2014, not published yet. 36 pages.
U.S. Appl. No. 14/519,233, Franck Laffargue et al., filed Oct. 21, 2014, not published yet. 34 pages.
U.S. Appl. No. 14/519,211, H. Sprague Ackley et al., filed Oct. 21, 2014, not published yet. 33 pages.
U.S. Appl. No. 14/519,195, Franck Laffargue et al., filed Oct. 21, 2014, not published yet. 35 pages.
U.S. Appl. No. 14/795,332, Frankc Laffargue et al., filed Jul. 9, 2015, not published yet, Systems and Methods for Enhancing Dimensioning; 55 pages.
U.S. Appl. No. 14/793,149, H. Sprague Ackley, filed Jul. 7, 2015, not published yet, Mobile Dimensioner Apparatus for use in Commerce, 57 pages.
U.S. Appl. No. 14/801,023, Tyler Doornenbal et al., filed Jul. 16, 2015, not published yet, Adjusting Dimensioning Results Using Augmented Reality, 39 pages.
Reisner-Kollmann,Irene; Anton L. Fuhrmann, Werner Purgathofer, Interactive Reconstruction of Industrial Sites Using Parametric Mod-

(56) References Cited

OTHER PUBLICATIONS els, May 2010, Proceedings of the 26th Spring Conference of Computer Graphics SCCG "10, 8 pages.
U.S. Appl. No. 14/865,575, Lloyd et al., filed Sep. 25, 2015, not published yet, System for Monitoring the Condition of Packages Throuhgout Transit; 57 pages.
U.S. Appl. No. 14/873,613, McCloskey et al., filed Oct. 2, 2015, not published yet, Methods for Improving the Accuracy of Dimensioning-System Measurements; 45 pages.
U.S. Appl. No. 14/872,176, Todeschini et al., filed Oct. 1, 2015, not published yet, Depth Sensor Based Auto-Focus System for an Indicia Scanner; 42 pages.
U.S. Appl. No. 14/870,488, Jovanovski et al., filed Sep. 30, 2015, not published yet, Image-Stitching for Dimensioning ; 43 pages.
U.S. Appl. No. 14/865,797, Chamberlin et al., filed Sep. 25, 2015, not published yet, System and Method for Picking Validation; 42 pages.
Exam Report in Related EP Application 13186043.9, dated Sep. 30, 2015; 7 pages.
Search Report and Opinion in Related EP Application 15176943.7, Dated Jan. 8, 2016, 8 pages, (US Application 2014/0049635 has been previously cited).
European Search Report for related EP Application No. 15188440.0, Dated Mar. 8, 2016, 8 pages.
United Kingdom Search Report in related application GB1517842.9, dated Apr. 8, 2016, 8 pages.
Great Britain Search Report for related Application on. GB1517843.7, Dated Feb. 23, 2016; 8 pages.
European Partial Search Report for related EP Application No. 15190306.9, dated May 6, 2016, 8 pages.
Mike Stensvold, "get the Most Out of Variable Aperture Lenses", published on www.OutdoorPhotogrpaher.com; dated Dec. 7, 2010; 4 pages, [As noted on search report retrieved from URL: http;//www.outdoorphotographer.com/gear/lenses/get-the-most-out-ofvariable-aperture-lenses.html on Feb. 9, 2016].
European Search Report for related EP Application No. 16152477.2, dated May 24, 2016, 8 pages [New Reference cited herein; Reference DE102007037282 A1 and its US Counterparts have been previously cited.]
Lloyd, Ryan and Scott McCloskey, "Recognition of 3D Package Shapes for Singe Camera Metrology" IEEE Winter Conference on Applications of computer Visiona, IEEE, Mar. 24, 2014, pp. 99-106, {retrieved on Jun. 16, 2014}, Authors are employees of common Applicant.
Search Report and Opinion in related GB Application No. 1517112.7, Dated Feb. 19, 2016, 6 Pages.
European Search Report for Related EP Application No. 15189214.8, dated Mar. 3, 2016, 9 pages.
Santolaria J, Pastor JJ, Brosed FJ and Aguilar JJ, "A one-step intrinsic and extrinsic calibration method for laster line scanner operation in coordinate measuring machines", dated Apr. 1, 2009, Measurement Science and Technology, IOP, Bristol, GB, vol. 20, No. 4; 12 pages.
Second Chinese Office Action in related CN Application No. 201520810685.6, Dated Mar. 22, 2016, 5 pages, no references.
European Search Report for related Application EP 15190315.0, Dated Apr. 1, 2016, 7 pages [Commonly owned Reference 2014/0104416 has been previosly cited].
Second Chinese Office Action in related CN Application No. 2015220810562.2, Dated Mar. 22, 2016, 5 pages. English Translation provided [No references].
European Search Report for related Applicaton EP 15190249.1, dated Mar. 22, 2016, 7 pages.
Second Chinese Office Action in related CN Application No. 201520810313.3, Dated Mar. 22, 2016, 5 pages. English Translation provided [No references].
U.S. Appl. No. 14/800,757 , Eric Todeschini, filed Jul. 16, 2015, not published yet, Dimensioning and Imaging Items, 80 pages.
Proesmans, Marc et al. "Active Acquisition of 3D Shape for Moving Objects" 0-7803-3258-X/96 1996 IEEE; 4 pages.
U.S. Appl. No. 14/747,197, Serge Thuries et al., filed Jun. 23, 2015, not published yet, Optical Pattern Projector; 33 pages.
U.S. Appl. No. 14/747,490, Brian L. Jovanovski et al., filed Jun. 23, 2015, not published yet, Dual-Projector Three-Dimensional Scanner; 40 pages.
U.S. Appl. No. 14/715,916, H. Sprague Ackley, filed May 19, 2015, not published yet, Evaluating Image Values; 54 pages.
U.S. Appl. No. 14/793,149, H. Sprague Ackley, filed Jul. 7, 2015, not published yet, Mobile Dimensioner Apparatus for Use in Commerce; 57 pages.
U.S. Appl. No. 14/740,373, H. Sprague Ackley et al., filed Jun. 16, 2015, not published yet, Calibrating A Volume Dimensioner; 63 pages.
U.S. Appl. No. 14/801,023, Tyler Doomenbal et al., filed Jul. 16, 2015, not published yet, Adjusting Dimensioning Results Using Augmented Reality, 39 pages.
Leotta, Matthew, Generic, Deformable Models for 3-D Vehicle Surveillance, May 2010, Doctoral Dissertation, Brown University, Providence RI, 248 pages.
Ward, Benjamin, Interactive 3D Reconstruction from Video, Aug. 2012, Doctoral Thesis, Univesity of Adelaide, Adelaide, South Australia, 157 pages.
Hood, Frederick W.; William A. Hoff, Robert King, Evaluation of an Interactive Technique for Creating Site Models from Range Data, Apr. 27-May 1, 1997 Proceedings of the ANS 7th Topical Meeting on Robotics & Remote Systems, Augusta GA, 9 pages.
Gupta, Alok; Range Image Segmentation for 3-D Objects Recognition, May 1988, Technical Reports (CIS), Paper 736, University of Pennsylvania Department of Computer and Information Science, retrieved from Http://repository.upenn.edu/cis_reports/736, Accessed May 31, 2015, 157 pages.
Reisner-Kollmann,lrene; Anton L. Fuhrmann, Werner Purgathofer, Interactive Reconstruction of Industrial Sites Using Parametric Models, May 2010, Proceedings of the 26th Spring Conference of Computer Graphics SCCG "10, 8 pages.
Drummond, Tom; Roberto Cipolla, Real-Time Visual Tracking of Complex Structures, Jul. 2002, IEEE Transactions on Pattern Analysis and Machine Intelligence, vol. 24, No. 7; 15 pages.
Zhang, Zhaoxiang; Tieniu Tan, Kaiqi Huang, Yunhong Wang; Three-Dimensional Deformable-Model-based Localization and Recognition of Road Vehicles; IEEE Transactions on Image Processing, vol. 21, No. 1, Jan. 2012, 13 pages.
Leotta, Matthew J.; Joseph L. Mundy; Predicting High Resolution Image Edges with a Generic, Adaptive, 3-D Vehicle Model; IEEE Conference on Computer Vision and Pattern Recognition, 2009; 8 pages.
Spiller, Jonathan; Object Localization Using Deformable Templates, Master's Dissertation, University of the Witwatersrand, Johannesburg, South Africa, 2007; 74 pages.
EP Search and Written Opinion Report in related matter EP Application No. 14181437.6, Dated Mar. 26, 2015, 7 pages.
Hetzel, Gunter et al.; "3D Object Recognition from Range Images using Local Feature Histograms,", Proceedings 2001 IEEE Conference on Computer Vision and Pattern Recognition. CVPR 2001. Kauai, Hawaii, Dec. 8-14, 2001; pp. 394-399, XP010584149, ISBN: 978-0-7695-1272-3.
Intention to Grant in counterpart European Application No. 14157971.4 dated Apr. 14, 2015, pp. 1-8.
Decision to Grant in counterpart European Application No. 14157971.4 dated Aug. 6, 2015, pp. 1-2.
Salvi, Joaquim et al. "Pattern Codification Strategies in Structured Light Systems" published in Pattern Recognition; The Journal of the Pattern Recognition Society, Received Mar. 6, 2003; Accepted Oct. 2, 2003; 23 pages.
Office Action in counterpart European Application No. 13186043.9 dated Sep. 30, 2015, pp. 1-7.
Lloyd et al., "System for Monitoring the Condition of Packages Throughout Transit", U.S. Appl. No. 14/865,575, filed Sep. 25, 2015, 59 pages, not yet published.
James Chamberlin, "System and Method for Picking Validation", U.S. Appl. No. 14/865,797, filed Sep. 25, 2015, 44 pages, not yet published.

(56) References Cited

OTHER PUBLICATIONS

Jovanovski et al., "Image-Stitching for Dimensioning", U.S. Appl. No. 14/870,488, filed Sep. 30, 2015, 45 pages, not yet published.
Todeschini et al.; "Depth Sensor Based Auto-Focus System for an Indicia Scanner," U.S. Appl. No. 14/872,176, filed Oct. 1, 2015, 44 pages, not yet published.
Wikipedia, "3D projection" Downloaded on Nov. 25, 2015 from www.wikipedia.com, 4 pages.
McCloskey et al., "Methods for Improving the Accuracy of Dimensioning-System Measurements," U.S. Appl. No. 14/873,613, filed Sep. 2, 2015, 47 pages, not yet published.
Search Report in counterpart European Application No. 15182675.7, Dated Dec. 4, 2015, 10 pages.
McCloskey et al., "Image Transformation for Indicia Reading," U.S. Appl. No. 14/982,032, filed Oct. 30, 2015, 48 pages, not yet published.
Great Britain Combined Search and Examination Report in related Application GB1517842.9, Dated Apr. 8, 2016, 8 pages [References previously cited].
M.Zahid Gurbuz, Selim Akyokus, Ibrahim Emiroglu, Aysun Guran, An Efficient Algorithm for 3D Rectangular Box Packing, 2009, Applied Automatic Systems: Proceedings of Selected AAS 2009 Papers, pp. 131-134.
United Kingdom combined Search and Examination Report in related GB Application No. 1607394.2, Dated Oct. 19, 2016, 7 pages.
European extended Search report in related EP Application 13785171.3, dated Sep. 19, 2016, 8 pages.
El-Hakim et al., "Multicamera vision-based approach to flexible feature measurement for inspection and reverse engineering", published in Optical Engineering, Society of Photo-Optical Instrumentation Engineers, vol. 32, No. 9, Sep. 1, 1993, 15 pages.
El-Hakim et al., "A Knowledge-based Edge/Object Measurement Technique", Retrieved from the Internet: URL: https://www.researchgate.net/profile/Sabry_E1-Hakim/publication/44075058_A_Knowledge_Based_EdgeObject_Measurement_Technique/links/00b4953b5faa7d3304000000.pdf [retrieved on Jul. 15, 2016] dated Jan. 1, 1993, 9 pages.
European Search Report for related EP Application No. 16168216.6, Dated Oct. 20, 2016, 8 pages. [New references are cited only; U.S. Publication 2014/0104413 has been previously cited].
European Extended Search Report in Related EP Application No. 16172995.9, Dated Aug. 22, 2016, 11 pages (Only new references have been cited; U.S. Pat. No. 8,463,079 (formerly U.S. Publication 2010/0220894) and U.S. Publication 2001/0027955 have been previously cited.).
M.Zahid Gurbuz, Selim Akyokus, Ibrahim Emiroglu, Aysun Guran, An Efficient Algorithm for 3D Rectangular Box Packing, 2009, Applied Automatic Systems: Proceedings of Selected AAS 2009 Papers, pp. 131-134 [Examiner cited art in related US matter with Notice of Allowance dated Aug. 11, 2016].
European Extended search report in related EP Application No. 15190306.9, Dated Sep. 9, 2016, 15 pages [only new references are cited; remaining references were cited with partial search report in same application dated May 6, 2016].
Collings et al., "The Applications and Technology of Phase-Only Liquid Crystal on Silicon Devices", Journal of Display Technology, IEEE Service Center, New, York, NY, US, vol. 7, No. 3, Mar. 1, 2011, pp. 112-119.
European Extended Search Report in related EP Application No. 16173429.8, dated Dec. 1, 2016, 8 pages [Only new references cited: US 2013/0038881 was previously cited].

* cited by examiner

VOLUME DIMENSIONING SYSTEMS AND METHODS

BACKGROUND

Field

This disclosure generally relates to non-contact systems and methods for determining dimensions and volume of one or more objects.

Description of the Related Art

Volume dimensioning systems are useful for providing dimensional and volumetric data related to three-dimensional objects disposed within the point of view of the volume dimensioning system. Such dimensional and volumetric information is useful for example, in providing users with accurate shipping rates based on the actual size and volume of the object being shipped. Additionally, the volume dimensioning system's ability to transmit parcel data immediately to a carrier can assist the carrier in selecting and scheduling appropriately sized vehicles based on measured cargo volume and dimensions. Finally, the ready availability of dimensional and volumetric information for all the objects within a carrier's network assists the carrier in ensuring optimal use of available space in the many different vehicles and containers used in local, interstate, and international commerce.

Automating the volume dimensioning process can speed parcel intake, improve the overall level of billing accuracy, and increase the efficiency of cargo handling. Unfortunately, parcels are not confined to a standard size or shape, and may, in fact, have virtually any size or shape. Additionally, parcels may also have specialized handling instructions such as a fragile side that must be protected during shipping or a side that must remain up throughout shipping. Automated systems may struggle with assigning accurate dimensions and volumes to irregularly shaped objects, with a single object that may be represented as a combination of two objects (e.g., a guitar) or with multiple objects that may be better represented as a single object (e.g., a pallet holding multiple boxes that will be shrink-wrapped for transit). Automated systems may also struggle with identifying a particular portion of an object as being "fragile" or a particular portion of an object that should remain "up" while in transit.

Providing users with the ability to identify and/or confirm the shape and/or numbers of either single objects or individual objects within a group or stack of objects and to identify the boundaries of irregularly shaped objects benefits the user in providing cartage rates that are proportionate to the actual size and/or volume of the parcel being shipped. Involving the user in providing accurate shape and/or volume data for a parcel or in providing an accurate outline of an irregularly shaped parcel also benefits the carrier by providing data that can be used in optimizing transport coordination and planning. Providing the user with the ability to designate one or more special handling instructions provides the user with a sense of security that the parcel will be handled in accordance with their wishes, that fragile objects will be protected and that "up" sides will be maintained on the "top" of the parcel during transport. The special handling instructions also benefit the transporter by providing information that can be useful in load planning (ensuring, for example, "fragile" sides remain protected and "up" sides remain "up" in load planning) and in reducing liability for mishandled parcels that are damaged in transit.

BRIEF SUMMARY

A method of operation of a volume dimensioning system may be summarized as including receiving image data of an area from a first point of view by at least one nontransitory processor-readable medium from at least one image sensor, the area including at least a first three-dimensional object to be dimensioned; determining from the received image data a number of features in three dimensions of the first three-dimensional object by at least one processor communicatively coupled to the at least one nontransitory processor-readable medium; based at least on part on the determined features of the first three-dimensional object, fitting a first three-dimensional packaging wireframe model about the first three-dimensional object by the at least one processor; and causing a displaying of an image of the first three-dimensional packaging wireframe model fitted about an image of the first three-dimensional object on a display on which the image of the first three-dimensional object is displayed.

The method may further include receiving at least one user input via a user interface, the user input indicative of a change in a position of at least a portion of the displayed image of the first three-dimensional packaging wireframe model relative to the displayed image of the first three-dimensional object; and causing a displaying of an updated image of the first three-dimensional packaging wireframe model fitted about the image of the first three-dimensional object on the display. The method may further include receiving at least one user input via a user interface, the user input indicative of a change in a position of at least a portion of the displayed image of the three-dimensional packaging wireframe model relative to the displayed image of the first three-dimensional object; based at least in part on the received user input, fitting a second three-dimensional packaging wireframe model about the first three-dimensional object by the at least one processor, the second three-dimensional packaging wireframe model having a different geometrical shape than the first three-dimensional wireframe model; and causing a displaying of an image of the second three-dimensional packaging wireframe model fitted about the image of the first three-dimensional object on the display. The method may further include receiving at least one user input via a user interface, the user input indicative of an identification of a second three-dimensional object, the second three-dimensional object different from the first three-dimensional object; based at least in part on the received user input, fitting a second three-dimensional packaging wireframe model about the second three-dimensional object by the at least one processor, the second three-dimensional wireframe model; and causing a displaying of an image of the second three-dimensional packaging wireframe model fitted about the image of the second three-dimensional object on the display. The at least one processor may cause the concurrent displaying of the image of the first three-dimensional packaging wireframe model fitted about the image of the first three-dimensional object on the display and the image of the second three-dimensional packaging wireframe model fitted about the image of the second three-dimensional object on the display. The method may further include receiving at least one user input via a user interface, the user input indicative of an identification of at least one portion of the first three-dimensional object; based at least in part on the received user input, fitting one three-dimensional packaging wireframe model about a first portion of the first three-dimensional object by the at least one processor; based at least in part on the received user input, fitting one three-dimensional packaging wireframe model about a second portion of the first three-dimensional object by the at least one processor; and causing a concurrent displaying of an image of the three-dimensional wireframe models respectively fitted about the image of the first and the second portions of the first three-dimensional object on the display. The at least one processor may cause the displaying of the image of the first three-dimensional packaging wireframe model fitted about the image of the first three-dimensional object on the display to rotate about an axis. The method may further include receiving image data of the area from a second point of view by at least one nontransitory processor-readable medium from at least one image sensor, the second point of view different from the first point of view; determining from the received image data at least one additional feature in three dimensions of the first three-dimensional object by at least one processor; based on the determined features of the first three-dimensional object, at least one of adjusting the first three-dimensional packaging wireframe model or fitting a second three-dimensional packaging wireframe model about the first three-dimensional object by the at least one processor; and causing a displaying of an image of at least one of the adjusted first three-dimensional packaging wireframe model or the second three-dimensional packaging wireframe model fitted about the image of the first three-dimensional object on the display. Fitting a first three-dimensional packaging wireframe model about the first three-dimensional object by the at least one processor may include selecting from a number of defined geometric primitives that define respective volumes and sizing at least one dimension of the selected geometric primitive based on a corresponding dimension of the first three-dimensional object such that the first three-dimensional object is completely encompassed by the selected and sized geometric primitive. The method may further include producing a wireframe model of the first three-dimensional object; and causing a concurrently displaying of the wireframe model of the first three-dimensional object along with the three-dimensional packaging wireframe model. The method may further include receiving at least one user input via a user interface, the user input indicative of a geometric primitive of the first three-dimensional object; and selecting the first three-dimensional object from a plurality of three-dimensional objects represented in the image data by at least one processor, based at least in part on the user input indicative of the geometric primitive of the first three-dimensional object. Selecting the first three-dimensional object from a plurality of three-dimensional objects represented in the image data based at least in part on the user input indicative of the geometric primitive of the first three-dimensional object includes determining which of the three-dimensional objects has a geometric primitive that most closely matches the geometric primitive indicated by the received user input. The method may further include receiving at least one user input via a user interface, the user input indicative of an acceptance of the first three-dimensional packaging wireframe model; and performing at least a volumetric calculation using a number of dimensions of the selected three-dimensional packaging wireframe model. The method may further include receiving at least one user input via a user interface, the user input indicative of a rejection of the first three-dimensional packaging wireframe model; and in response to the received user input, fitting a second three-dimensional packaging wireframe model about the first three-dimensional object by the at least one processor, the second three-dimensional packaging wireframe model having a different geometric primitive than the first three-dimensional wireframe model; and causing a displaying of an image of the second three-dimensional packaging wireframe model fitted about the image of the first three-dimensional object on the display. The method may further include receiving at least one user input via a user interface, the user input indicative of a second three-dimensional packaging wireframe model, the second three-dimensional packaging wireframe model having a different geometric primitive than the first three-dimensional wireframe model; in response to the received user input, fitting the second three-dimensional packaging wireframe model about the first three-dimensional object by the at least one processor; and causing a displaying of an image of the second three-dimensional packaging wireframe model fitted about the image of the first three-dimensional object on the display by the at least one processor. The method may further include causing by the at least one processor a displaying of a plurality of user selectable icons, each corresponding to a respective one of a plurality of three-dimensional packaging wireframe model and selectable by a user to be fitted to the first three-dimensional object. The method may further include receiving at least one user input via a user interface, the user input indicative of a region of interest of the displayed image of the first three-dimensional object; and in response to the received user input, causing by the at least one processor a displaying of an enlarged image of a portion of the first three-dimensional object corresponding to the region of interest by the display. The method may further include causing by the at least one processor a displaying of a plurality of user selectable icons, each corresponding to a respective one of a plurality of three-dimensional packaging wireframe model and selectable by a user to be fitted to the first three-dimensional object. 19. The method of claim 1 wherein the volume dimensioning system comprises a computer having a first processor, a camera and the display, and the volume dimensioning system further comprises a volume dimensioning system having a second processor, the volume dimensioning system selectively detachably coupleable to the computer, and causing a displaying of an image of the first three-dimensional packaging wireframe model fitted about an image of the first three-dimensional object on a display on which the image of the first three-dimensional object is displayed includes the second processor causing the first processor to display the image of the first three-dimensional packaging wireframe model fitted about the image of the first three-dimensional object on the display of the first computer.

A volume dimensioning system may be summarized as including at least one image sensor communicably coupled to at least one nontransitory processor-readable medium; at least one processor communicably coupled to the at least one nontransitory processor-readable medium; a machine executable instruction set stored within at least one nontransitory processor-readable medium, that when executed by the at least one processor causes the at least one processor to: read image data from the at least one nontransitory processor-readable medium, the image data associated with a first point of view of an area sensed by the at least one image sensor, the area including at least a first three-dimensional object to be dimensioned; determine from the received image data a number of features in three dimensions of the first three-dimensional object; based at least on part on the determined features of the first three-dimensional object, fit a first three-dimensional packaging wireframe model about the first three-dimensional object; and cause a display of an image of the first three-dimensional packaging wireframe model fitted about an image of the first three-dimensional object on a display device.

The machine executable instruction set may further include instructions, that when executed by the at least one processor cause the at least one processor to: select from a number of defined geometric primitives that define respective volumes and sizing at least one dimension of the selected geometric primitive based on a corresponding dimension of the first three-dimensional object such that the first three-dimensional object is completely encompassed by the selected and sized geometric primitive; produce a wireframe model of the first three-dimensional object; and cause a concurrent display of the wireframe model of the first three-dimensional object along with the three-dimensional packaging wireframe model. The machine executable instruction set stored within at least one nontransitory processor-readable medium may further include instructions, that when executed by the at least one processor cause the at least one processor to: responsive to a user input received by the at least one processor, change a position of at least a portion of the displayed image of the first three-dimensional packaging wireframe model relative to the displayed image of the first three-dimensional object; and cause a display of an updated image of the first three-dimensional packaging wireframe model fitted about the image of the first three-dimensional object on the display device. The machine executable instruction set stored within at least one nontransitory processor-readable medium may further include instructions, that when executed by the at least one processor cause the at least one processor to: responsive to a user input received by the at least one processor, change a position of at least a portion of the displayed image of the three-dimensional packaging wireframe model relative to the displayed image of the first three-dimensional object; responsive to a user input received by the at least one processor, fit a second three-dimensional packaging wireframe model about the first three-dimensional object, the second three-dimensional packaging wireframe model having a different geometrical shape than the first three-dimensional wireframe model; and cause a display of an image of the second three-dimensional packaging wireframe model fitted about the image of the first three-dimensional object on the display device. The machine executable instruction set stored within at least one nontransitory processor-readable medium may further include instructions, that when executed by the at least one processor cause the at least one processor to: responsive to a user input received by the at least one processor, the user input indicative of an identification of a second three-dimensional object different from the first three-dimensional object, fit a second three-dimensional packaging wireframe model about the second three-dimensional object; and cause a display of an image of the second three-dimensional packaging wireframe model fitted about the image of the second three-dimensional object on the display. The machine executable instruction set stored within at least one nontransitory processor-readable medium may further include instructions, that when executed by the at least one processor cause the at least one processor to: responsive to a user input received by the at least one processor, the user input indicative of an identification of at least one portion of the first three-dimensional object, fit a three-dimensional packaging wireframe model about a first portion of the first three-dimensional object; responsive to a user input received by the at least one processor, the user input indicative of an identification of at least one portion of the first three-dimensional object, fit a three-dimensional packaging wireframe model about a second portion of the first three-dimensional object; and cause a display of an image of the three-dimensional wireframe models fitted about the image of the first and the second portions of the first three-dimensional object on the display device. The machine executable instruction set stored within at least one nontransitory processor-readable medium may further include instructions, that when executed by the at least one processor cause the at least one processor to: responsive to a user input received by the at least one processor, the user input indicative of a second three-dimensional packaging wireframe model having a different geometric primitive than the first three-dimensional wireframe model, fit the second three-dimensional packaging wireframe model about the first three-dimensional object by the at least one processor; and cause a display of an image of the second three-dimensional packaging wireframe model fitted about the image of the first three-dimensional object on the display. The machine executable instruction set stored within at least one nontransitory processor-readable medium may further include instructions, that when executed by the at least one processor cause the at least one processor to: cause a display of a plurality of user selectable icons on the display device, each user selectable icon corresponding to a respective one of a plurality of three-dimensional packaging wireframe models and selectable by a user to be fitted to the first three-dimensional object.

A method of operation of a volume dimensioning system may be summarized as including receiving image data of an area from a first point of view by at least one nontransitory processor-readable medium from at least one image sensor, the area including at least a first three-dimensional object to be dimensioned; determining from the received image data a number of features in three dimensions of the first three-dimensional object by at least one processor communicatively coupled to the at least one nontransitory processor-readable medium; based at least in part on the determined features of the first three-dimensional object, identifying a first portion and at least a second portion of the first three-dimensional object by the at least one processor; based on the determined features of the first three-dimensional object, fitting a first three-dimensional packaging wireframe model about the first portion of the first three-dimensional object by the at least one processor; based on the determined features of the first three-dimensional object, fitting a second three-dimensional packaging wireframe model about the second portion of the first three-dimensional object by the at least one processor; and causing a concurrent displaying of an image of the first and the second three-dimensional wireframe models respectively fitted about the image of the first and the second portions of the first three-dimensional object on the display.

The method may further include receiving at least one user input via a user interface, the user input indicative of a change in a position of at least a portion of the displayed image of at least one of the first three-dimensional packaging wireframe model or the second three-dimensional packaging wireframe model relative to the displayed image of the first and second portions of the first three-dimensional object, respectively; and causing a displaying of an updated image of the first and second three-dimensional packaging wireframe models fitted about the image of the first and second portions of the first three-dimensional object on the display. The method may further include receiving at least one user input via a user interface, the user input indicative of a change in a position of at least a portion of the displayed image of at least one of the first three-dimensional packaging wireframe model or the second three-dimensional packaging wireframe model relative to the displayed image of the first three-dimensional object; based at least in part on the received user input, fitting a replacement three-dimensional packaging wireframe model about at least one of the first or second portions of the first three-dimensional object by the at least one processor, the replacement three-dimensional packaging wireframe model having a different geometric primitive than the first or second three-dimensional wireframe model that it replaces; and causing a displaying of an image of at least the replacement three-dimensional packaging wireframe model fitted about the image of the first three-dimensional object on the display. The at least one processor may cause the displaying of the image of the first and the second three-dimensional packaging wireframe model fitted about the image of the first three-dimensional object on the display to rotate about an axis. The method may further include receiving image data of the area from a second point of view by at least one nontransitory processor-readable medium from at least one image sensor, the second point of view different from the first point of view; determining from the received image data at least one additional feature in three dimensions of the first three-dimensional object by at least one processor; based on the determined features of the first three-dimensional object, performing at least one of adjusting the first or second three-dimensional packaging wireframe model or fitting a third three-dimensional packaging wireframe model about at least a portion of the first three-dimensional object not discernible from the first point of view by the at least one processor; and causing a displaying of an image of at least one of the adjusted first or second three-dimensional packaging wireframe model or the first, second, and third three-dimensional packaging wireframe models fitted about the image of the first three-dimensional object on the display. Fitting a first three-dimensional packaging wireframe model about the first three-dimensional object by the at least one processor may include selecting the first three-dimensional packaging wireframe model from a number of defined geometric primitives that define respective volumes and sizing at least one dimension of the selected geometric primitive based on a corresponding dimension of the first portion of the first three-dimensional object such that the first portion of the first three-dimensional object is completely encompassed by the selected and sized geometric primitive; and wherein fitting a second three-dimensional packaging wireframe model about the second portion of the first three-dimensional object by the at least one processor may include selecting the second three-dimensional packaging wireframe model from the number of defined geometric primitives that define respective volumes and sizing at least one dimension of the selected geometric primitive based on a corresponding dimension of the second portion of the first three-dimensional object such that the second portion of the first three-dimensional object is completely encompassed by the selected and sized geometric primitive. The method may further include producing a wireframe model of the first three-dimensional object; and causing a concurrently displaying of the wireframe model of the first three-dimensional object along with the first and second three-dimensional packaging wireframe models by the display. The method may further include receiving at least one user input via a user interface, the user input indicative of a geometric primitive of at least the first portion or the second portion of the first three-dimensional object; and selecting the first three-dimensional object from a plurality of three-dimensional objects represented in the image data by at least one processor, based at least in part on the user input indicative of the geometric primitive of at least a portion of the first three-dimensional object. Selecting the first three-dimensional object from a plurality of three-dimensional objects represented in the image data by at least one processor, based at least in part on the user input indicative of the geometric primitive of at least a portion of the first three-dimensional object may include determining which of the three-dimensional objects contains a portion having a geometric primitive that most closely matches the geometric primitive indicated by the received user input. The method may further include receiving at least one user input via a user interface, the user input indicative of an acceptance of the first three-dimensional packaging wireframe model and the second three-dimensional packaging wireframe model; and performing at least a volumetric calculation using a number of dimensions of the selected first and second three-dimensional packaging wireframe models. The method may further include receiving at least one user input via a user interface, the user input indicative of a rejection of at least one of the first three-dimensional packaging wireframe model or the second three-dimensional packaging wireframe model; and in response to the received user input, fitting a replacement three-dimensional packaging wireframe model about the first or second portion of the first three-dimensional object by the at least one processor, the replacement three-dimensional packaging wireframe model having a different geometric primitive than the first or second three-dimensional wireframe model that it replaces; and causing a displaying of an image of the replacement three-dimensional packaging wireframe model fitted about at least a portion of the image of the first three-dimensional object on the display. The method may further include receiving at least one user input via a user interface, the user input indicative of a replacement three-dimensional packaging wireframe model, the replacement three-dimensional packaging wireframe model having a different geometric primitive than at least one of the first three-dimensional wireframe model and the second three-dimensional wireframe model; in response to the received user input, fitting the replacement three-dimensional packaging wireframe model about either the first or second portion of the first three-dimensional object by the at least one processor; and causing a displaying of an image of the replacement three-dimensional packaging wireframe model fitted about the image of the first three-dimensional object on the display by the at least one processor. The method may further include causing by the at least one processor a displaying of a plurality of user selectable options, each user selectable option corresponding to a respective one of a plurality of three-dimensional packaging wireframe model and selectable by a user to be fitted to either the first or second portion of the first three-dimensional object.

A volume dimensioning system may be summarized as including at least one image sensor communicably coupled to at least one nontransitory processor-readable medium; at least one processor communicably coupled to the at least one nontransitory processor-readable medium; and a machine executable instruction set stored within at least one nontransitory processor-readable medium, that when executed by the at least one processor causes the at least one processor to: read image data from the at least one nontransitory processor-readable medium, the image data associated with a first point of view of an area sensed by the at least one image sensor, the area including at least a first three-dimensional object to be dimensioned; determine from the received image data a number of features in three dimensions of the first three-dimensional object; based at least in part on the determined features of the first three-dimensional object, identify a first portion and at least a second portion of the first three-dimensional object; based on the determined features of the first three-dimensional object, fit a first three-dimensional packaging wireframe model about the first portion of the first three-dimensional object; based on the determined features of the first three-dimensional object, fit a second three-dimensional packaging wireframe model about the second portion of the first three-dimensional object; and cause a concurrent display of an image of the first and the second three-dimensional wireframe models fitted about the image of the first and the second portions of the first three-dimensional object.

The first three-dimensional wireframe model may be a first geometric primitive; and wherein the second three-dimensional wireframe model may be a second geometric primitive.

A method of operation of a volume dimensioning system may be summarized as including receiving image data of an area from a first point of view by at least one nontransitory processor-readable medium from at least one image sensor, the area including at least a first three-dimensional object to be dimensioned; determining that there are insufficient features in the image data to determine a three-dimensional volume occupied by the first three-dimensional object; in response to the determination, generating an output to change at least one of a relative position or orientation of at least one image sensor with respect to at least the first three-dimensional object to obtain image data from a second point of view, the second point of view different from the first point of view.

Generating an output to change at least one of a relative position or orientation of at least one image sensor with respect to at least the first three-dimensional object to obtain image data from a second point of view may include generating at least one output, including at least one of an audio output or a visual output that is perceivable by a user. The at least one output may indicate to the user a direction of movement to change at least one of a relative position or orientation of the at least one sensor with respect to the first three-dimensional object. The method may further include causing a displaying of an image of a two-dimensional packaging wireframe model fitted about a portion of an image of the first three-dimensional object on a display on which the image of the first three-dimensional object is displayed. The causing of the displaying of the image of the two-dimensional packaging wireframe model fitted about the portion of the image of the first three-dimensional object may occur before generating the output.

A volume dimensioning system may be summarized as including at least one image sensor communicably coupled to at least one nontransitory processor-readable medium; at least one processor communicably coupled to the at least one nontransitory processor-readable medium; and a machine executable instruction set stored within at least one nontransitory processor-readable medium, that when executed by the at least one processor causes the at least one processor to: read image data from the at least one nontransitory processor-readable medium, the image data associated with a first point of view of an area sensed by the at least one image sensor, the area including at least a first three-dimensional object to be dimensioned; determine from the received image data that there are an insufficient number of features in the image data to determine a three-dimensional volume occupied by the first three-dimensional object; responsive to the determination of an insufficient number of features in the image data, generate an output to change at least one of a relative position or orientation of at least one image sensor with respect to at least the first three-dimensional object to obtain image data from a second point of view, the second point of view different from the first point of view.

The machine executable instruction set may further include instructions that when executed by the at least one processor further cause the at least one processor to: generate at least one output, including at least one of an audio output or a visual output that is perceivable by a user. The at least one output may indicate to the user a direction of movement to change at least one of a relative position or orientation of the at least one sensor with respect to the first three-dimensional object.

A method of operation of a volume dimensioning system may be summarized as including receiving image data of an area from a first point of view by at least one nontransitory processor-readable medium from at least one image sensor, the area including at least a first three-dimensional object to be dimensioned; receiving at least one user input via a user interface communicably coupled to at least one processor, the user input indicative of at least a portion of the three-dimensional packaging wireframe model of the first three-dimensional object; in response to the received user input, fitting the user inputted three-dimensional packaging wireframe model to at least a portion of one or more edges of the first three-dimensional object by the at least one processor; and causing a displaying of an image of the user inputted three-dimensional packaging wireframe model fitted about the image of the first three-dimensional object on the display by the at least one processor.

The at least one processor may cause the displaying of the image of the first three-dimensional packaging wireframe model fitted about the image of the first three-dimensional object on the display to rotate about an axis. The method may further include receiving image data of the area from a second point of view by at least one nontransitory processor-readable medium from at least one image sensor, the second point of view different from the first point of view; determining from the received image data at least one additional feature in three dimensions of the first three-dimensional object by at least one processor; based on the determined features of the first three-dimensional object, performing at least one of adjusting the three-dimensional packaging wireframe model by accepting additional user input via the user interface communicably coupled to at least one processor, the additional user input indicative the first three-dimensional packaging wireframe model; and causing a displaying of an image of at least one of the adjusted first three-dimensional packaging wireframe model fitted about the image of the first three-dimensional object on the display. The method may further include receiving at least one user input via a user interface, the user input indicative of an acceptance of the first three-dimensional packaging wireframe model; and performing at least a volumetric calculation using a number of dimensions of the selected three-dimensional packaging wireframe model.

A method of operation of a volume dimensioning system may be summarized as including receiving image data of an area from a first point of view by at least one nontransitory processor-readable medium from at least one image sensor, the area including at least a first three-dimensional void to be dimensioned; determining from the received image data a number of features in three dimensions of the first three-dimensional void by at least one processor communicatively coupled to the at least one nontransitory processor-readable medium; based at least on part on the determined features of the first three-dimensional void, fitting a first three-dimensional receiving wireframe model within the first three-dimensional void by the at least one processor; and causing a displaying of an image of the first three-dimensional receiving wireframe model fitted within an image of the first three-dimensional void on a display on which the image of the first three-dimensional void is displayed.

The method may further include calculating by the at least one processor, at least one of an available receiving dimension and an available receiving volume encompassed by the first three-dimensional receiving wireframe model. The method may further include receiving by the at least one nontransitory processor-readable medium at least one of dimensional data and volume data for each of a plurality of three-dimensional objects, the dimensional data and volume data determined based upon a respective three-dimensional packaging wireframe model fitted to each of the plurality of three-dimensional objects and corresponding to at least one of the respective dimensions and volume of each of the plurality of three-dimensional objects; and determining by the at least one processor communicably coupled to the at least one nontransitory processor-readable medium based at least in part on at least one of the available receiving dimension and an available receiving volume encompassed by the first three-dimensional receiving wireframe model at least one of a position and an orientation of at least a portion of the plurality of three-dimensional objects within the first three-dimensional void; wherein at least one of the position and the orientation of at least a portion of the plurality of three-dimensional objects within the first three-dimensional void minimizes at least one of: at least one dimension occupied by at least a portion of the plurality of three-dimensional objects within the first three-dimensional void, or a volume occupied by at least a portion of the plurality of three-dimensional objects within the first three-dimensional void. The method may further include indicating at least one of the position and the orientation of each of the three-dimensional packaging wireframes associated with each of the plurality of three-dimensional objects within the first three-dimensional void on the display.

A volume dimensioning system may be summarized as including at least one image sensor communicably coupled to at least one nontransitory processor-readable medium; at least one processor communicably coupled to the at least one nontransitory processor-readable medium; and a machine executable instruction set stored within at least one nontransitory processor-readable medium, that when executed by the at least one processor causes the at least one processor to: read image data from the at least one nontransitory processor-readable medium, the image data associated with a first point of view of an area sensed by the at least one image sensor, the area including at least a first three-dimensional void to be dimensioned; determine from the received image data a number of features in three dimensions of the first three-dimensional void; based at least on part on the determined features of the first three-dimensional void, fit a first three-dimensional receiving wireframe model within the first three-dimensional void; and cause a display of an image of the first three-dimensional receiving wireframe model fitted within an image of the first three-dimensional void on the display device.

The machine executable instruction set may further include instructions, that when executed by the at least one processor further cause the at least one processor to: determine at least one of an available receiving dimension and an available receiving volume encompassed by the first three-dimensional receiving wireframe model; receive from the at least one nontransitory processor-readable medium at least one of dimensional data and volume data for each of a plurality of three-dimensional objects, the dimensional data and volume data determined based upon a respective three-dimensional packaging wireframe model fitted to each of the plurality of three-dimensional objects and corresponding to at least one of the respective dimensions and volume of each of the plurality of three-dimensional objects; and determine based at least in part on at least one of the available receiving dimension and the available receiving volume encompassed by the first three-dimensional receiving wireframe model at least one of a position and an orientation of at least a portion of the plurality of three-dimensional objects within the first three-dimensional void; wherein at least one of the position and the orientation of at least a portion of the plurality of three-dimensional objects within the first three-dimensional void minimizes at least one of: at least one dimension occupied by at least a portion of the plurality of three-dimensional objects within the first three-dimensional void, or a volume occupied by at least a portion of the plurality of three-dimensional objects within the first three-dimensional void.

A method of operation of a volume dimensioning system may be summarized as including receiving image data of an area from a first point of view by at least one nontransitory processor-readable medium from at least one image sensor, the area including at least a first three-dimensional object to be dimensioned; determining from the received image data a number of features in three dimensions of the first three-dimensional object by at least one processor communicatively coupled to the at least one nontransitory processor-readable medium; based at least on part on the determined features of the first three-dimensional object, fitting a first three-dimensional packaging wireframe model selected from a wireframe library stored within the at least one nontransitory processor-readable medium about the first three-dimensional object by the at least one processor; receiving at least one user input via a user interface, the user input indicative of a change in a position of at least a portion of the displayed image of the first three-dimensional packaging wireframe model relative to the displayed image of the first three-dimensional object; associating via the processor, a plurality of points differentiating the changed first three-dimensional packaging wireframe model from all existing wireframe models within the wireframe library, and the storing the changed first three-dimensional packaging wireframe model in the wireframe library; and reviewing via the processor, the wireframe model stored within the wireframe library and associated with the changed first three-dimensional packaging wireframe model for subsequent fitting about a new three-dimensional object based at least in part on the plurality of points differentiating the changed first three-dimensional packaging wireframe model from all existing wireframe models within the wireframe library.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

Figure 1A:
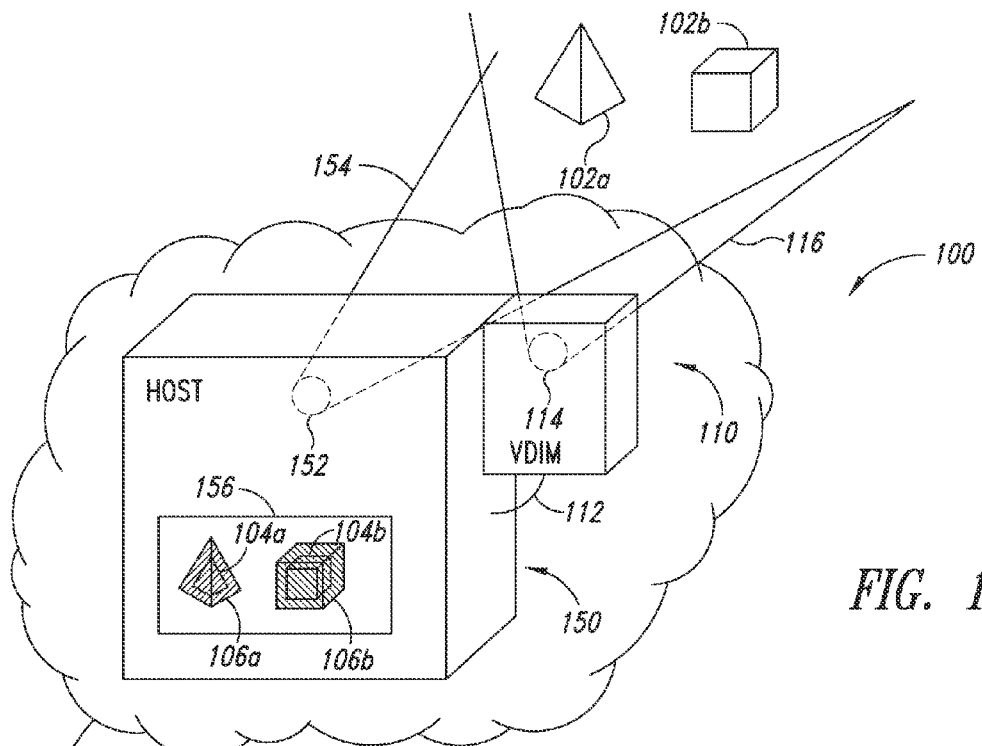
FIG. 1A is a schematic diagram of an example volume dimensioning system coupled to a host computer, with two three-dimensional objects disposed within the field-of-view of the host system camera and the field-of-view of the volume dimensioning system image sensor.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with sources of electromagnetic energy, operative details concerning image sensors and cameras and detailed architecture and operation of the host computer system have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Volume dimensioning systems provide dimensional and volumetric data for one or more three-dimensional objects located within a given point of view without requiring the laborious and time-consuming task of hand measuring and calculating the volume of each individual object. Volume dimensioning systems typically employ one or more image sensors to obtain or otherwise capture an image containing the one or more three-dimensional objects located within the field-of-view of the image sensor. Based on the shape, overall complexity, or surface contours of each of the three-dimensional objects, the volume dimensioning system can select one or more geometric primitives from a library to serve as a model of the three-dimensional object. A wireframe packaging model based, at least in part, on the selected one or more geometric primitives can then be scaled or fitted to encompass the image of each respective three-dimensional object. The scaled and fitted wireframe provides a packaging wireframe that includes sufficient t space about the three-dimensional to include an estimate of the packaging, blocking, padding, and wrapping used to ship the three-dimensional object. Thus, the three-dimensional packaging wireframe model generated by the system can be used to provide shipping data such as the dimensions and volume of not just the three-dimensional object itself, but also any additional packaging or boxing necessary to ship the three-dimensional object.

For example, a box shaped three-dimensional object may result in the selection of a single, cubic, geometric primitive by the volume dimensioning system as approximating the packaging of the actual three-dimensional object. The three-dimensional packaging wireframe model associated with a cubic geometric primitive can then be scaled and fitted to the image of the actual three-dimensional object within the volume dimensioning system to provide a model approximating the size and shape of the packaging of the actual three-dimensional object. From the virtual representation of the three-dimensional object provided by the three-dimensional packaging wireframe model, the length, width, height, and volume of the packaging can be determined by the volume dimensioning system.

In a more complex example, an obelisk shaped three-dimensional object may result in the selection of two geometric primitives by the volume dimensioning system, a rectangular prism representing the body of the obelisk and a four-sided pyramid representing the top of the obelisk. The three-dimensional packaging wireframe models associated with each of these geometric primitives can then be scaled and fitted to the image of the actual three-dimensional object within the volume dimensioning system to provide a model approximating the size, shape, and proportions of the actual, packaged, three-dimensional object. From the virtual representation of the three-dimensional object provided by the three-dimensional packaging wireframe model, the length, width, height, and volume of the packaged obelisk can be determined by the volume dimensioning system. By fitting one or more geometric primitives about three-dimensional objects having even highly complex surface features can be encompassed by the one or more relatively simple geometric primitives to provide a three-dimensional packaging wireframe model of the packaged three-dimensional object that includes allowances for packing, padding, bracing, and boxing of the three-dimensional object.

Advantageously, the volume dimensioning system can permit a user to identify special handling instructions, fragile surfaces, shipping orientation, and the like on the three-dimensional packaging wireframe model. Such handling instructions can then be associated with a given object and where the volume dimensioning system is used to perform load planning, objects can be positioned and oriented within the load plan in accordance with the handling instructions.

Additionally, the interactive nature of the volume dimensioning system can advantageously permit a user to enter, select, or modify the three-dimensional packaging wireframe model fitted to a particular three-dimensional object to more closely follow the actual outline, shape, contours, or surfaces of the object. In some instances, the system can "learn" new geometric primitives or wireframe models based on received user input, for example user input altering or modifying the three-dimensional packaging wireframe model fitted by the volume dimensioning system about three-dimensional objects having a characteristic size or shape.

FIG. 1A depicts an illustrative volume dimensioning system 110 physically and communicably coupled to a host computer 150 using one or more data busses 112. The volume dimensioning system 110 is equipped with an image sensor 114 having a field-of-view 116. The host computer 150 is equipped with a camera 152 having a field-of-view 154 and a display device 156.

Two three-dimensional objects, a pyramidal three-dimensional object 102a and a cubic three-dimensional object 102b (collectively 102) appear within the field-of-view 116 of the image sensor 114 and the field-of-view 154 of the camera 152. The three-dimensional objects 102 are depicted as surrounded by a scaled and fitted pyramidal geometric primitive 104a and a scaled and fitted cubic geometric primitive 104b (collectively 104) as displayed upon on the one or more display devices 156. Scaled, fitted, three-dimensional packaging wireframe models 106a, 106b (collectively 106) are depicted as encompassing the scaled and fitted geometric primitives 104a, 104b, respectively.

The scaled, fitted three-dimensional packaging wireframe models 106 may be generated by the host computer 150 or, more preferably by the volume dimensioning system 110. The image on the display device 156 is a provided in part using the image data acquired by the camera 152 coupled to the host computer system 150 which provides the virtual representation of the three-dimensional objects 104, and in part using the scaled and fitted three-dimensional packaging wireframe models 106 provided by the volume dimensioning system 110. Data, including visible image data provided by the camera 152 and depth map data and intensity image data provided by the image sensor 114 is exchanged between the host computer 150 and the volume dimensioning system 110 via the one or more data busses 112. In some instances, the volume dimensioning system 110 and the host computer system 150 may be partially or completely incorporated within the same housing, for example a self service kiosk or a handheld computing device.

Figure 1B:
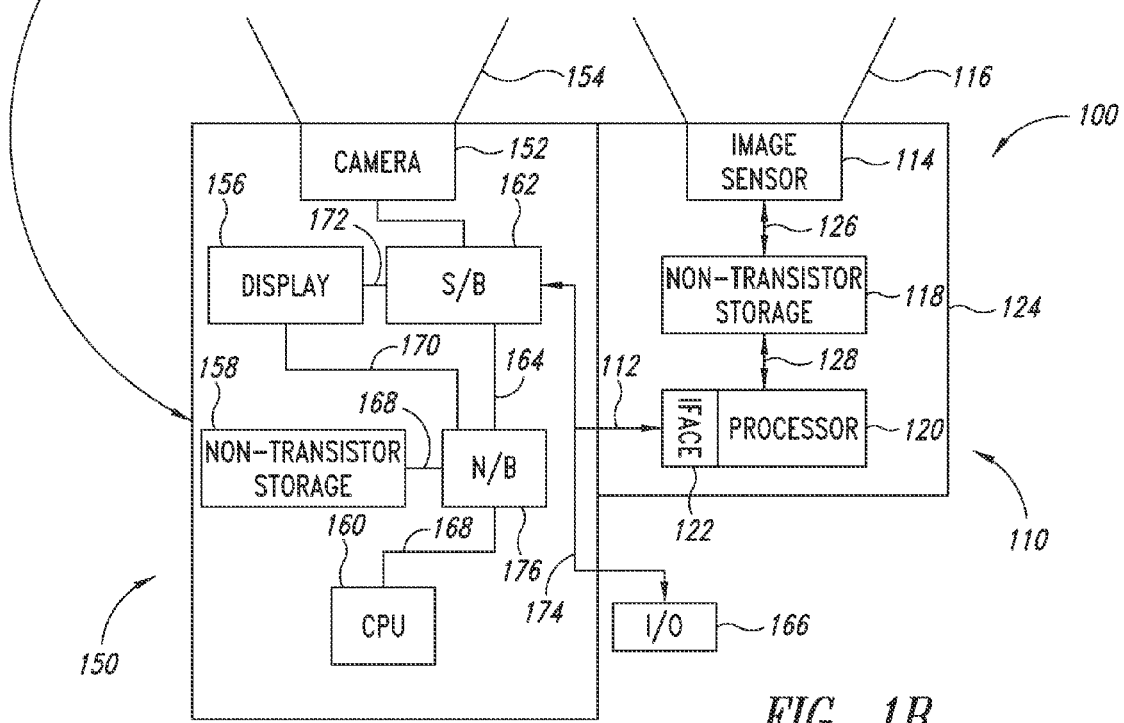
FIG. 1B is a block diagram of the example volume dimensioning system and host computer depicted in FIG. 1A.

FIG. 1B depicts an operational level block diagram of the volume dimensioning system 110 and the host computer 150. The volume dimensioning system 110 can include the image sensor 114 communicably coupled to one or more non-transitory, machine-readable storage media 118 and one or more processors 120 that are also communicably coupled to the one or more non-transitory, machine-readable storage media 118. The one or more processors 120 includes an interface 122 used to exchange data between the volume dimensioning system 110 and the host computer system 150 via the one or more data busses 112. The interface 122 can include an I/O controller, serial port, a parallel port, or a network suitable for receipt of the one or more data busses 112. In one preferred embodiment, the interface 122 can be an I/O controller having at least one universal serial bus ("USB") connector, and the one or more data busses 112 can be a USB cable. The volume dimensioning system 110 can be at least partially enclosed within a housing 124. In a preferred embodiment, the housing 124 can be detachably attached to the host computer system 150 using one or more attachment features on the exterior surface of the housing 124, the exterior surface of the host computer 150, or exterior surfaces of both the housing 124 and the host computer 150.

The host computer system 150 can include the camera 152 which is communicably coupled to a first bridge processor (e.g., a southbridge processor) 162 via one or more serial or parallel data buses, for example a universal serial bus ("USB"), a small computer serial interface ("SCSI") bus, a peripheral component interconnect ("PCI") bus, an integrated drive electronics ("IDE") bus or similar. One or more local busses 164 communicably couple the first bridge processor 162 to a second bridge processor (e.g., a northbridge processor) 176. The one or more non-transitory, machine-readable storage medium 158 and central processing units ("CPUs") 160 are communicably coupled to the second bridge processor 176 via one or more high-speed or high bandwidth busses 168. The one or more display devices 156 are coupled to the second bridge processor 176 via an interface 170 such as a Digital Visual Interface ("DVI") or a High Definition Multimedia Interface ("HDMI"). In some instances, for example where the one or more display devices 156 include at least one touch-screen display device capable of receiving user input to the host computer 150, some or all of the one or more display devices 156 may also be communicably coupled to the first bridge processor 162 via one or more USB interfaces 172.

The volume dimensioning system 110 is communicably coupled to the host computer 150 via one or more communication or data interfaces, for example one or more USB interfaces coupled to a USB bus 174 within the host computer. The USB bus 174 may also be shared with other peripheral devices, such as one or more I/O devices 166, for example one or more keyboards, pointers, touchpads, trackballs, or the like. The host computer 150 can be of any size, structure, or form factor, including, but not limited to a rack mounted kiosk system, a desktop computer, a laptop computer, a netbook computer, a handheld computer, or a tablet computer. Although for clarity and brevity one specific host computer architecture was presented in detail, those of ordinary skill in the art will appreciate that any host computer architecture may be used or substituted with equal effectiveness.

Referring now in detail to the volume dimensioning system 110, the image sensor 114 includes any number of devices, systems, or apparatuses suitable for obtaining three-dimensional image data from the scene within the field-of-view 116 of the image sensor 114. Although referred to herein as a "three-dimensional image data" it should be understood by one of ordinary skill in the art that the term may apply to more than one three-dimensional image and therefore would equally apply to "three-dimensional video images" which may be considered to comprise a series or time-lapse sequence including a plurality of "three-dimensional images." The three-dimensional image data acquired or captured by the image sensor 114 can include data collected using electromagnetic radiation either falling within the visible spectrum (e.g., wavelengths in the range of about 360 nm to about 750 nm) or falling outside of the visible spectrum (e.g., wavelengths below about 360 nm or above about 750 nm). For example, three-dimensional image data may be collected using infrared, near-infrared, ultraviolet, or near-ultraviolet light. The three-dimensional image data acquired or captured by the image sensor 114 can include data collected using laser or ultrasonic based imaging technology. In some embodiments, a visible, ultraviolet, or infrared supplemental lighting system (not shown) may be synchronized to and used in conjunction with the volume dimensioning system 100. For example, a supplemental lighting system providing one or more structured light patterns or a supplemental lighting system providing one or more gradient light patterns may be used to assist in acquiring, capturing, or deriving three-dimensional image data from the scene within the field-of-view 116 of the image sensor 114.

In a preferred embodiment, the image sensor 114 includes a single sensor capable of acquiring both depth data providing a three-dimensional depth map and intensity data providing an intensity image for objects within the field-of-view 116 of the image sensor 114. The acquisition of depth and intensity data using a single image sensor 114 advantageously eliminates parallax and provides a direct mapping between the depth map and the intensity image. The depth map and intensity image may be collected in an alternating sequence by the image sensor 114 and the resultant depth data and intensity data stored within the one or more non-transitory, machine-readable storage media 118.

The three-dimensional image data captured or acquired by the image sensor 114 may be in the form of an analog signal that is converted to digital data using one or more analog-to-digital ("A/D") converters (not shown) within the image sensor 114 or within the volume dimensioning system 110 prior to storage within the one or more non-transitory, machine-readable, storage media 118. Alternatively, the three-dimensional image data captured or acquired by the image sensor 114 may be in the form of one or more digital data groups, structures, or files comprising digital data supplied directly by the image sensor 114.

The image sensor 114 can be formed from or contain any number of image capture elements, for example picture elements or "pixels." For example, the image sensor 114 can have between 1,000,000 pixels (1 MP) and 100,000,000 pixels (100 MP). The image sensor 114 can include any number of current or future developed image sensing devices or systems, including, but not limited to, one or more complementary metal-oxide semiconductor ("CMOS") sensors or one or more charge-coupled device ("CCD") sensors.

In some embodiments, the three-dimensional image data captured by the image sensor 114 can include more than one type of data associated with or collected by each image capture element. For example, in some embodiments, the image sensor 114 may capture depth data related to a depth map of the three-dimensional objects within the point of view of the image sensor 114 and may also capture intensity data related to an intensity image of the three-dimensional objects in the field-of-view of the image sensor 114. Where the image sensor 114 captures or otherwise acquires more than one type of data, the data in the form of data groups, structures, files or the like may be captured either simultaneously or in an alternating sequence by the image sensor 114.

In some embodiments, the image sensor 114 may also provide visible image data capable of providing a visible black and white, grayscale, or color image of the three-dimensional objects 102 within the field-of-view 116 of the image sensor 114. Where the image sensor 114 is able to provide visible image data, the visible image data may be communicated to the host computer 150 for display on the one or more display devices 156. In some instances, where the image sensor 114 is able to provide visible image data, the host computer system camera 152 may be considered optional and may be eliminated.

Data is communicated from the image sensor 114 to the one or more non-transitory machine readable storage media 118 via one or more serial or parallel data busses 126. The one or more non-transitory, machine-readable storage media 118 can be any form of data storage device including, but not limited to, optical data storage, electrostatic data storage, electroresistive data storage, magnetic data storage, and molecular data storage. In some embodiments, all or a portion of the one or more non-transitory, machine-readable storage media 118 may be disposed within the one or more processors 120, for example in the form of a cache or similar non-transitory memory structure capable of storing data or machine-readable instructions executable by the one or more processors 120.

In at least some embodiments, the volume dimensioning system 110 including the image sensor 114, the communicably coupled one or more non-transitory, machine-readable storage media 118, and the communicably coupled one or more processors 120 are functionally combined to provide a system capable of selecting one or more geometric primitives 104 to virtually represent each of the one or more three-dimensional objects 102 appearing in the field-of-view 116 of the image sensor 114. Using the selected one or more geometric primitives 104, the system can then fit a three-dimensional packaging wireframe model 106 about each of the respective three-dimensional objects 102.

The one or more non-transitory, machine-readable storage media 118 can have any data storage capacity from about 1 megabyte (1 MB) to about 3 terabytes (3 TB). In some embodiments two or more devices or data structures may form all or a portion of the one or more non-transitory, machine-readable storage media 118. For example, in some embodiments, the one or more non-transitory, machine-readable storage media 118 can include an non-removable portion including a non-transitory, electrostatic, storage medium and a removable portion such as a Secure Digital (SD) card, a compact flash (CF) card, a Memory Stick, or a universal serial bus ("USB") storage device.

The one or more processors 120 can execute one or more instruction sets that are stored in whole or in part in the one or more non-transitory, machine-readable storage media 118. The machine executable instruction set can include instructions related to basic functional aspects of the one or more processors 120, for example data transmission and storage protocols, communication protocols, input/output ("I/O") protocols, USB protocols, and the like. Machine executable instruction sets related to all or a portion of the volume dimensioning functionality of the volume dimensioning system 110 and intended for execution by the one or more processors 120 may also be stored within the one or more non-transitory, machine-readable storage media 118, within the one or more processors 120, or within both the one or more non-transitory, machine-readable storage media 118 and the one or more processors 120. Additional volume dimensioning system 110 functionality may also be stored in the form of one or more machine executable instruction sets within the one or more non-transitory, machine-readable storage media 118. Such functionality may include system security settings, system configuration settings, language preferences, dimension and volume preferences, and the like.

The one or more non-transitory, machine-readable storage media 118 may also store a library containing a number of geometric primitives useful in the construction of three-dimensional packaging wireframe models by the one or more processors 120. As used herein, the term "geometric primitive" refers to a simple three-dimensional geometric shape such as a cube, cylinder, sphere, cone, pyramid, torus, prism, and the like that may be used individually or combined to provide a virtual representation of more complex three-dimensional geometric shapes or structures. The geometric primitives stored within the one or more non-transitory, machine-readable storage media 118 are selected by the one or more processors 120 as basic elements in the construction of a virtual representation 104 of each of the three-dimensional objects 102 appearing within the field-of-view 116 of the image sensor 114. The construction of the virtual representation 104 by the one or more processors 120 is useful in fitting properly scaled three-dimensional packaging wireframe models 106 to each of the three-dimensional objects 102 appearing in the field-of-view 116 of the image sensor 114. A properly scaled three-dimensional packaging wireframe model 106 permits the accurate determination of dimensional and volumetric data for each of the three-dimensional objects 102 appearing in the field-of-view 116 of the image sensor 114. A properly scaled and fitted three-dimensional packaging wireframe model 106 will fall on the boundaries of the geometric primitive 104 fitted to the three-dimensional object 102 by the one or more processors 120 as viewed on the one or more display devices 156 as depicted in FIG. 1A.

Data is transferred between the one or more non-transitory, machine-readable storage media 118 and the one or more processors 120 via one or more serial or parallel bi-directional data busses 128. The one or more processors 120 can include any device comprising one or more cores or independent central processing units that are capable of executing one or more machine executable instruction sets. The one or more processors 120 can, in some embodiments, include a general purpose processor such as a central processing unit ("CPU") including, but not limited to, an Intel® Atom® processor, an Intel® Pentium®, Celeron®, or Core 2® processor, and the like. In other embodiments the one or more processors 120 can include a system-on-chip ("SoC") architecture, including, but not limited to, the Intel® Atom® System on Chip ("Atom SoC") and the like. In other embodiments, the one or more processors 120 can include a dedicated processor such as an application specific integrated circuit ("ASIC"), a programmable gate array ("PGA" or "FPGA"), a digital signal processor ("DSP"), or a reduced instruction set computer ("RISC") based processor. Where the volume dimensioning system 110 is a battery-powered portable system, the one or more processors 120 can include one or more low power consumption processors, for example Intel® Pentium M®, or Celeron M® mobile system processors or the like, to extend the system battery life.

Data in the form of three-dimensional image data, three-dimensional packaging wireframe model data, instructions, input/output requests and the like may be bi-directionally transferred from the volume dimensioning system 110 to the host computer 150 via the one or more data busses 112.

Within the host computer 150, the three-dimensional packaging wireframe model 106 data can, for example, be combined with visual image data captured or acquired by the camera 152 to provide a display output including a visual image of one or more three-dimensional objects 102 appearing in both the camera 152 field-of-view 154 and the image sensor 114 field-of-view 116 encompassed by the geometric primitive 104 and the fitted three-dimensional packaging wireframe models 106 provided by the volume dimensioning system 110.

Referring now in detail to the host computer system 150, the camera 152 can acquire or capture visual image data of the scene within the field-of-view 154 of the camera 152. As a separate device that is discrete from the image sensor 114, the camera 152 will have a field-of-view 154 than differs from the image sensor 114 field-of-view 116. In at least some embodiments, the one or more CPUs 160, the one or more processors 120, or a combination of the one or more CPUs 160 and the one or more processors 120 will calibrate, align, map, or otherwise relate the field-of-view 154 of the camera 152 to the field-of-view 116 of the image sensor 114 thereby linking or spatially mapping in two-dimensional space or three-dimensional space the visual image data captured or acquired by the camera 152 to the three-dimensional image data captured or acquired by the image sensor 114. In a preferred embodiment, when the volume dimensioning system 110 is initially communicably coupled to the host computer 150, the one or more processors 120 in the volume dimensioning system 110 are used to calibrate, align, or spatially map in three-dimensions the field-of-view 116 of the image sensor 114 to the field-of-view 154 of the camera 152 such that three-dimensional objects 102 appearing in the field-of-view 116 of the image sensor 114 are spatially mapped or correlated in three-dimensions to the same three-dimensional objects 102 appearing in the field-of-view 154 of the camera 152.

The camera 152 can be formed from or contain any number of image capture elements, for example picture elements or "pixels." For example, the camera 152 may have between 1,000,000 pixels (1 MP) and 100,000,000 pixels (100 MP). In some embodiments, the camera 152 may capture or acquire more than one type of data, for example the camera 152 may acquire visual image data related to the visual image of the scene within the field-of-view 154 of the camera 152 as well as infrared image data related to an infrared image of the scene within the field-of-view 154 of the camera 152. Where the camera 152 captures or otherwise acquires more than one type of image data, the data may be collected into one or more data groups, structures, files, or the like.

In some embodiments, the visual image data captured or acquired by the camera 152 may originate as an analog signal that is converted to digital visual image data using one or more internal or external analog-to-digital ("ND") converters (not shown). In other embodiments, the visual image data acquired by the camera 152 is acquired in the form of digital image data provided directly from one or more complementary metal-oxide semiconductor ("CMOS") sensors or one or more charge-coupled device ("CCD") sensors disposed at least partially within the camera 152. At least a portion of the visual image data from the camera 152 is stored in the one or more non-transitory, machine-readable storage media 158 in the form of one or more data groups, structures, or files.

Image data is transferred between the camera 152 and the one or more non-transitory, machine-readable storage media 158 via the first bridge processor 162, the second bridge processor 176 and one or more serial or parallel data buses 164, 168. The image data provided by the camera 152 can be stored within the one or more non-transitory, machine-readable storage media 158 in one or more data groups, structures, or files. The one or more non-transitory, machine-readable storage media 158 can have any data storage capacity from about 1 megabyte (1 MB) to about 3 terabytes (3 TB). In some embodiments two or more devices or data structures may form all or a portion of the one or more non-transitory, machine-readable storage media 158. For example, in some embodiments, the one or more non-transitory, machine-readable storage media 158 can include an non-removable portion including a non-transitory, electrostatic, storage medium and a removable portion such as a Secure Digital (SD) card, a compact flash (CF) card, a Memory Stick, or a universal serial bus ("USB") storage device.

Data is transferred between the one or more non-transitory, machine-readable storage media 158 and the one or more CPUs 160 via the second bridge processor 176 and one or more serial or parallel bi-directional data busses 168. The one or more CPUs 160 can include any device comprising one or more cores or independent central processing units that are capable of executing one or more machine executable instruction sets. The one or more CPUs 160 can, in some embodiments, include a general purpose processor including, but not limited to, an Intel® Atom® processor, an Intel® Pentium®, Celeron®, or Core 2® processor, and the like. In other embodiments the one or more CPUs 160 can include a system-on-chip ("SoC") architecture, including, but not limited to, the Intel® Atom® System on Chip ("Atom SoC") and the like. In other embodiments, the one or more CPUs 160 can include a dedicated processor such as an application specific integrated circuit ("ASIC"), a programmable gate array ("PGA" or "FPGA"), a digital signal processor ("DSP"), or a reduced instruction set computer ("RISC") based processor. Where the host computer 150 is a battery-powered portable system, the one or more CPUs 160 can include one or more low power consumption processors, for example Intel® Pentium M®, or Celeron M® mobile system processors or the like, to extend the system battery life.

Recall, the calibration or alignment process between the camera 152 and the image sensor 114 correlated, aligned, or spatially mapped the field-of-view 154 of the camera 152 with the field of view 116 of the image sensor 114 upon initial coupling of the volume dimensioning system 110 to the host computer 150. The image data captured or acquired by the camera 152 will therefore be spatially mapped, aligned, or correlated with the three-dimensional image data captured or acquired by the image sensor 114. Advantageously, the three-dimensional packaging wireframe models 106 fitted by the one or more processors 120 to the three-dimensional objects 102 in the field-of-view 116 of the image sensor 114 will align with the image of the three-dimensional objects 102 when viewed on the one or more display devices 156. Merging, overlaying, or otherwise combining the three-dimensional packaging wireframe models 106 provided by the one or more processors 120 with the image data captured or acquired by the camera 152 creates a display image on the one or more display devices 156 that contains both an image of the three-dimensional object 102 and the corresponding three-dimensional packaging wireframe model 106.

The host computer 150 may have one or more discrete graphical processing units (GPUs—not shown) or one or more GPUs integrated with the one or more CPUs 160. The one or more CPUs 160 or one or more GPUs can generate a display image output to provide a visible image on the one or more display devices 156. The display image output can be routed through the second bridge processors 176 to the one or more display devices 156 in the host computer system 150. The one or more display devices 156 include at least an output device capable of providing a visible image perceptible to the unaided human eye. In at least some embodiments, the one or more display devices 156 can include one or more input devices, for example a resistive or capacitive touch-screen. The one or more display devices 156 can include any current or future, analog or digital, two-dimensional or three-dimensional display technology, for example cathode ray tube ("CRT"), light emitting diode ("LED"), liquid crystal display ("LCD"), organic LED ("OLED"), digital light processing ("DLP"), elnk, and the like. In at least some embodiments, the one or more display devices 156 may be self-illuminating or provided with a backlight such as a white LED to facilitate use of the system 100 in low ambient light environments.

One or more peripheral I/O devices 166 may be communicably coupled to the host computer system 150 to facilitate the receipt of user input by the host computer 150 via a pointer, a keyboard, a touchpad, or the like. In at least some embodiments the one or more peripheral I/O devices 166 may be USB devices that are communicably coupled to the USB bus 174. In at least some embodiments, the one or more peripheral I/O devices 166 or the one or more display devices 156 may be used by the one or more processors 120 or one or more CPUs 160 to receive specialized shipping instructions associated with one or more three-dimensional objects 102 from a user. Such specialized instructions can include any data provided by the user that is relevant to how a particular three-dimensional object 102 should be handled, and can include, but is not limited to, designation of fragile areas, designation of proper shipping orientation, designation of top-load only or crushable contents, and the like. Upon receipt of the specialized shipping instructions, the one or more processors 120 or the one or more CPUs 160 can associate the instructions with a particular three-dimensional packaging wireframe model 106 which thereby links the instructions with a particular three-dimensional object 102.

Figure 2:
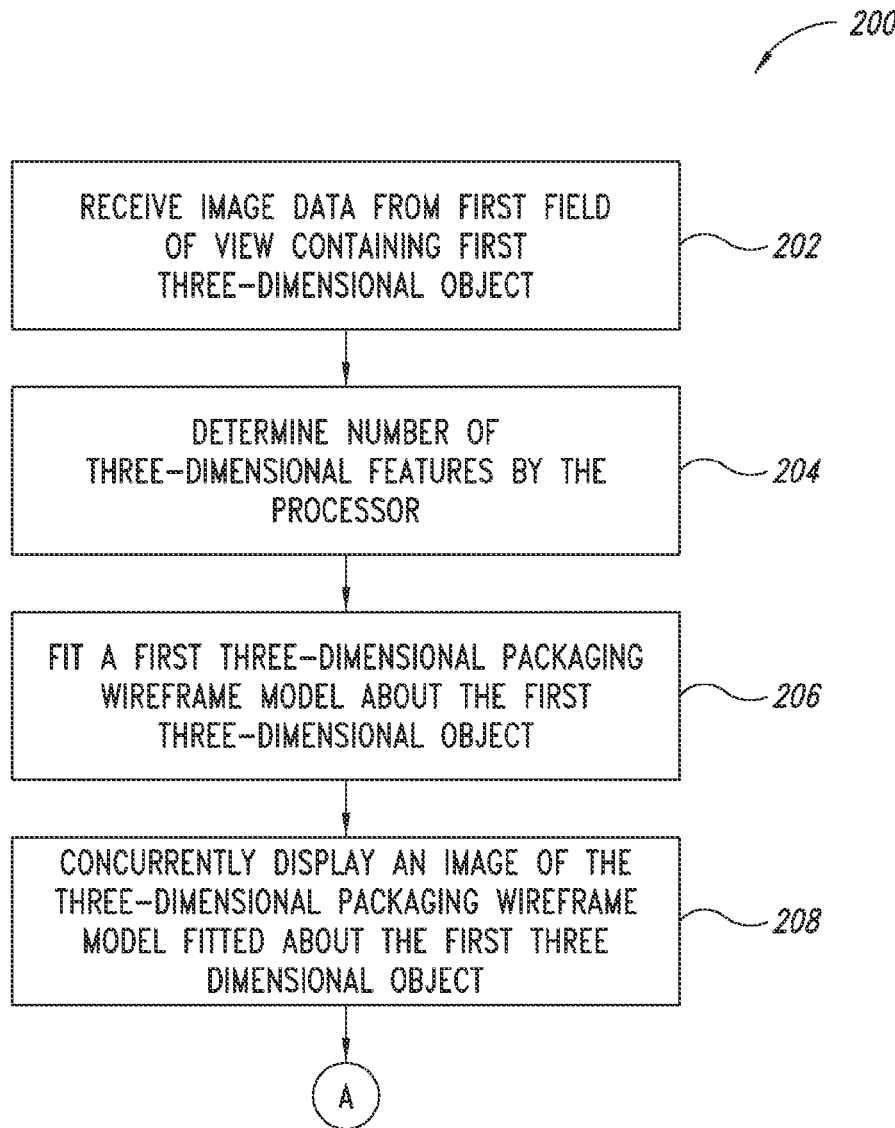
FIG. 2 is an example volume dimensioning method using a volume dimensioning system including an image sensor, a non-transitory, machine-readable storage, a processor, a camera, and a display device.

FIG. 2 shows a method 200 of operation of an example illustrative volume dimensioning system such as the system depicted in FIGS. 1A and 1B. Data captured or acquired by the image sensor 114 is used by the one or more processors 120 to select one or more geometric primitives 104, for example from a library in the one or more non-transitory, machine-readable storage media 118. The one or more geometric primitives 104 selected by the one or more processors 120 are used to construct a virtual representation of the packaging about the one or more three-dimensional objects 102 appearing in the field-of-view 116 of the image sensor 114. The one or more processors 120 can therefore use the one or more selected geometric primitives 104 to construct a three-dimensional packaging wireframe model 106 that, when fitted to the three-dimensional object 102, provides a three-dimensional packaging wireframe model 106 that is scaled and fitted to encompass or otherwise contain the three-dimensional object 102.

The one or more processors 120 can use the plurality of features identified on the three-dimensional object 102 in selecting the one or more geometric primitives 104 from the library. The three-dimensional packaging wireframes 106 encompassing each three-dimensional object 102 within the volume dimensioning system 110 permit a reasonably accurate determination of the dimensions and volume of each three-dimensional object 102. The user benefits from accurate dimensional and volumetric information by receiving accurate shipping rates based on the object's true size and volume. Carriers benefit from accurate dimensional and volumetric information by having access to data needed to optimize the packing of the objects for transport and the subsequent routing of transportation assets based upon reasonably accurate load data.

At 202, the image sensor 114 captures or acquires three-dimensional image data which is communicated to the one or more non-transitory, machine-readable storage media 118 via one or more data busses 126. The three-dimensional image data captured by the image sensor 114 includes a first three-dimensional object 102 disposed within the field-of-view 116 of the image sensor 114. The three-dimensional image data captured by the image sensor 114 may include depth data providing a depth map and intensity data providing an intensity image of the field-of-view 116 of the image sensor 114. At least a portion of the three-dimensional image data received by the one or more non-transitory, machine-readable storage media 118 is communicated to or otherwise accessed by the one or more processors 120 in order to select one or more geometric primitives 104 preparatory to fitting a first three-dimensional packaging wireframe model 106 about all or a portion of the first three-dimensional object 102.

At 204, based in whole or in part on the three-dimensional image data received from the image sensor 114, the one or more processors 120 determine a number of features on the first three-dimensional object 102 contained in the three-dimensional image data. The features may include any point, edge, or other discernible structure on the first three-dimensional object 102 and detectible in the image represented by the three-dimensional image data. For example, one or more features may correspond to a three-dimensional point on the three-dimensional object 102 that is detectible in a depth map containing the first three-dimensional object, an intensity image in which the three-dimensional object, or both a depth map and an intensity image in which the first three-dimensional object 102 appears as is represented. The identified features may include boundaries or defining edges of the first three-dimensional object, for example corners, arcs, lines, edges, angles, radii, and similar characteristics that define all or a portion of the external boundary of the first three-dimensional object 102.

At 206, based at least in part on the features identified in 204 the one or more processors 120 selects one or more geometric primitives 104 from the library. The one or more processors 120 use the selected one or more geometric primitives 104 to roughly represent the packaging encompassing first three-dimensional object 102 making allowances for any specialized packing instructions (e.g., fragile surfaces, extra packing, unusual packing shapes, etc.) that may have been provided by the user. The one or more processors 120 fit a three-dimensional packaging wireframe model 106 about all or a portion of the first three-dimensional object 102 that encompasses substantially all of the processor identified features defining an external boundary of the first three-dimensional object 102 and reflecting any specialized packing instructions provided by the user.

For example, where the first three-dimensional object 102 is a cube, the one or more processors 120 may identify seven or more features (e.g., four defining the corners of one face of the cube, two additional defining the corners of a second face of the cube and one defining the fourth corner of the top of the cube). The user may have identified one surface of the cube as requiring "extra packaging." Based on these identified features and the user's specialized packing instructions, the one or more processors 120 may select a rectangular prismatic geometric primitive 104 accommodating the cubic three-dimensional object 102 and the extra packaging requirements identified by the user and use the selected rectangular prismatic geometric primitive 104 to fit a first three-dimensional packaging wireframe model 106 that substantially encompasses the cubic first three-dimensional object 102 and the associated packaging surrounding the object.

In another example, the first three-dimensional object 102 may be a cylinder and the one or more processors 120 may identify a number of features about the face and defining the height of the cylinder. Based on these identified features, the one or more processors 120 may select a cylindrical geometric primitive 104 and use the selected geometric primitive to fit a first three-dimensional packaging wireframe model 106 to the cylindrical first three-dimensional object 102 that substantially encompasses the object and includes an allowance for packaging materials about the cylindrical three-dimensional object 102.

Based at least in part on the identified features, the one or more processors 120 may search the library for one or more geometric primitives 104 having features, points, or nodes substantially similar to the spatial arrangement of the identified features, points, or nodes associated with the first three-dimensional object 102. In searching the library, the one or more processors may use one or more appearance-based or feature-based shape recognition or shape selection methods. For example a "large modelbases" appearance-based method using eigenfaces may be used to select geometric primitives 104 appropriate for fitting to the first three-dimensional object 102.

At 208, the one or more processors 120 can generate a video, image, or display output that includes data providing an image of the first three-dimensional packaging wireframe model 106 as fitted to the first three-dimensional object 102. The video, image, or display output data provided by the one or more processors 120 may be used by the one or more CPUs 160 to generate one or more video, image, or display outputs on the one or more display devices 156 that includes one or more images providing the concurrent or simultaneous depiction of the first three-dimensional object 102 using image data from the camera 152 and the fitted first three-dimensional packaging wireframe model 106. In some instances, an image concurrently or simultaneously depicting the geometric primitive 104 fitted to the first three-dimensional object 102 along with the first three-dimensional packaging wireframe model 106 fitted thereto may also be provided on the one or more display devices 156.

Figure 3:
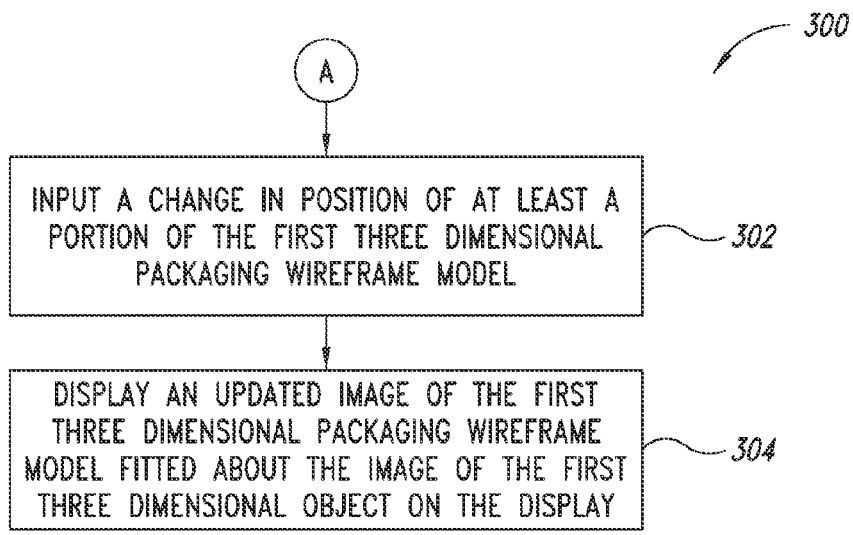
FIG. 3 is an example volume dimensioning method based on the method depicted in FIG. 2 and including receipt of a corrected first three-dimensional packaging wireframe model.

FIG. 3 shows a method 300 extending from the method 200 and describing one or more additional features of an example volume dimensioning system 100, such as the system depicted in FIGS. 1A and 1B. For various reasons, the first three-dimensional packaging wireframe model 106 fitted by the one or more processors 120 may not properly encompass the first three-dimensional object 102. For example, where the first three-dimensional object is a box, one face of the first three-dimensional packaging wireframe model 106 generated by the one or more processors 120 may be situated in too close proximity to the three-dimensional object 102 to permit the insertion of adequate padding between the three-dimensional object 102 and the shipping box. Such incorrectly positioned or sized three-dimensional packaging wireframe models 106 may result in erroneous shipping rate information or erroneous packing information.

Therefore, providing a process to correct the shape, size, or position of all or a portion of the three-dimensional packaging wireframe model 106 is advantageous to both the user and the carrier.

At 302, the one or more processors 120 receive an input indicative of a desired change at least a portion of the first three-dimensional packaging wireframe model 106. The change in position of the first three-dimensional packaging wireframe model 106 may include a change to a single point, multiple points, or even a scalar, arc, curve, face, or line linking two or more points used by the one or more processors 120 to fit the three-dimensional packaging wireframe model 106. The one or more processors 120 may receive the input via an I/O device 166 such as a mouse or keyboard, or in a preferred embodiment via a resistive or capacitive touch-based input device which is part of a touch-screen display device 156 communicably connected to the host computer system 150. The use of a touch-screen display device 114 advantageously enables a user to visually align all or a portion of the first three-dimensional packaging wireframe model 106 with all or a corresponding portion of the image of first three-dimensional object 102 in an intuitive and easy to visualize manner. In some embodiments, a prior input received by the one or more processors 120 may be used to place the system 100 in a mode where a subsequent input indicating the desired change to the three-dimensional packaging wireframe model 106 will be provided to the one or more processors 120.

At 304, the one or more processors 120 can generate a video, image, or display data output that includes image data of the modified or updated first three-dimensional packaging wireframe model 106 as fitted to the first three-dimensional object 102. The video, image, or display output data provided by the one or more processors 120 may be used by the one or more CPUs 160 to generate one or more video, image, or display outputs on the one or more display devices 156 that includes an image contemporaneously or simultaneously depicting the first three-dimensional object 102 using image data from the camera 152 and the first three-dimensional packaging wireframe model 106 data as fitted by the one or more processors 120. In some instances, an image concurrently or simultaneously depicting the first three-dimensional object 102 along with the one or more scaled and fitted geometric primitives 104 and the first three-dimensional packaging wireframe model 106 may also be provided on the one or more display devices 156.

Figure 4:
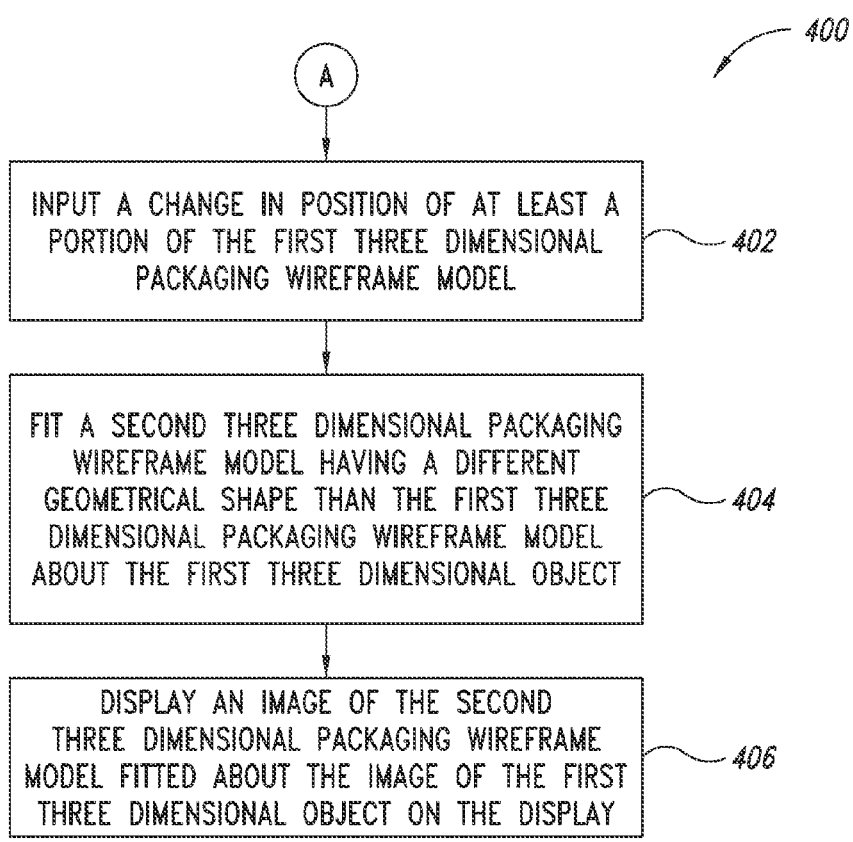
FIG. 4 is an example volume dimensioning method based on the method depicted in FIG. 2 and including selection of a second three-dimensional packaging wireframe model to replace the first three-dimensional packaging wireframe model.

FIG. 4 shows a method 400 extending from the method 200 and describing one or more additional features of an example volume dimensioning system 100, such as the system depicted in FIGS. 1A and 1B. For various reasons, the first three-dimensional packaging wireframe model 106 fitted by the one or more processors 120 may not properly encompass the first three-dimensional object 102 and in fact, the first three-dimensional packaging wireframe model 106 as fitted by the one or more processors 120 may require significant modification or replacement to substantially conform to both the first three-dimensional object 102 and any associated specialized shipping requirements provided by the user.

For example, where the first three-dimensional object 102 is a cylindrical object, a cylindrical geometric primitive 104 may be selected by the one or more processors 120, resulting in a cylindrical first three-dimensional packaging wireframe model 106. Perhaps the user has triangular shaped padding that will be used to pad and center the cylindrical object in the center of a rectangular shipping container. In response to an input indicative of a desired change in a position of at least a portion of the first three-dimensional packaging wireframe model 106, the one or more processors 120 may select a second geometric primitive 104, for example a rectangular prismatic geometric primitive, and fit a more appropriate second three-dimensional packaging wireframe model 106 to replace the previously fitted first three-dimensional packaging wireframe model 106.

At 402, the one or more processors 120 receive an input indicative of a desired change to at least a portion of the first three-dimensional packaging wireframe model 106 fitted to the three-dimensional object 102. The input may specify one or more of a single point, multiple points, or even a scalar, arc, curve, face, or line linking two or more points used by the one or more processors 120 to fit the three-dimensional packaging wireframe model 106. The one or more processors 120 may receive the input via an I/O device 166 such as a mouse or keyboard, or in a preferred embodiment via a resistive or capacitive touch-based input device which is part of a touch-screen display device 156 communicably connected to the host computer system 150. The use of a touch-screen display device 114 advantageously enables a user to visually align all or a portion of the first three-dimensional packaging wireframe model 106 with all or a corresponding portion of the image of the first three-dimensional object 102 in an intuitive and easy to visualize manner. In some embodiments, a prior input received by the one or more processors 120 may be used to place the system 100 in a mode where a subsequent input indicating the desired change to the three-dimensional packaging wireframe model 106 will be provided to the one or more processors 120.

At 404, responsive to the input the one or more processors 120 may select from the library one or more second geometric primitives 104 that are different from the first geometric primitive 104 and fit the second three-dimensional packaging wireframe 106 model using the second geometric primitive 104 to substantially encompass the first three-dimensional object 102. For example, where the one or more processors 120 detect from the input that a cylindrical three-dimensional packaging wireframe model 106 is being changed to a rectangular prismatic three-dimensional packaging wireframe model 106, the one or more processors 120 may alternatively select a second geometric primitive 104 corresponding to a rectangular prism from the library to fit the second three-dimensional packaging wireframe model 106 to the first three-dimensional object 102.

At 406, the one or more processors 120 can generate a video, image, or display data output that includes image data of the second three-dimensional packaging wireframe model 106 as fitted to the first three-dimensional object 102. The video, image, or display output data provided by the one or more processors 120 may be used by the one or more CPUs 160 to generate one or more video, image, or display outputs on the one or more display devices 156 that includes an image contemporaneously or simultaneously depicting the first three-dimensional object 102 using image data from the camera 152 and the second three-dimensional packaging wireframe model 106 data as fitted by the one or more processors 120. In some instances, an image concurrently or simultaneously depicting the first three-dimensional object 102 along with the one or more scaled and fitted second geometric primitives 104 and the first three-dimensional packaging wireframe model 106 may also be provided on the one or more display devices 156.

Figure 5:
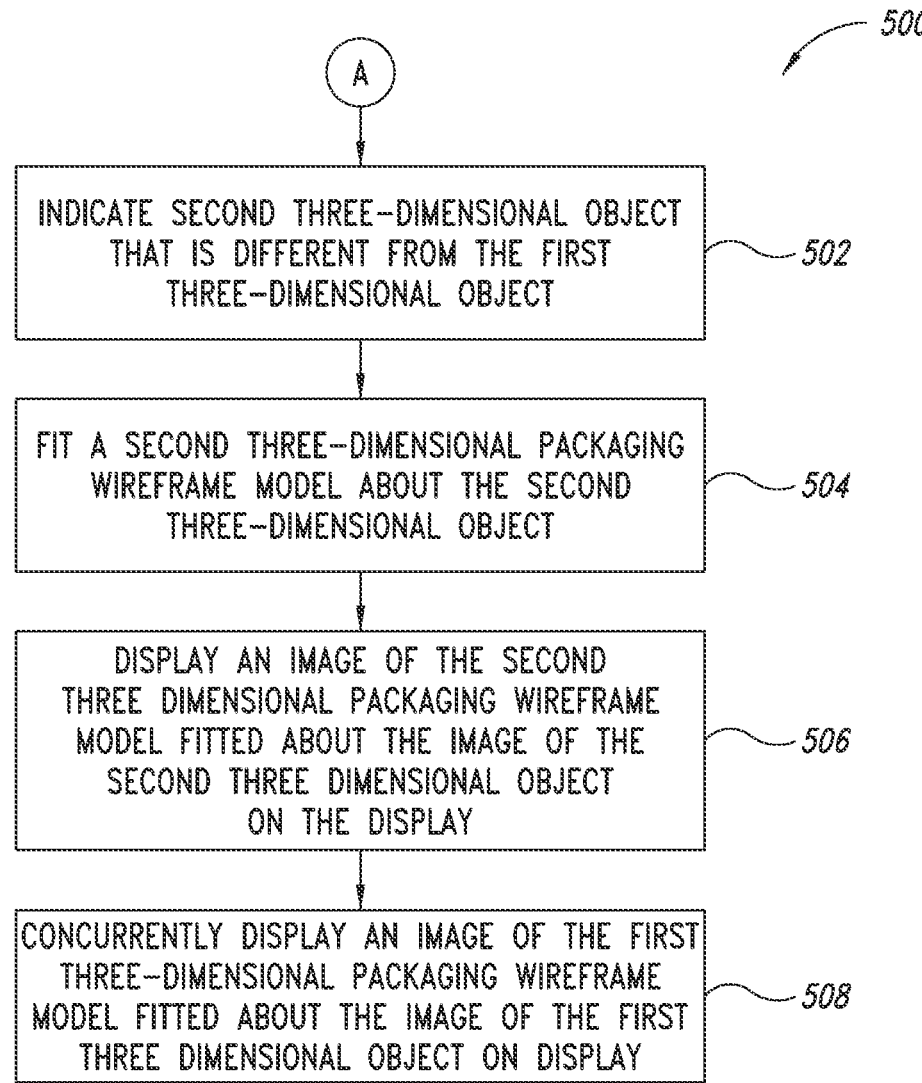
FIG. 5 is an example volume dimensioning method based on the method depicted in FIG. 2 and including fitting a first three-dimensional packaging wireframe model about a first three-dimensional object and fitting a second three-dimensional packaging wireframe model about a second three-dimensional object.

FIG. 5 shows a method 500 extending from the method 200 and describing one or more additional features of an example volume dimensioning system 100, such as the system depicted in FIGS. 1A and 1B. As depicted in FIG. 1A, at times a second three-dimensional object 102 may be present in the field-of-view 116 of the image sensor 114. For various reasons, the second three-dimensional object 102 may not be detected by the one or more processors 120 and consequently a second three-dimensional packaging wireframe model 106 may not be fitted about the second three-dimensional object 102 by the one or more processors 120. In such an instance, one or more second geometric primitives 104 can be selected by the one or more processors 120 and used to fit a second three-dimensional packaging wireframe model 106 to the second three-dimensional object 102 based at least in part upon the receipt of an input by the one or more processors 120 indicating the existence of the second three-dimensional object 102.

At 502, the one or more processors 120 receive an input that indicates a second three-dimensional object 102 exists within the field-of-view 116 of the image sensor 114. The one or more processors 120 may receive the input via an I/O device 166 such as a mouse or keyboard, or in a preferred embodiment via a resistive or capacitive touch-based input device which is part of a touch-screen display device 156 communicably connected to the host computer system 150. The use of a touch-screen display device 114 advantageously enables a user to draw a perimeter around or otherwise clearly delineate the second three-dimensional object 102. In some embodiments, a prior input received by the one or more processors 120 may be used to place the system 100 in a mode where a subsequent input indicating the second three-dimensional object 102 will be provided to the one or more processors 120. Responsive to the input indicating the existence of a second three-dimensional object 102 within the field-of-view 116 of the image sensor 114, the one or more processors 120 may detect additional three-dimensional features associated with the second three-dimensional object 102.

At 504, based at least in part on the three-dimensional features identified in 502, the one or more processors 120 may select from the library one or more second geometric primitives 104 to provide representation of the packaging encompassing the second three-dimensional object 102. The one or more processors 120 fit a second three-dimensional packaging wireframe model 106 about the second three-dimensional object 102 that is responsive to any specialized instructions received from the user and encompasses substantially all the three-dimensional features of the second three-dimensional object 102 identified by the one or more processors 120 at 502.

At 506, the one or more processors 120 can generate a video, image, or display data output that includes image data of the second three-dimensional packaging wireframe model 106 as fitted to the virtual representation of the second three-dimensional object 104. The video, image, or display output data provided by the one or more processors 120 may be used by the one or more CPUs 160 to generate one or more video, image, or display outputs to the one or more display devices 156 that includes image data depicting an image of the second three-dimensional object 102 using image data from the camera 152 along with the fitted second three-dimensional packaging wireframe model 106 provided by the one or more processors 120. In some instances, an image concurrently or simultaneously depicting the second three-dimensional object 102 along with the one or more scaled and fitted second geometric primitives 104 and the second three-dimensional packaging wireframe model 106 may also be provided on the one or more display devices 156.

At 508, the one or more processors 120 can generate a video, image, or display data output that includes image data of the first three-dimensional packaging wireframe model 106 as fitted to the first three-dimensional object 102. The video, image, or display output data provided by the one or more processors 120 may be used by the one or more CPUs 160 to generate one or more video, image, or display outputs on the one or more display devices 156 that includes an image contemporaneously or simultaneously depicting images of the first and second three-dimensional objects 102 using image data from the camera 152 along with the respective first and second three-dimensional packaging wireframe models 106 fitted by the one or more processors 120. In some instances, an image concurrently or simultaneously depicting the first and second three-dimensional objects 102 along with the one or more scaled and fitted first and second geometric primitives 104 and the first and second three-dimensional packaging wireframe models 106 may also be provided on the one or more display devices 156.

Figure 6:
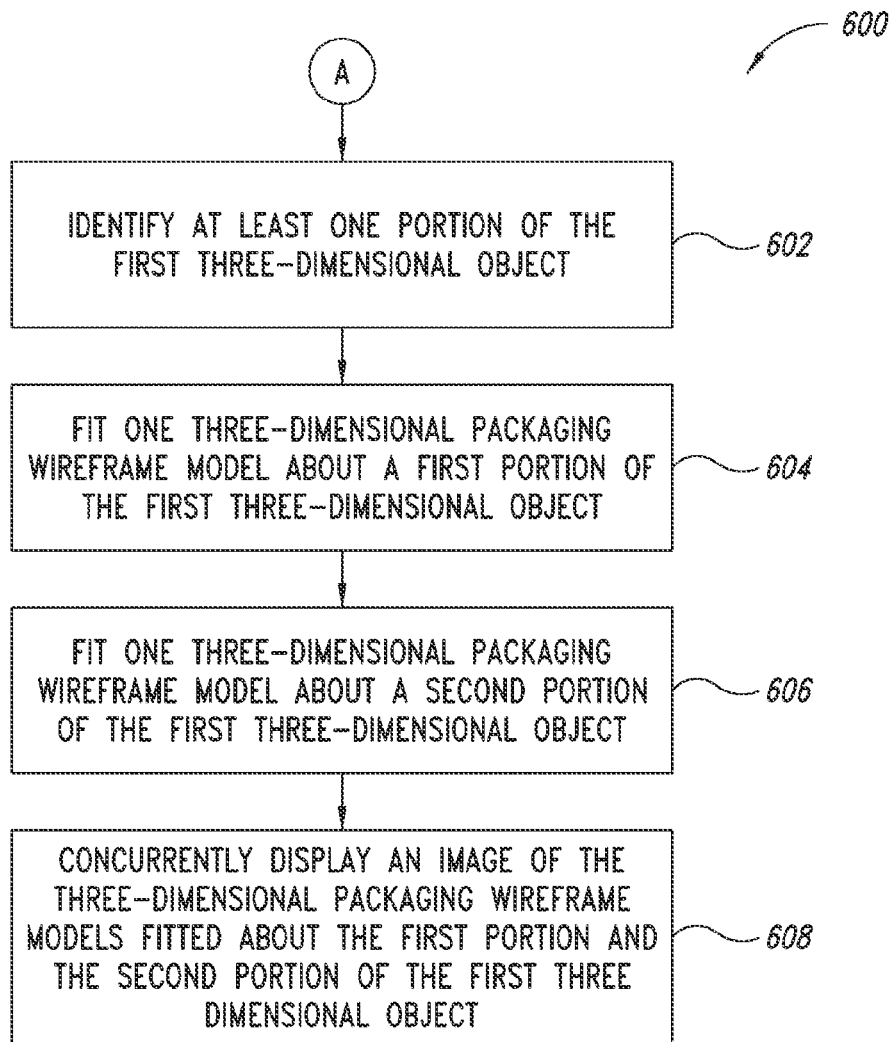
FIG. 6 is an example volume dimensioning method based on the method depicted in FIG. 2 and including fitting a three-dimensional packaging wireframe model about a first portion of a first three-dimensional object and fitting a three-dimensional packaging wireframe model about a second portion of the first three-dimensional object.

FIG. 6 shows a method 600 extending from method 200 and describing one or more additional features of an example volume dimensioning system 100, such as the system depicted in FIGS. 1A and 1B. In some situations, the first three-dimensional object 102 may have a complex or non-uniform shape that, when virtually represented as a plurality of geometric primitives 104, is best fitted using a corresponding plurality of three-dimensional packaging wireframe models 106. For instance, one three-dimensional packaging wireframe model 106 may be fitted to a first portion of a three-dimensional object 102 and another three-dimensional packaging wireframe model 106 may be fitted to a second portion of the three-dimensional object 102.

For example, rather than fitting a single three-dimensional packaging wireframe model 106 about a guitar-shaped three-dimensional object 102, a more accurate three-dimensional packaging wireframe model 106 may incorporate a plurality wireframe models 106, such as a first three-dimensional packaging wireframe model 106 fitted to the body portion of the guitar-shaped object and a second three-dimensional packaging wireframe model 106 fitted to the neck portion of the guitar-shaped object may provide a more accurate three-dimensional packaging wireframe model 106 for the entire guitar-shaped object. Fitting of multiple three-dimensional packaging wireframe models 106 may be performed automatically by the one or more processors 120, or performed responsive to the receipt of a user input indicating that a plurality of three-dimensional packaging wireframe models should be used. Providing a user with the ability to designate the use of three-dimensional packaging wireframe models 106 about different portions of a single three-dimensional object 102 may provide the user with a more accurate freight rate estimate based upon the actual configuration of the object and may provide the carrier with a more accurate shipping volume.

At 602, the one or more processors 120 receive an input that identifies a portion of the first three-dimensional object 102 that may be represented using a separate three-dimensional packaging wireframe model 106. Using the example of a guitar, the user may provide an input that when received by the one or more processors 120, indicates the neck of the guitar is best fitted using separate three-dimensional packaging wireframe model 106. The one or more processors 120 may receive the input via an I/O device 166 such as a mouse or keyboard, or in a preferred embodiment via a resistive or capacitive touch-based input device which is part of a touch-screen display device 156 communicably connected to the host computer system 150. The use of a touch-screen display device 114 advantageously enables a user to draw a perimeter or otherwise clearly delineate the portion of the first three-dimensional object 102 for which one or more separate geometric primitives 104 may be selected and about which a three-dimensional packaging wireframe model 106 may be fitted by the one or more processors 120. In some embodiments, a prior input received by the one or more processors 120 may be used to place the system 100 in a mode where a subsequent input indicating the portion of the first three-dimensional object 102 suitable for representation by a separate three-dimensional packaging wireframe model 106 will be provided as an input to the one or more processors 120.

At 604, responsive at least in part to the input indicating the portion of the first three-dimensional object 102 suitable for representation as a separate three-dimensional packaging wireframe model 106, the one or more processors 120 can select one or more geometric primitives 104 encompassing the first portion of the first three-dimensional object 102. Based on the one or more selected geometric primitives 104, the one or more processors 120 fit a three-dimensional packaging wireframe model 106 about the first portion of the three-dimensional object 102. Continuing with the illustrative example of a guitar—the one or more processors 120 may receive an input indicating the user's desire to represent the neck portion of the guitar as a first three-dimensional packaging wireframe model 106. Responsive to the receipt of the input selecting the neck portion of the guitar, the one or more processors 120 select one or more appropriate geometric primitives 104, for example a cylindrical geometric primitive, and fit a cylindrical three-dimensional packaging wireframe model 106 that encompasses the first portion of the first three-dimensional object 102 (i.e., the neck portion of the guitar).

At 606, the one or more processors 120 select one or more geometric primitives 104 encompassing the second portion of the first three-dimensional object 102. Based on the one or more selected geometric primitives 104, the one or more processors 120 fit a three-dimensional packaging wireframe model 106 about the second portion of the first three-dimensional object 102. The separate three-dimensional packaging wireframe model 106 fitted to the second portion may be the same as, different from, or a modified version of the three-dimensional packaging wireframe model 106 fitted to the first portion of the three-dimensional object 102.

Continuing with the illustrative example of a guitar the single, three-dimensional packaging wireframe model 106 originally fitted by the one or more processors 120 to the entire guitar may have been in the form of a rectangular three-dimensional packaging wireframe model 106 encompassing both the body portion and the neck portion of the guitar. After fitting the cylindrical three-dimensional packaging wireframe model 106 about the first portion of the first three-dimensional object 102 (i.e., the neck of the guitar), the one or more processors 120 may reduce the size of the originally fitted, rectangular, three-dimensional packaging wireframe model 106 to a rectangular three-dimensional packaging wireframe model 106 fitted about the second portion of the first three-dimensional object 104 (i.e., the body of the guitar).

At 608, the one or more processors 120 can generate a video, image, or display data output that includes image data of the three-dimensional packaging wireframe models 106 fitted to the first and second portions of the first three-dimensional object 102. The video, image, or display output data provided by the one or more processors 120 may be used by the one or more CPUs 160 to generate one or more video, image, or display outputs on the one or more display devices 156 including an image concurrently or simultaneously depicting the first and second portions of the first three-dimensional object 102 using image data from the camera 152 and the respective three-dimensional packaging wireframe models 106 fitted to each of the first and second portions by the one or more processors 120. In some instances, an image concurrently or simultaneously depicting the first and second portions of the first three-dimensional object 102 along with their respective one or more scaled and fitted geometric primitives 104 and their respective three-dimensional packaging wireframe models 106 may also be provided on the one or more display devices 156.

Figure 7:
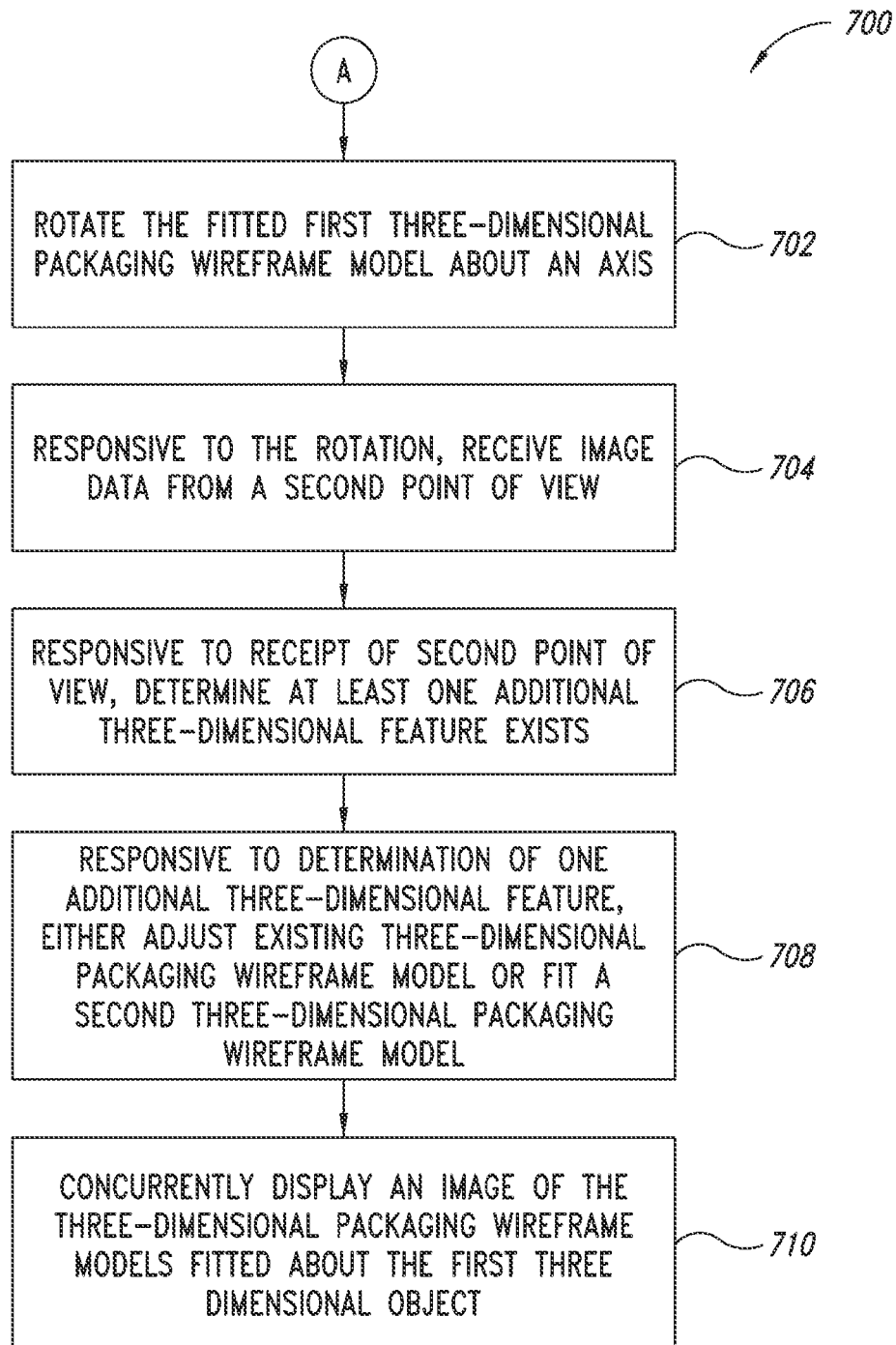
FIG. 7 is an example volume dimensioning method based on the method depicted in FIG. 2 and including rotation of the first three-dimensional packaging wireframe model to detect the existence of additional three-dimensional features of the three-dimensional object and adjustment of the first three-dimensional packaging wireframe model or addition of a second three-dimensional packaging wireframe model to encompass the additional three-dimensional features.

FIG. 7 shows a method 700 extending from method 200 and describing one or more additional features of an example volume dimensioning system 100, such as the system depicted in FIGS. 1A and 1B. In some situations, one or more features present on the first three-dimensional object 102 may not be visible from the point of view of the image sensor 114. For example, a protruding feature may lie on a portion of the three-dimensional object 102 facing away from the image sensor 114 such that substantially all of the feature is hidden from the image sensor 114. In such instances, a failure to incorporate the hidden feature may result in erroneous or inaccurate rate information being provided to a user or erroneous or inaccurate packing dimensions or volumes being provided to the carrier.

In such instances, obtaining image data from a second point of view that includes the previously hidden or obscured feature will permit the one or more processors 120 to select one or more geometric primitives 104 fitting the entire three-dimensional object 102 including the features hidden in the first point of view. By encompassing all or the features within the one or more geometric primitives 104, the one or more processors 120 are able to fit the first three-dimensional packaging wireframe model 106 about the entire first three-dimensional object 102 or alternatively, to add a second three-dimensional packaging wireframe model 106 incorporating the portion of the first three-dimensional object 102 that was hidden in the first point of view of the image sensor 114.

At 702, after fitting the first three-dimensional packaging wireframe model 106 to the first three-dimensional object 102, the one or more processors 120 rotate the fitted three-dimensional packaging wireframe model 106 about an axis to expose gaps in the model or to make apparent any features absent from the model but present on the first three-dimensional object 102. In some situations, the volume dimensioning system 110 may provide a video, image, or display data output to the host computer 150 providing a sequence or views of the fitted first three-dimensional packaging wireframe model 106 such that the first three-dimensional packaging wireframe model 106 appears to rotate about one or more axes when viewed on the one or more display devices 156.

Responsive to the rotation of the first three-dimensional packaging wireframe model 106 on the one or more display devices 156, the system 100 can generate an output, for example a prompt displayed on the one or more display devices 156, requesting a user to provide an input confirming the accuracy of or noting any deficiencies present in the first three-dimensional packaging wireframe model 106.

At 704, additional image data in the form of a second point of view of the first three-dimensional object 102 that exposes the previously hidden or obscured feature on the first three-dimensional object 102 may be provided to the one or more processors 120. Image data may be acquired or captured from a second point of view in a variety of ways. For example, in some instances, the image sensor 114 may be automatically or manually displaced about the first three-dimensional object 102 to provide a second point of view that includes the previously hidden feature. Alternatively or additionally, a second image sensor (not shown in FIGS. 1A, 1B) disposed remote from the system 100 may provide a second point of view of the first three-dimensional object 102. Alternatively or additionally, the system 100 may generate an output, for example an output visible on the one or more display devices 156 providing guidance or directions to the user to physically rotate the first three-dimensional object 102 to provide a second point of view to the image sensor 114. Alternatively or additionally, the system 100 may generate a signal output, for example a signal output from the host computer 150 that contains instructions to automatically rotate a turntable upon which the first three-dimensional object 102 has been placed to provide a second point of view of the first three-dimensional object 102 to the image sensor 114.

At 706, responsive to the receipt of image data from the image sensor as viewed from the second point of view of the first three-dimensional object 102, the one or more processors 120 can detect a portion of the first three-dimensional object 102 that was hidden in the first point of view. Such detection can be accomplished, for example by tracking the feature points on the first three-dimensional object 102 visible in the first point of view as the first point of view is transitioned to the second point of view. Identifying new feature points appearing in the second point of view that were absent from the first point of view provide an indication to the one or more processors 120 of the existence of a previously hidden or obscured portion or feature of the first three-dimensional object 102.

At 708, responsive to the detection of the previously hidden or obscured portion or feature of the first three-dimensional object 102, the one or more processors 120 can modify one or more originally selected geometric primitives 140 (e.g., by stretching the geometric primitive 104) to incorporate the previously hidden or obscured feature, or alternatively can select one or more second geometric primitives 104 that when combined with the one or more previously selected geometric primitives 104 encompasses the previously hidden or obscured feature on the first three-dimensional object 102.

In some instances, the one or more processors 120 may modify the one or more originally selected geometric primitives 104 to encompass the feature hidden or obscured in the first point of view, but visible in the second point of view. The three-dimensional packaging wireframe model 106 can then be scaled and fitted to the modified originally selected geometric primitive 104 to encompass the feature present on the first three-dimensional object 102. For example, a first three-dimensional packaging wireframe model 106 may be fitted to a rectangular prismatic three-dimensional object 102, and a hidden feature in the form of a smaller rectangular prismatic solid may be located on the rear face of the rectangular prismatic three-dimensional object 102. The one or more processors 120 may in such a situation, modify the originally selected geometric primitive 104 to encompass the smaller rectangular prismatic solid. The one or more processors 120 can then scale and fit the first three-dimensional packaging wireframe model 106 to encompass the entire first three-dimensional object 102 by simply modifying, by stretching, the originally fitted rectangular three-dimensional packaging wireframe model 106.

In other instances, the one or more processors 120 may alternatively select one or more second geometric primitives 104 to encompass the smaller rectangular solid feature and fit a second three-dimensional packaging wireframe model 106 to the second geometric primitive 104. For example, when the three-dimensional object 102 is a guitar-shaped object, the first point of view, may expose only the body portion of the guitar-shaped object to the image sensor 114 while the neck portion remains substantially hidden from the first point of view of the image sensor 114. Upon receiving image data from the second point of view, the one or more processors 120 can detect an additional feature that includes the neck portion of the guitar-shaped object. In response, the one or more processors 120 may select a second geometric primitive 104 and use the selected second geometric primitive 104 to fit a second three-dimensional packaging wireframe model 106 about the neck portion of the guitar-shaped object.

At 710, the one or more processors 120 can generate a video, image, or display data output that includes image data of the one or more three-dimensional packaging wireframe models 106 fitted to the first three-dimensional object 102, including features visible from the first and second points of view of the image sensor 114. The video, image, or display output data provided by the one or more processors 120 may be used by the one or more CPUs 160 to generate one or more video, image, or display outputs on the one or more display devices 156 that includes an image concurrently or simultaneously displaying the first three-dimensional object 102 using image data from the camera 152 and the one or more three-dimensional packaging wireframe models 106 fitted to respective portions of the first three-dimensional object 102 by the one or more processors 120. In some instances, an image concurrently or simultaneously depicting the first and second portions of the first three-dimensional object 102 along with one or more geometric primitives 104 and the scaled and fitted three-dimensional packaging wireframe model 106 may also be provided on the one or more display devices 156.

Figure 8:
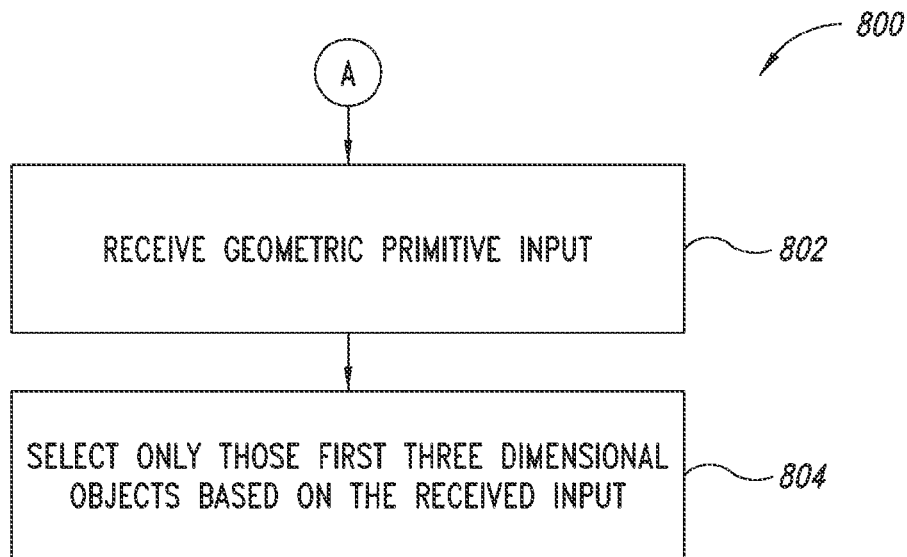
FIG. 8 is an example volume dimensioning method based on the method depicted in FIG. 2 and including receipt of an input including a geometric primitive and selection of three-dimensional objects within the point of view of the image sensor that are substantially similar to or match the received geometric primitive input.

FIG. 8 shows a method 800 extending from method 200 and describing one or more additional features of an example volume dimensioning system 100, such as the system depicted in FIGS. 1A and 1B. The field-of-view 116 of the image sensor 114 may contain a multitude of potential first three-dimensional objects 102, yet the only three-dimensional objects of interest to a user may have a particular size or shape. For example, the field-of-view 116 of the image sensor 114 may be filled with a three bowling balls and a single box which represents the desired first three-dimensional object 102. In such an instance, the one or more processors 120 may select four geometric primitives 104—three associated with the bowling balls and one associated with the box and fit three-dimensional packaging wireframe models 106 to each of the three bowling balls and the single box. Rather than laboriously deleting the three spherical wireframes fitted to the bowling balls, in some embodiments, the one or more processors 120 may receive an input designating a particular geometric primitive shape as indicating the desired first three-dimensional object 102 within the field-of-view 116 of the image sensor 114.

In the previous example, the one or more processors 120 may receive an input indicating a rectangular prismatic geometric primitive as designating the particular shape of the desired first three-dimensional object. This allows the one or more processors 120 to automatically eliminate the three bowling balls within the field-of-view of the image sensor 114 as potential first three-dimensional objects 102. Such an input, when received by the one or more processors 120 effectively provides a screen or filter for the one or more processors 120 eliminating those three-dimensional objects 102 having geometric primitives not matching the indicated desired geometric primitive received by the one or more processors 120.

At 802, the one or more processors 120 receive an input indicative of a desired geometric primitive 104 useful in selecting, screening, determining or otherwise distinguishing the first three-dimensional object 102 from other objects that are present in the field-of-view 116 of the image sensor 114. The one or more processors 120 may receive the input via an I/O device 166 such as a mouse or keyboard, or in a preferred embodiment via a resistive or capacitive touch-based input device which is part of a touch-screen display device 156 communicably connected to the host computer system 150. In some instances, text or graphical icons indicating various geometric primitive shapes may be provided in the form of a list, menu, or selection window to the user.

At 804, responsive to the receipt of the selected geometric primitive 104, the one or more processors 120 search through the three-dimensional objects 102 appearing in the field-of-view 116 of the image sensor 114 to locate only those first three-dimensional objects 102 having a shape that is substantially similar to or matches the user selected geometric primitive 104.

Figure 9:
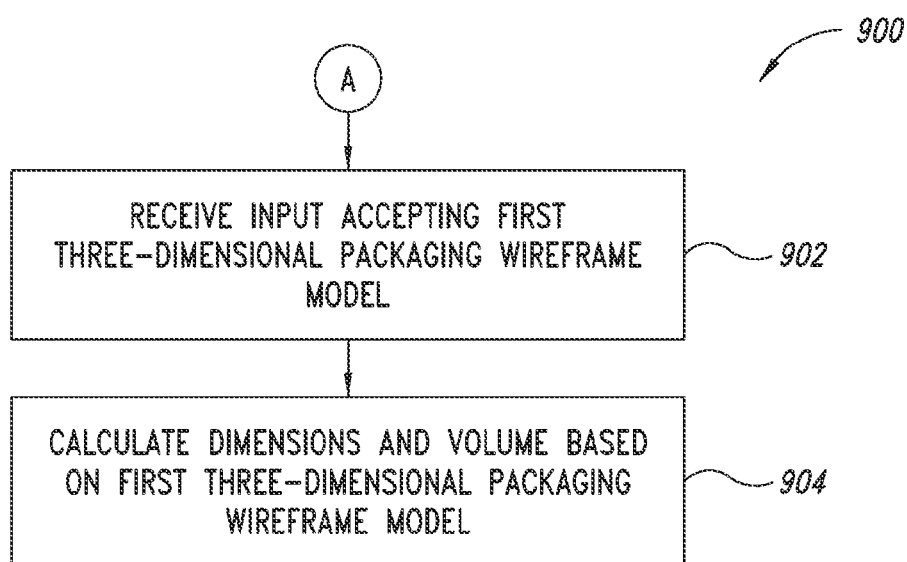
FIG. 9 is an example volume dimensioning method based on the method depicted in FIG. 2 and including acceptance of the fitted first three-dimensional packaging wireframe model and calculation of the dimensions and the volume of the first three-dimensional packaging wireframe model.

FIG. 9 shows a method 900 extending from method 200 and describing one or more additional features of an example volume dimensioning system 100, such as the system depicted in FIGS. 1A and 1B. After fitting the first three-dimensional packaging wireframe model 106 to the first three-dimensional object 102, the one or more processors 120 can determine the packaging dimensions and the volume of the first three-dimensional object 102 responsive to receipt of an input indicative of user acceptance of the fitted first three-dimensional packaging wireframe model 106. The calculated packing dimensions are based on dimensional and volumetric information acquired from the fitted first three-dimensional packaging wireframe model 106 and reflect not only the dimensions of the three-dimensional object 102 itself, but also include any additional packaging, boxing, crating, etc., necessary to safely and securely ship the first three-dimensional object 102.

At 902, the one or more processors 120 receive an input indicative of user acceptance of the first three-dimensional packaging wireframe model 106 fitted to the first three-dimensional object 102 by the one or more processors 120. The one or more processors 120 can generate a video, image, or display data output that includes image data of the three-dimensional packaging wireframe model 106 after scaling and fitting to the first three-dimensional object 102, and after any modifications necessary to accommodate any specialized shipping instructions provided by the user.

The video, image, or display output data provided by the one or more processors 120 may be used by the one or more CPUs 160 to generate one or more video, image, or display outputs on the one or more display devices 156 including image data depicting a simultaneous or concurrent image of the first three-dimensional object 102 using image data from the camera 152 and the three-dimensional packaging wireframe model 106 fitted to the first three-dimensional object 102 by the one or more processors 120. In some instances, an image concurrently or simultaneously depicting the first three-dimensional object 102 along with one or more scaled and fitted geometric primitives 104 and the scaled and fitted three-dimensional packaging wireframe model 106 may also be provided on the one or more display devices 156.

Responsive to the display of at least the first three-dimensional object 102 and the first three-dimensional packaging wireframe model 106, the system 100 may generate a signal output, for example a signal output from the host computer 150 containing a query requesting the user provide an input indicative of an acceptance of the fitting of the first three-dimensional packaging wireframe model 106 to the first three-dimensional object 102.

At 904, responsive to user acceptance of the fitting of the first three-dimensional packaging wireframe model 106 to the first three-dimensional object 102, the one or more processors 120 determine the dimensions and calculate the volume of the first three-dimensional object 102 based at least in part on the three-dimensional packaging wireframe model 106. Any of a large variety of techniques or algorithms for determining a volume of a bounded three-dimensional surface may be employed by the system 100 to determine the dimensions or volume of the first three-dimensional object 102.

Figure 10:
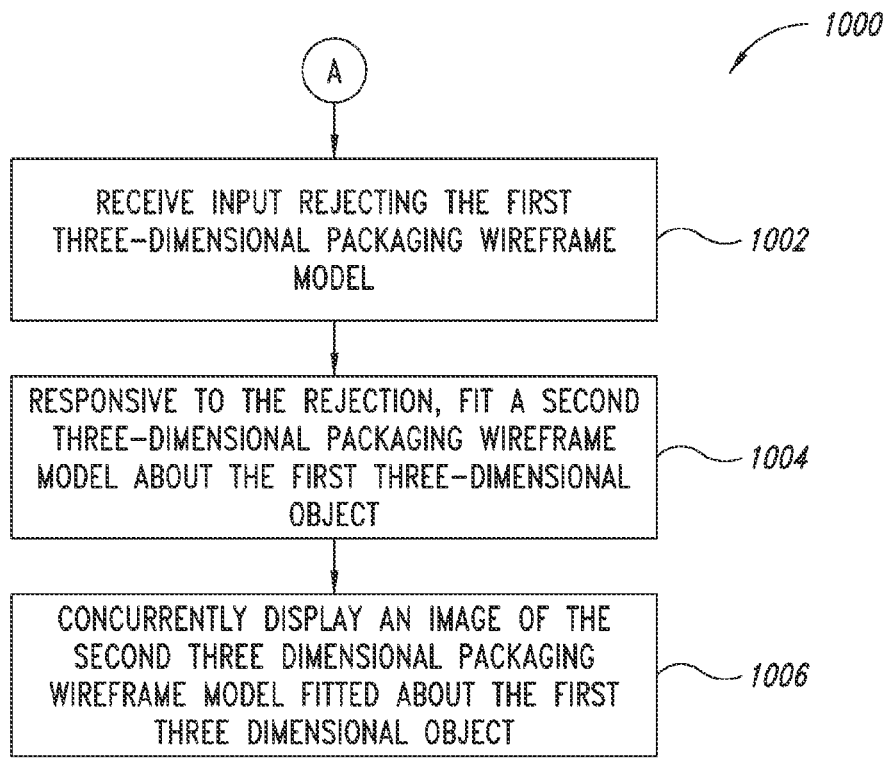
FIG. 10 is an example volume dimensioning method based on the method depicted in FIG. 2 and including receipt of an input rejecting the first three-dimensional packaging wireframe model fitted to the three-dimensional object and selection and fitting of a second three-dimensional packaging wireframe model to the first three-dimensional object.

FIG. 10 shows a method 1000 extending from method 200 and describing one or more additional features of an example volume dimensioning system 100, such as the system depicted in FIGS. 1A and 1B. In some instances, the one or more processors 120 may select one or more inapplicable geometric primitives 104 or improperly fit a first three-dimensional packaging wireframe model 106 about the first three-dimensional object 102. In such an instance, rather than modify the first three-dimensional packaging wireframe model 106, a more expeditious solution may be to delete the first three-dimensional packaging wireframe model 106 fitted by the one or more processors 120 in its entirety and request the one or more processors 120 to select one or more different geometric primitives 104 and fit a second three-dimensional packaging wireframe model 106 about the first three-dimensional object 102.

At 1002, the one or more processors 120 receive an input indicative of a rejection of the first three-dimensional packaging wireframe model 106 fitted by the one or more processors 120 about the first three-dimensional object 102. The one or more processors 120 may receive the input via an I/O device 166 such as a mouse or keyboard, or in a preferred embodiment via a resistive or capacitive touch-based input device which is part of a touch-screen display device 156 communicably connected to the host computer system 150.

At 1004, responsive to the receipt of the rejection of the first three-dimensional packaging wireframe model 106 fitted about the first three-dimensional object 102, the one or more processors 120 select one or more second geometric primitives 104 and, based on the one or more second selected geometric primitives 104, fit a second three-dimensional packaging wireframe model 106 about the first three-dimensional object 102.

At 1006, the one or more processors 120 can generate a video, image, or display data output that includes image data of the second three-dimensional packaging wireframe model 106 fitted to the first three-dimensional object 102. The video, image, or display output data provided by the one or more processors 120 may be used by the one or more CPUs 160 to generate one or more video, image, or display outputs on the one or more display devices 156 that includes an image contemporaneously or simultaneously depicting the first three-dimensional object 102 using image data from the camera 152 and the second three-dimensional packaging wireframe model 106 fitted by the one or more processors 120. In some instances, an image concurrently or simultaneously depicting an image of the first three-dimensional object 102 along with the one or more second geometric primitives 104 and the scaled and fitted three-dimensional packaging wireframe model 106 may also be provided on the one or more display devices 156.

Figure 11:
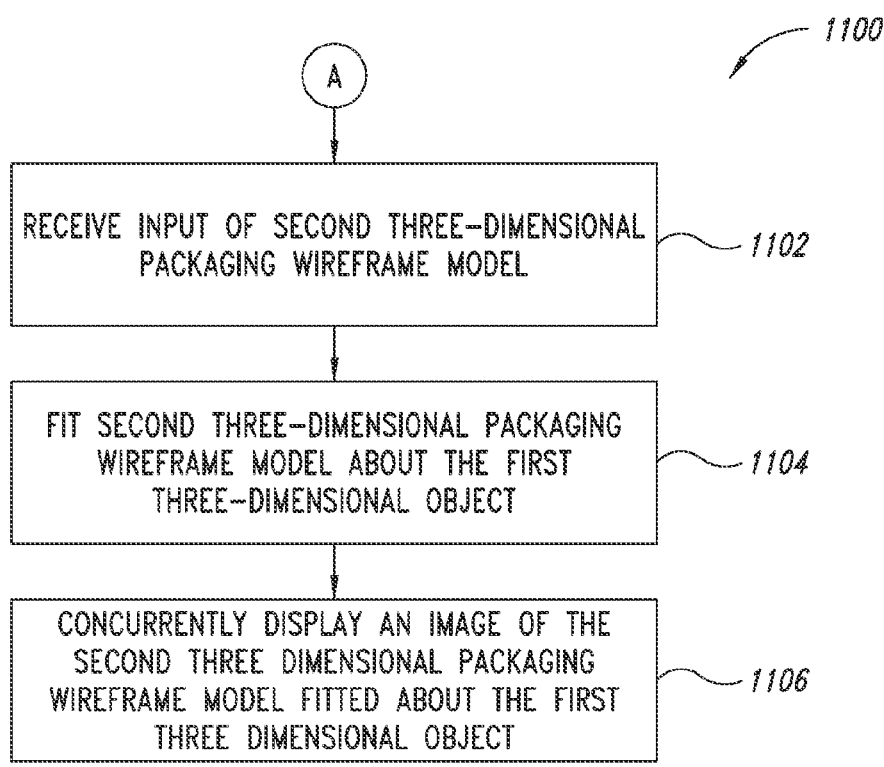
FIG. 11 is an example volume dimensioning method based on the method depicted in FIG. 2 and including receipt of an input selecting a second three-dimensional packaging wireframe model and fitting of the second three-dimensional packaging wireframe model to the first three-dimensional object.

FIG. 11 shows a method 1100 extending from method 200 and describing one or more additional features of an example volume dimensioning system 100, such as the system depicted in FIGS. 1A and 1B. In some instances, the one or more processors 120 may receive as an input a value indicating a selection of a second three-dimensional packaging wireframe model 106 for fitting about the virtual representation of the first three-dimensional object 104. The one or more processors 120 can fit the second three-dimensional packaging wireframe model about the first three-dimensional object 102. Such an input can be useful in expediting the fitting process when the appropriate geometric primitive or second three-dimensional packaging wireframe model is known in advance.

At 1102, the one or more processors 120 receive an input indicative of a selection of a second geometric primitive 104 as representative of the first three-dimensional object 102 or a second three-dimensional packaging wireframe model 106 for fitting about the first three-dimensional object 102. In some instances, the one or more processors 120 receive an input indicative of one or more second geometric primitives 104 that are different from the one or more first geometric primitives 104 used by the one or more processors 120 to fit the first three-dimensional packaging wireframe model 106. The one or more processors 120 may receive the input via an I/O device 166 such as a mouse or keyboard, or in a preferred embodiment via a resistive or capacitive touch-based input device which is part of a touch-screen display device 156 communicably connected to the host computer system 150. In at least some instances, the input is provided by selecting a text or graphic icon corresponding to the second geometric primitive 104 or an icon corresponding to the second three-dimensional packaging wireframe model 106 from a list, menu or selection window containing a plurality of such icons.

At 1104, responsive to the selection of the second geometric primitive 104 or the second three-dimensional packaging wireframe model, the one or more processors 120 can fit the second three-dimensional packaging wireframe model 106 to the first three-dimensional object 102.

At 1106, the one or more processors 120 can generate a video, image, or display data output that includes image data of the second three-dimensional packaging wireframe model 106 fitted to the first three-dimensional object 102. The video, image, or display output data provided by the one or more processors 120 may be used by the one or more CPUs 160 to generate one or more video, image, or display outputs on the one or more display devices 156 that includes an image concurrently or simultaneously depicting the first three-dimensional object 102 using image data from the camera 152 and the second three-dimensional packaging wireframe model 106 fitted by the one or more processors 120. In some instances, an image concurrently or simultaneously depicting an image of the first three-dimensional object 102 along with the one or more geometric primitives 104 and the scaled and fitted three-dimensional packaging wireframe model 106 may also be provided on the one or more display devices 156.

Figure 12:
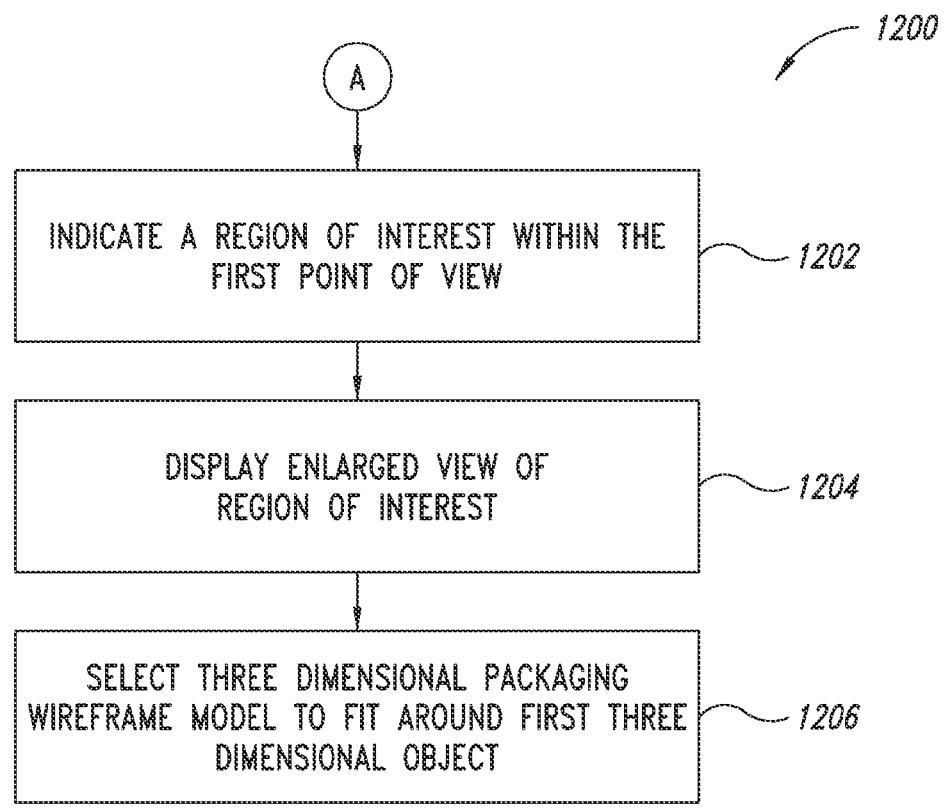
FIG. 12 is an example volume dimensioning method based on the method depicted in FIG. 2 and including receipt of an input indicating a region of interest within the first point of view and the display of an enlarged view of the region of interest.

FIG. 12 shows a method 1200 extending from method 200 and describing one or more additional features of an example volume dimensioning system 100, such as the system depicted in FIGS. 1A and 1B. In some instances, all or a portion of the first three-dimensional object 102 may be too small to easily view within the confines of the one or more display devices 156. The one or more processors 120 may receive an input indicative of a region of interest containing all or a portion of the first three-dimensional object 102. In response to the input, the one or more processors 120 may ascertain whether the first three-dimensional packaging wireframe model 106 included within the indicated region of interest has been properly fitted about the first three-dimensional object 102. Such an input can be useful in increasing the accuracy of the three-dimensional packaging wireframe model 106 fitting process, particularly when all or a portion of the first three-dimensional object 102 is small in size and all or a portion of the fitted first three-dimensional packaging wireframe 106 model is difficult to discern.

At 1202, the one or more processors 120 receive an input indicative of a region of interest lying in the field-of-view 116 of the image sensor 114. The one or more processors 120 may receive the input via an I/O device 166 such as a mouse or keyboard, or in a preferred embodiment via a resistive or capacitive touch-based input device which is part of a touch-screen display device 156 communicably connected to the host computer system 150.

At 1204, responsive to the receipt of the input indicative of a region of interest in the field-of-view 116 of the image sensor 114, the one or more CPUs 160 enlarge the indicated region of interest and output a video, image, or display data output including the enlarged region of interest to the one or more display devices 156 on the host computer system 150. In some situations, the one or more processors 120 may provide the video, image, or display data output including the enlarged region of interest to the one or more display devices 156 on the host computer system 150.

At 1206, the one or more processors 120 automatically select a geometric primitive 104 based upon the features of the first three-dimensional object 102 included in the enlarged region of interest for use in fitting the first three-dimensional packaging wireframe model 106 about all or a portion of the first three-dimensional object 102. Alternatively, the one or more processors 120 may receive an input indicative of a geometric primitive 104 to fit the first three-dimensional packaging wireframe model 106 about all or a portion of the first three-dimensional object 102 depicted in the enlarged region of interest. The one or more processors 120 may receive the input via an I/O device 166 such as a mouse or keyboard, or in a preferred embodiment via a resistive or capacitive touch-based input device which is part of a touch-screen display device 156 communicably connected to the host computer system 150. In at least some instances, the input is provided to the one or more processors 120 by selecting a text or graphic icon corresponding to the geometric primitive from a menu, list or selection window containing a plurality of such icons.

Figure 13:
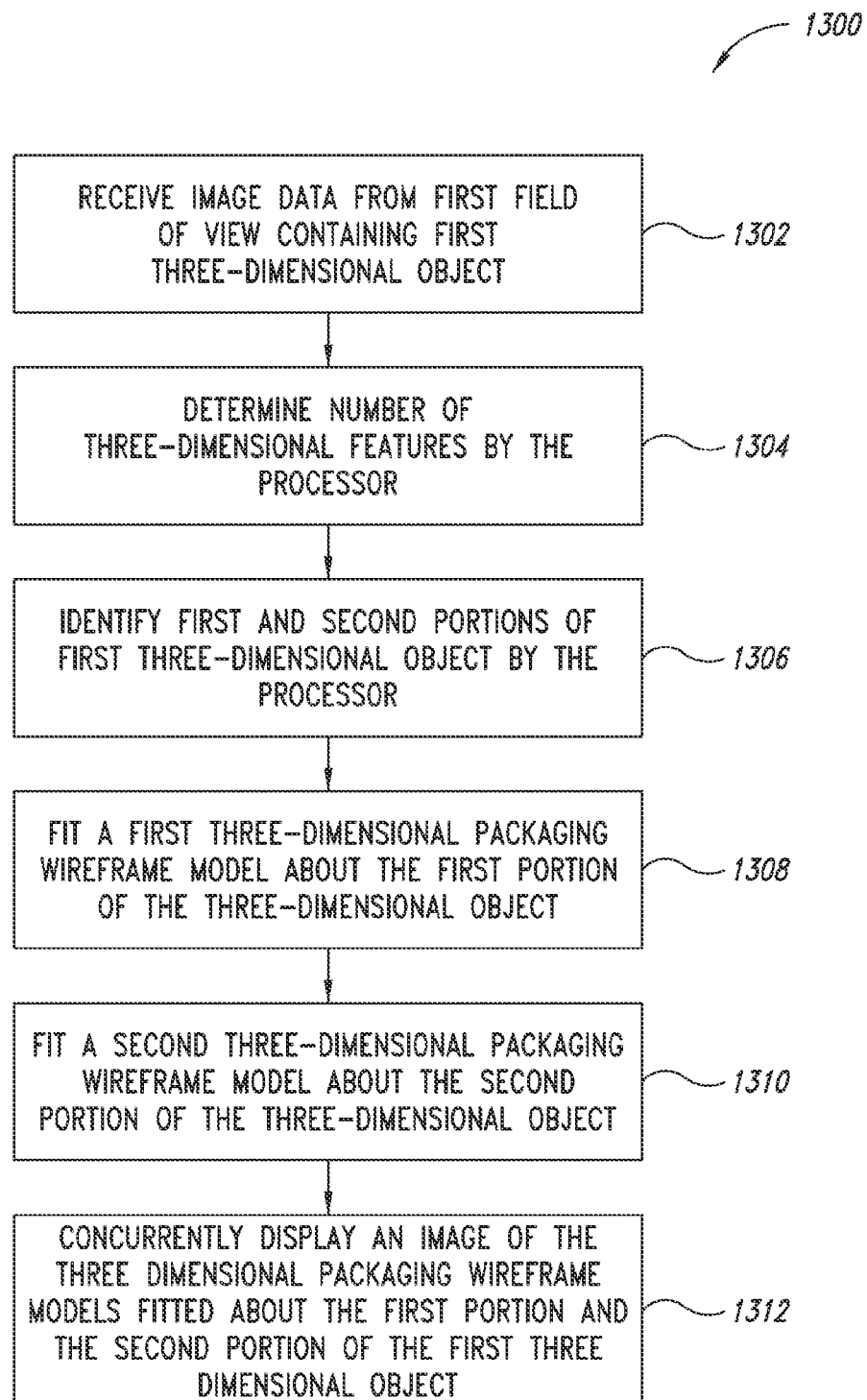
FIG. 13 is an example volume dimensioning method including autonomous identification of first and second portions of a first three-dimensional object and fitting three-dimensional packaging wireframe models about each of the respective first and second portions of the three-dimensional object.

FIG. 13 shows a method 1300 depicting the operation of an example volume dimensioning system 100, such as the system depicted in FIG. 1. In some embodiments, the first three-dimensional object 102 may have a complex or non-uniform shape that is best represented using two or more geometric primitives 104. In such instances, a first geometric primitive 104 may be used by the one or more processors 120 to fit a first three-dimensional packaging wireframe model 106 about a first portion of the first three-dimensional object 102. Similarly, a second geometric primitive 104 may be used by the one or more processors 120 to fit a second three-dimensional packaging wireframe model 106 about a second portion of the first three-dimensional object 102. In at least some embodiments, the first and second geometric primitives 104 may be autonomously selected by the one or more processors 120. Permitting the one or more processors 120 to select two or more geometric primitives 104 and fit a corresponding number of three-dimensional packaging wireframe models 106 about a corresponding number of portions of the three-dimensional object 102 may provide the user with a more accurate estimate of the dimensions or volume of the packaging encompassing the first three-dimensional object 102.

At 1302, the image sensor 114 captures or acquires three-dimensional image data which is communicated to the one or more non-transitory, machine-readable storage media 118 via one or more data busses 126. The three-dimensional image data captured by the image sensor 114 includes a first three-dimensional object 102 disposed within the field-of-view 116 of the image sensor 114. The three-dimensional image data captured by the image sensor 114 may include depth data providing a depth map and intensity data providing an intensity image of the field-of-view 116 of the image sensor 114. At least a portion of the three-dimensional image data received by the one or more non-transitory, machine-readable storage media 118 is communicated to or otherwise accessed by the one or more processors 120 in order to select one or more geometric primitives 104 preparatory to fitting a three-dimensional packaging wireframe model 106 about all or a portion of the first three-dimensional object 104.

At 1304, based in whole or in part on the three-dimensional image data received from the image sensor 114, the one or more processors 120 determine a number of features on the first three-dimensional object 102 that appear in the three-dimensional image data. The features may include any point, edge, or other discernible structure on the first three-dimensional object 102 and detectible in the image represented by the three-dimensional image data. For example, one or more features may correspond to a three-dimensional point on the three-dimensional object 102 that is detectible in a depth map containing the first three-dimensional object, an intensity image in which the three-dimensional object, or both a depth map and an intensity image in which the first three-dimensional object 102 appears as is represented. The identified features may include boundaries or defining edges of the first three-dimensional object, for example corners, arcs, lines, edges, angles, radii, and similar characteristics that define all or a portion of the external boundary of the first three-dimensional object 102.

At 1306, based at least in part on the features identified in 1304, the one or more processors 120 select one or more geometric primitives 104 having the same or differing shapes to encompass substantially all of the identified features of the first three-dimensional object 102. Dependent upon the overall number, arrangement, and complexity of the one or more selected geometric primitives 104, the one or more processors 120 may autonomously determine that a plurality of three-dimensional packaging wireframe models 106 are useful in fitting an overall three-dimensional packaging wireframe model 106 to the relatively complex three-dimensional object 102. The one or more processors 120 may determine that a first three-dimensional packaging wireframe model 106 can be fitted to a first portion of the first three-dimensional object 102 and a second three-dimensional packaging wireframe model 106 can be fitted to a second portion of the first three-dimensional object 102.

At 1308, the one or more processors 120 scale and fit the first three-dimensional packaging wireframe model 106 to the one or more geometric primitives 104 encompassing the first portion of the first three-dimensional object 102. The scaled and fitted first three-dimensional packaging wireframe model 106 encompasses substantially all the first portion of the first three-dimensional object 102.

At 1310 the one or more processors 120 fit the second three-dimensional packaging wireframe model 106 to the one or more geometric primitives 104 encompassing the second portion of the first three-dimensional object 102. The scaled and fitted second three-dimensional packaging wireframe model 106 encompasses substantially all the second portion of the first three-dimensional object 102.

At 1312, the one or more processors 120 can generate a video, image, or display data output that includes image data of the first and second three-dimensional packaging wireframe models 106 as fitted to the first and second portions of the first three-dimensional object 102, respectively. The video, image, or display output data provided by the one or more processors 120 may be used by the one or more CPUs 160 to generate one or more video, image, or display outputs viewable on the one or more display devices 156 that includes an image simultaneously or contemporaneously depicting the first and second portions of the first three-dimensional object 102 using image data from the camera 152 and the respective first and second three-dimensional packaging wireframe models 106 fitted to each of the first and second portions by the one or more processors 120. In some instances, an image concurrently or simultaneously depicting an image of the first and second portions of the first three-dimensional object 102 along with the one or more respective first and second geometric primitives 104 and the respective scaled and fitted first and second three-dimensional packaging wireframe models 106 may also be provided on the one or more display devices 156.

Figure 14:
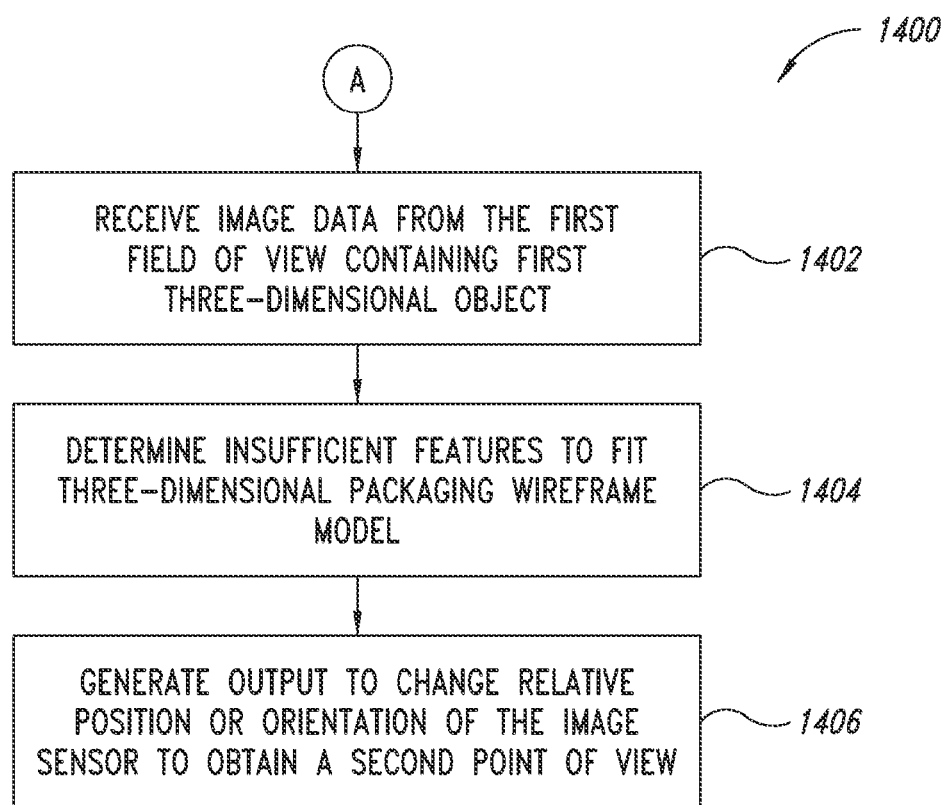
FIG. 14 is an example volume dimensioning method including the determination that an insufficient number of three-dimensional features are visible within the first point of view to permit the fitting of a first three-dimensional packaging wireframe model about the three-dimensional object.

FIG. 14 shows a method 1400 depicting the operation of an example volume dimensioning system 100, such as the system depicted in FIG. 1. In some embodiments, the initial or first point of view of the image sensor 114 may not provide sufficient feature data to the one or more processors 120 to determine the extent, scope or boundary of the first three-dimensional object 102. For example, if the first three-dimensional object 102 is a cubic box and only the two-dimensional front surface of the cubic box is visible to the image sensor 114, the image data provided by the image sensor 114 to the one or more processors 120 is insufficient to determine the depth (i.e., the extent) of the cubic box, and therefore the one or more processors 120 do not have sufficient data regarding the features of the three-dimensional object 102 to select one or more geometric primitives 104 as representative of the first three-dimensional object 102. In such instances, it is necessary to provide the one or more processors 120 with additional data gathered from at least a second point of view to enable selection of one or more appropriate geometric primitives 104 for fitting a first three-dimensional packaging wireframe model 106 that encompasses the first three-dimensional object 102.

At 1402, the image sensor 114 captures or acquires three-dimensional image data which is communicated to the one or more non-transitory, machine-readable storage media 118 via one or more data busses 126. The three-dimensional image data captured by the image sensor 114 includes a first three-dimensional object 102 disposed within the field-of-view 116 of the image sensor 114. The three-dimensional image data captured by the image sensor 114 may include depth data providing a depth map and intensity data providing an intensity image of the field-of-view of the image sensor 114. At least a portion of the three-dimensional image data received by the one or more non-transitory, machine-readable storage media 118 is communicated to or otherwise accessed by the one or more processors 120 in order to select one or more geometric primitives 104 to fit a three-dimensional packaging wireframe model 106 that encompasses the first three-dimensional object 102.

At 1404, based on the image data received from the image sensor 114, the one or more processors 120 determine that an insufficient number of features on the first three-dimensional object 102 are present within the first point of view of the image sensor 114 to permit the selection of one or more geometric primitives 104 to fit the first three-dimensional packaging wireframe model 106.

At 1406, responsive to the determination that an insufficient number of features are present within the first point of view of the image sensor 114, the one or more processors 120 generates an output indicative of the lack of an adequate number of features within the first point of view of the image sensor 114. In some instances, the output provided by the one or more processors 120 can indicate a possible second point of view able to provide a view of a sufficient number of additional features on the first three-dimensional object 102 to permit the selection of one or more appropriate geometric primitives representative of the first three-dimensional object 102.

In some situations, the output generated by the one or more processors 120 may cause a second image sensor positioned remote from the image sensor 114 to transmit image data from a second point of view to the one or more non-transitory, machine-readable storage media 118. In some instances the second image sensor can transmit depth data related to a depth map of first three-dimensional object 102 from the second point of view or intensity data related to an intensity image of the first three-dimensional object 102 from the second point of view. The image data provided by the second image sensor is used by the one or more processors 120 in identifying additional features on the first three-dimensional object 102 that are helpful in selecting one or more appropriate geometric primitives representative of the first three-dimensional object 102.

In some situations, the output generated by the one or more processors 120 may include audio, visual, or audio/visual indicator data used by the host computer 150 to generate an audio output via one or more I/O devices 166 or to generate a visual output on the one or more display devices 156 that designate a direction of movement of the image sensor 114 or a direction of movement of the first three-dimensional object 102 that will permit the image sensor 114 to obtain a second point of view of the first three-dimensional object 102. The image data provided by the image sensor 114 from the second point of view is used by the one or more processors 120 in identifying additional features on the first three-dimensional object 102 that are helpful in selecting one or more appropriate geometric primitives representative of the first three-dimensional object 102.

Figure 15:
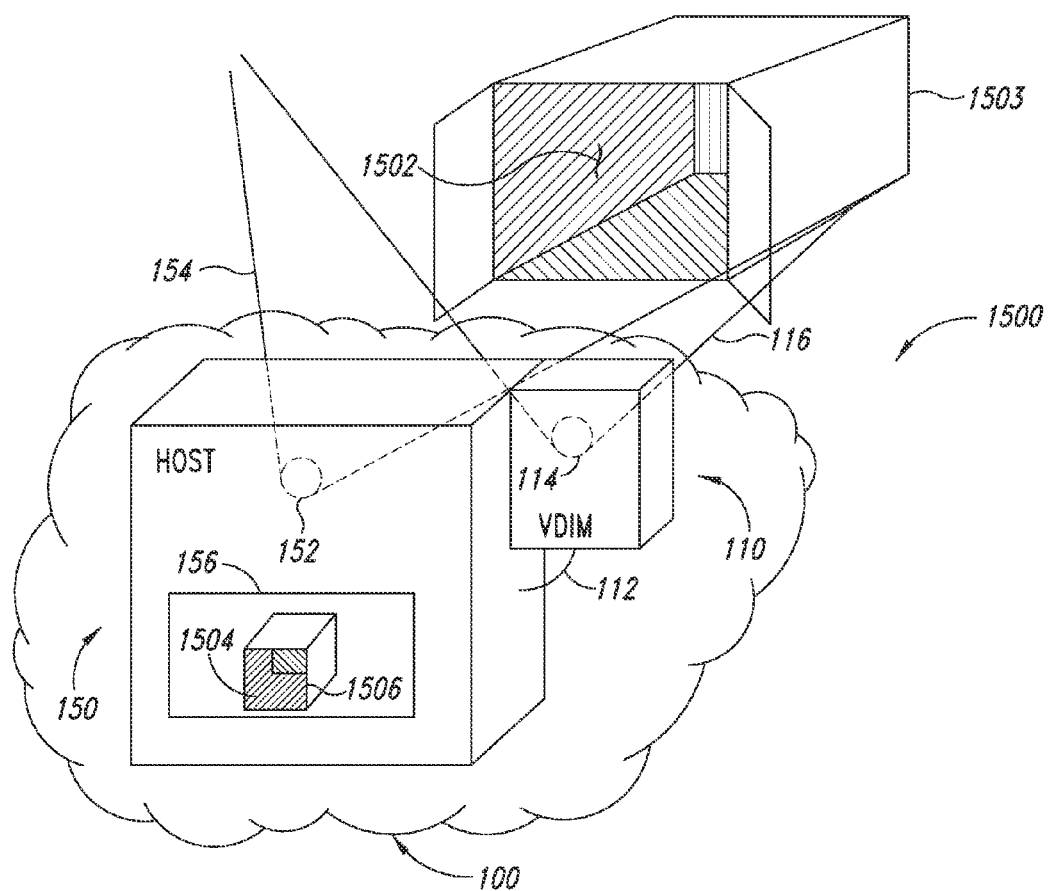
FIG. 15 is a schematic diagram of an example volume dimensioning system coupled to a host computer, with a three-dimensional void disposed within the field-of-view of the host system camera and the field-of-view of the volume dimensioning system image sensor.

FIG. 15 depicts an illustrative volume dimensioning system 110 communicably coupled to a host computer 150 via one or more busses 112. The volume dimensioning system 110 is equipped with an image sensor 114 having a field-of-view 116. The host computer 150 is equipped with a camera 152 having a field-of-view 154 and a display device 156.

An interior space of a partially or completely empty container or trailer 1503 is depicted as forming a three-dimensional void 1502 falling within the field-of-view 116 of the image sensor 114 and the field-of-view 154 of the camera 152. An image of the three-dimensional void is depicted as an image on the one or more display devices 156. The one or more processors 120 can select one or more geometric primitives 1504 corresponding to the first three-dimensional void 1502 preparatory to scaling and fitting a three-dimensional receiving wireframe 1506 within the first three-dimensional void 1502. The scaled and fitted three-dimensional receiving wireframe model 1506 is depicted within the three-dimensional void 1502. In some embodiments, the scaled and fitted three-dimensional receiving wireframe model 1506 may be shown in a contrasting or bright color on the one or more display devices 156.

The scaled, fitted three-dimensional receiving wireframe model 1506 may be generated by the host computer 150 or, more preferably may be generated by the volume dimensioning system 110. The image on the display device 156 is a provided in part using the image data acquired by the camera 152 coupled to the host computer system 150 which provides an image of the three-dimensional void 1502, and in part using the scaled and fitted three-dimensional receiving wireframe model 1506 provided by the volume dimensioning system 110. Data, including visible image data provided by the camera 152 and depth map data and intensity image data provided by the image sensor 114 is exchanged between the host computer 150 and the volume dimensioning system 110 via the one or more busses 112. In some instances, the volume dimensioning system 110 and the host computer system 150 may be partially or completely incorporated within the same housing, for example a handheld computing device or a self service kiosk.

Figure 16:
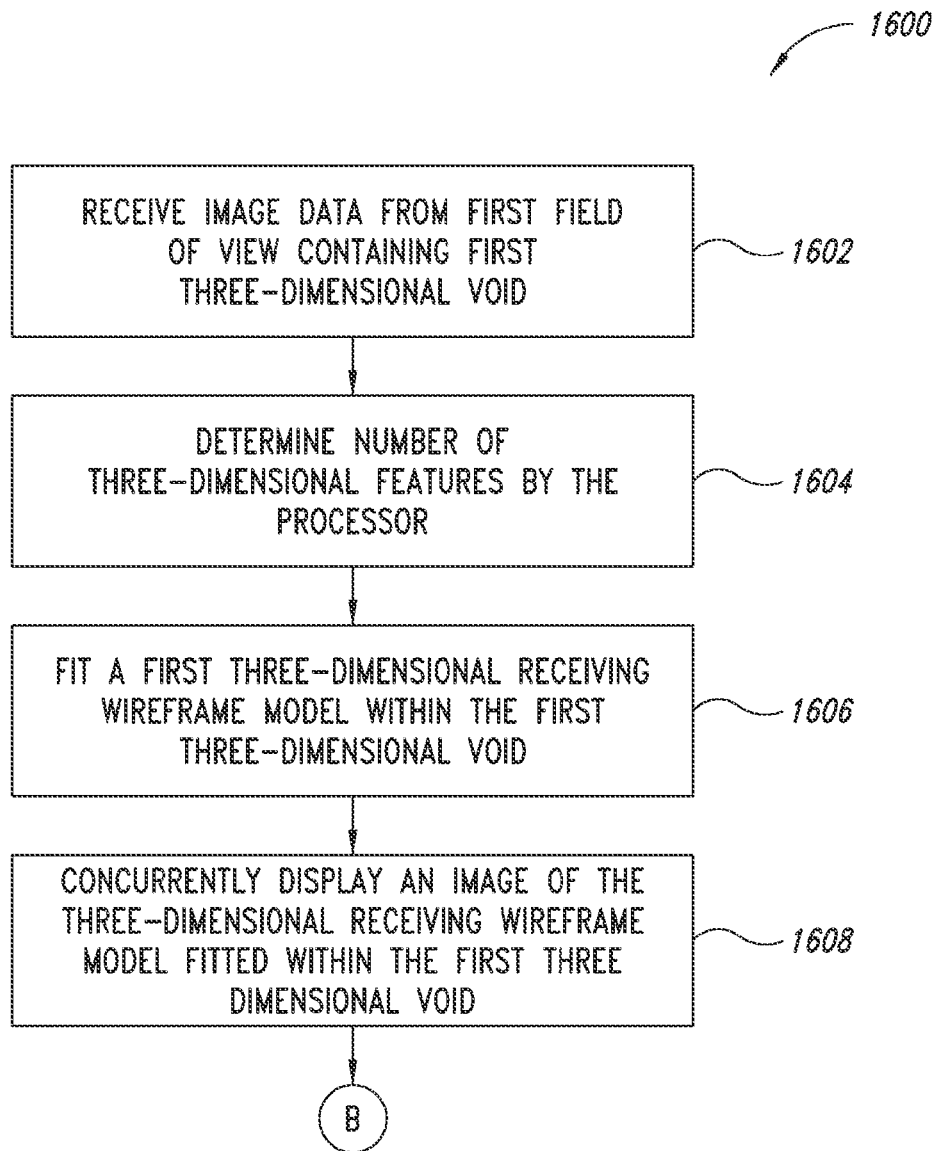
FIG. 16 is an example volume dimensioning method including the fitting of a first three-dimensional receiving wireframe model within a first three-dimensional void, for example an empty container to receive one or more three-dimensional objects.

FIG. 16 shows a method 1600 depicting the operation of an example volume dimensioning system 1500, such as the system depicted in FIG. 15. In some instances, the first three-dimensional object 102 cannot be constructed based upon the presence of a physical, three-dimensional object, and is instead represented by the absence of one or more physical objects, or alternatively as a three-dimensional void 1502. Such an instance can occur, for example, when the system 100 is used to determine the available dimensions or volume remaining within an empty or partially empty shipping container, trailer, box, receptacle, or the like. For a carrier, the ability to determine with a reasonable degree of accuracy the available dimensions or volume within a particular three-dimensional void 1502 provides the ability to optimize the placement of packaged physical three-dimensional objects 102 within the three-dimensional void 1502. Advantageously, when the dimensions or volumes of the packaged three-dimensional objects 102 intended for placement within the three-dimensional void 1502 are known, for example when a volume dimensioning system 100 as depicted in FIG. 1 has been used to determine the dimensions or volume of the three-dimensional packaging wireframe models 106 corresponding to packaged three-dimensional objects 102, the ability to determine the dimensions or volume available within a three-dimensional void 1502 can assist in optimizing the load pattern of the three-dimensional objects 102 within the three-dimensional void 1502.

At 1602, the image sensor 114 captures or acquires three-dimensional image data of a first three-dimensional void 1502 within the field-of-view of 116 of the image sensor 114. Image data captured or acquired by the image sensor 114 is communicated to the one or more non-transitory, machine-readable storage media 118 via one or more data busses 126. The three-dimensional image data captured by the image sensor 114 includes a first three-dimensional void 1502 disposed within the field-of-view 116 of the image sensor 114. The three-dimensional image data captured by the image sensor 114 may include depth data providing a depth map and intensity data providing an intensity image of the field-of-view of the image sensor 114. At least a portion of the three-dimensional image data received by the one or more non-transitory, machine-readable storage media 118 is communicated to or otherwise accessed by the one or more processors 120 in order to select one or more geometric primitives 1504 preparatory to fitting a first three-dimensional receiving wireframe model 1506 within all or a portion of the first three-dimensional void 1502.

At 1604, based in whole or in part on the image data captured by the image sensor 114, stored in the one or more non-transitory, machine-readable storage media 118, and communicated to the one or more processors 120, the one or more processors 120 determine a number of features related to or associated with the first three-dimensional void 1502 present in the image data received by the one or more processors 120. The features may include any point on the first three-dimensional void 1502 detectible in the image data provided by the image sensor 114. For example, one or more features may correspond to a point on the first three-dimensional void 1502 that is detectible in a depth map containing the first three-dimensional void 1502, an intensity image containing the three-dimensional void 1502, or both a depth map and an intensity image containing the first three-dimensional void 1502. The identified features include boundaries or defining edges of the first three-dimensional void 1502, for example corners, arcs, lines, edges, angles, radii, and similar characteristics that define all or a portion of one or more boundaries defining the first three-dimensional void 1502.

At 1606, based at least in part on the features identified in 1604, the one or more processors 120 select one or more geometric primitives 1504 and fit the selected geometric primitives 1504 within substantially all of the features identified by the one or more processors 120 as defining all or a portion of one or more boundaries of the first three-dimensional void 1502. The one or more selected geometric primitives 1504 are used by the one or more processors 120 to fit a three-dimensional receiving wireframe model 1506 within all or a portion of the first three-dimensional void 1502.

After fitting the first three-dimensional receiving wireframe model 1506 within the three-dimensional void 1502, the one or more processors 120 determine, based on the first three-dimensional receiving wireframe model 1506, the available dimensions or volume within the first three-dimensional void 1502.

At 1608, the one or more processors 120 can generate a video, image, or display data output that includes image data of the first three-dimensional receiving wireframe model 1506 as fitted to the first three-dimensional void 1502. The video, image, or display output data provided by the one or more processors 120 may be used by the one or more CPUs 160 to generate one or more video, image, or display outputs on the one or more display devices 156 including an image concurrently or simultaneously depicting the first three-dimensional void 1502 using image data from the camera 152 and the first three-dimensional receiving wireframe model 1506 fitted therein by the one or more processors 120. In some instances, an image concurrently or simultaneously depicting an image of the first three-dimensional void 1502 along with the one or more geometric primitives 1504 and the scaled and fitted three-dimensional packaging wireframe model 1506 may also be provided on the one or more display devices 156.

Figure 17:
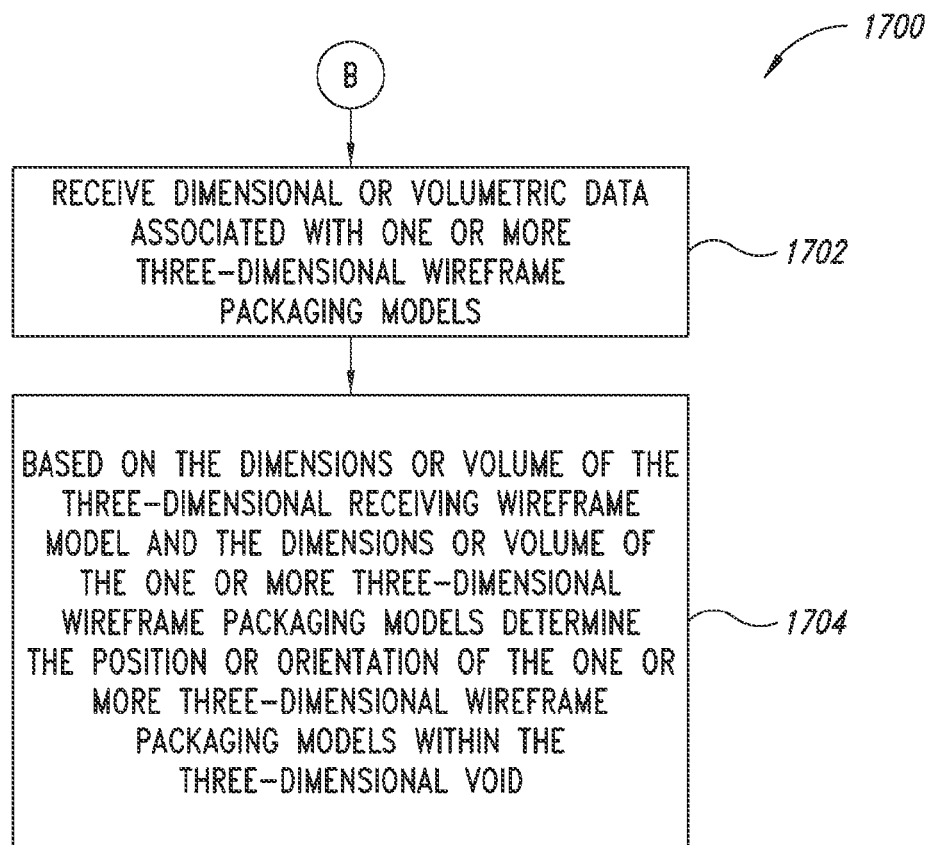
FIG. 17 is an example volume dimensioning method based on the method depicted in FIG. 15 and including the receipt of dimensional or volumetric data associated with one or more three-dimensional packaging wireframe models and the determining of positions or orientations of the one or more three-dimensional packaging wireframe models within the three-dimensional void.

FIG. 17 shows a method 1700 extending from logic flow diagram 1600 and describing one or more additional features of an example volume dimensioning system 1500, such as the system depicted in FIG. 15. The one or more processors 120 fit the first three-dimensional receiving wireframe model 1506 within the first three-dimensional void 1502 and determine the dimensions or volume available within the first three-dimensional void 1502. In some instances, the one or more processors 120 can receive data, for example via the host computer 150 that includes volumetric or dimensional data associated with one or more three-dimensional objects 102.

For example, where the first three-dimensional void 1502 corresponds to the available volume in a shipping container 1503 destined for Seattle, the one or more processors 120 may receive volumetric or dimensional data associated with a number of three-dimensional objects 102 for shipment to Seattle using the shipping container 1503. Using the dimensions or volume of the first three-dimensional void 1502, the dimensions of each of the number of three-dimensional objects 102, and any specialized handling instructions (e.g., fragile objects, fragile surfaces, top-load only, etc), the one or more processors 120 can calculate a load pattern including each of the number of three-dimensional objects 102 that accommodates any user specified specialized shipping requirements and also specifies the placement or orientation of each of the number of three-dimensional objects 102 within the three-dimensional void 1502 such that the use of the available volume within the container 1503 is optimized.

At 1702, the one or more processors 120 can receive an input, for example via the host computer system 150, that contains dimensional or volumetric data associated with each of a number of three-dimensional objects 102 that are intended for placement within the first three-dimensional void 1502. In some instances, at least a portion of the dimensional or volumetric data associated with each of a number of three-dimensional objects 102 can be provided by the volume dimensioning system 100. In other instances, at least a portion of the dimensional or volumetric data provided to the one or more processors 120 can be based on three-dimensional packaging wireframe models 106 fitted to each of the three-dimensional objects 102. In some instances, the dimensional or volumetric data associated with a particular three-dimensional object 102 can include one or more user-supplied specialized shipping requirements (e.g., fragile surfaces, top-load items, "this side up" designation, etc.).

At 1704, based in whole or in part upon the received dimensional or volumetric data, the one or more processors 120 can determine the position or orientation for each of the number of three-dimensional objects 102 within the first three-dimensional void 1502. The position or location of each of the number of three-dimensional objects 102 can take into account the dimensions of the object, the volume of the object, any specialized shipping requirements associated with the object, and the available dimensions or volume within the first three-dimensional void 1502. In some instances, the volume dimensioning system 1500 can position or orient the number of three-dimensional objects 102 within the first three-dimensional void 1502 to minimize empty space within the three-dimensional void 1502.

The one or more processors 120 can generate a video, image, or display data output that includes the three-dimensional packaging wireframes 106 fitted to each of the three-dimensional objects 102 intended for placement within the three-dimensional void 1502. The three-dimensional packaging wireframes 106 associated with some or all of the number of three-dimensional objects 102 may be depicted on the one or more display devices 156 in their final positions and orientations within the three-dimensional receiving wireframe 1506. The video, image, or display output data provided by the one or more processors 120 may be used by the one or more CPUs 160 to generate one or more video, image, or display outputs on the one or more display devices 156 that includes an image concurrently or simultaneously depicting the first three-dimensional void 1502 and all or a portion of the three-dimensional packaging wireframe models 106 fitted within the three-dimensional void 1502 by the one or more processors 120.

Figure 18:
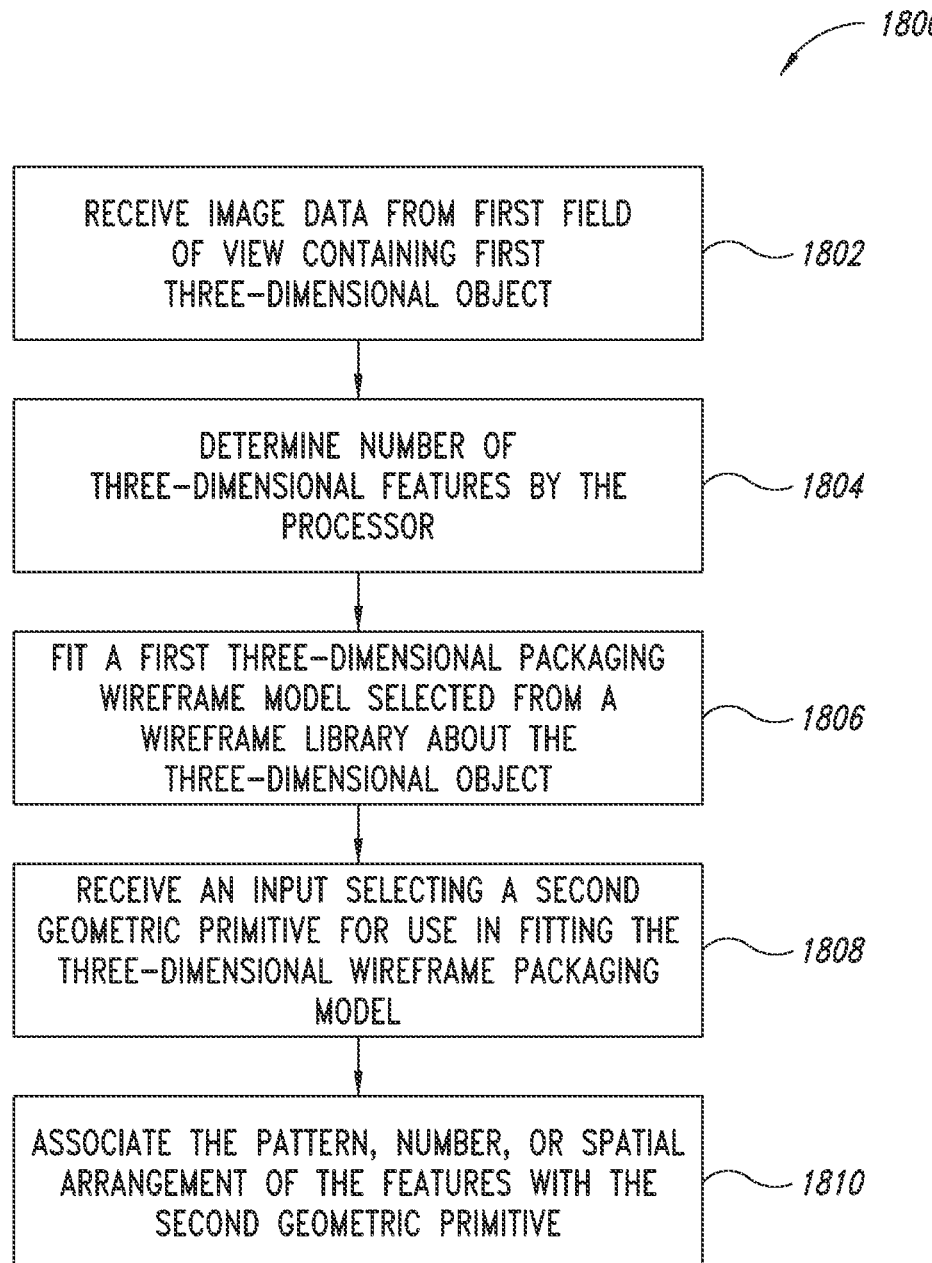
FIG. 18 is an example volume dimensioning method including the selection of a first geometric primitive based on a pattern of feature points, the rejection of the first three-dimensional packaging wireframe model, the selection of a second geometric primitive based on the pattern of feature points, and the future selection of the second geometric primitive for a similar pattern of feature points.

FIG. 18 shows a method 1800 depicting the operation of an example volume dimensioning system 100, such as the system depicted in FIG. 1. Recall that in certain instances, a user may provide an input to the volume dimensioning system resulting in the changing of one or more three-dimensional packaging wireframe models 106 fitted to the three-dimensional object 102. In other instances, a user can provide a recommended geometric primitive 104 for use by the one or more processors 120 in fitting a three-dimensional packaging wireframe model 106 about the three-dimensional object 102. In other instances, a user may provide an input to the volume dimensioning system 100 indicating a single three-dimensional object 102 can be broken into a plurality of portions, each of the portions represented by a different geometric primitive 104 and fitted by the one or more processors 120 with a different three-dimensional packaging wireframe model 106.

Over time, the volume dimensioning system 110 may "learn" to automatically perform one or more functions that previously required initiation based on a user input. In one instance, a first three-dimensional object 102 provides a particular pattern of feature points to the one or more processors 120 and a user provides an input selecting a particular geometric primitive 104 for use by the one or more processors 120 in fitting a three-dimensional packaging wireframe model 106 to the three-dimensional object 102. If, in the future, a three-dimensional object 102 provides a similar pattern of feature points, the one or more processors 120 may autonomously select the geometric primitive 104 previously selected by the user for fitting a three-dimensional packaging wireframe model 106 about the three-dimensional object 102.

In another instance, a first three-dimensional object 102 provides a particular pattern of feature points to the one or more processors 120 and a user indicates to the one or more processors 120 that the first three-dimensional object 102 should be apportioned into first and second portions about which respective first and second three-dimensional packaging wireframe models 106 can be fitted. If, in the future, a three-dimensional object 102 provides a similar pattern of feature points, the one or more processors 120 may autonomously apportion the three-dimensional object 102 into multiple portions based on the apportioning provided by the former user.

At 1802 the image sensor 114 captures or acquires three-dimensional image data which is communicated to the one or more non-transitory, machine-readable storage media 118 via one or more data busses 126. The three-dimensional image data captured by the image sensor 114 includes a first three-dimensional object 102 disposed within the field-of-view of the image sensor 114. The three-dimensional image data captured by the image sensor 114 may include depth data providing a depth map and intensity data providing an intensity image of the field-of-view of the image sensor 114. At least a portion of the three-dimensional image data received by the one or more non-transitory, machine-readable storage media 118 is communicated to or otherwise accessed by the one or more processors 120 in order to select one or more geometric primitives 104 for use in fitting a three-dimensional packaging wireframe model 106 encompassing all or a portion of the three-dimensional object 102.

At 1804, based in whole or in part on the three-dimensional image data received from the image sensor 114, the one or more processors 120 determine a number of features on the first three-dimensional object 102 appearing in the three-dimensional image data. The features may include any point, edge, face, surface, or other discernible structure on the first three-dimensional object 102 and detectible in the image represented by the three-dimensional image data. For example, one or more features may correspond to a three-dimensional point on the three-dimensional object 102 that is detectible in a depth map containing the first three-dimensional object, an intensity image in which the three-dimensional object, or both a depth map and an intensity image in which the first three-dimensional object 102 appears as is represented. The identified features may include boundaries or defining edges of the first three-dimensional object, for example corners, arcs, lines, edges, angles, radii, and similar characteristics that define all or a portion of the external boundary of the first three-dimensional object 102.

At 1806, based at least in part on the features identified in 1804, the one or more processors 120 select one or more geometric primitives 104 from the library. The one or more processors 120 use the selected one or more geometric primitives 104 in constructing a three-dimensional packaging wireframe model 106 that encompasses all or a portion of the first three-dimensional object 102. The three-dimensional packaging wireframe model 106 encompasses substantially all of the features identified in 1804 as defining all or a portion of the first three-dimensional object 102.

Based at least in part on the identified features, the one or more processors 120 may search the library for one or more geometric primitives 104 having features, points, or nodes substantially similar to the spatial arrangement of the identified features, points, or nodes associated with the first three-dimensional object 102. In searching the library, the one or more processors may use one or more appearance-based or feature-based shape recognition or shape selection methods. For example a large modelbases appearance-based method using eigenfaces may be used to select geometric primitives 104 appropriate for fitting to the first three-dimensional object 102.

At 1808 the one or more processors 120 receives an input indicative of a rejection of the first three-dimensional packaging wireframe model 106 fitted by the one or more processors 120 about the first three-dimensional object 102. The one or more processors 120 may receive the input via an I/O device 166 such as a mouse or keyboard, or in a preferred embodiment via a resistive or capacitive touch-based input device which is part of a touch-screen display device 156 communicably connected to the host computer system 150. Responsive to the receipt of the rejection of the first three-dimensional packaging wireframe model 106 fitted about the first three-dimensional object 102, the one or more processors 120 select a second geometric primitive 104 and, based on the second selected geometric primitive 104, fit a second three-dimensional packaging wireframe model 106 about the first three-dimensional object 102.

At 1810 the one or more processors 120 can associate the number, pattern, or spatial relationship of the features identified in 1804 with the second geometric primitive 104 selected by the one or more processors. If, in the future, the one or more processors 120 identify a similar number, pattern, or spatial relationship of the features, the one or more processors 120 can autonomously select the second geometric primitive 104 for use in constructing the first three-dimensional packaging wireframe model 106 about the first three-dimensional object 102.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs) or programmable gate arrays. However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Various methods and/or algorithms have been described. Some or all of those methods and/or algorithms may omit some of the described acts or steps, include additional acts or steps, combine acts or steps, and/or may perform some acts or steps in a different order than described. Some of the method or algorithms may be implemented in software routines. Some of the software routines may be called from other software routines. Software routines may execute sequentially or concurrently, and may employ a multi-threaded approach.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of nontransitory signal bearing media include, but are not limited to, the following: recordable type media such as portable disks and memory, hard disk drives, CD/DVD ROMs, digital tape, computer memory, and other non-transitory computer-readable storage media.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operation of a volume dimensioning system, the method comprising:

receiving, from at least one image sensor, image data, depth map data, and intensity image data of an area from a first point of view by at least one non-transitory processor-readable medium, the area including at least a first three-dimensional object to be dimensioned and a first three-dimensional void, wherein the first three-dimensional void is a visible interior space of a partially or completely empty container;

determining, in three dimensional space, from the received image data, depth map data, and intensity image data a number of features in three dimensions of the first three-dimensional object and the first three-dimensional void by at least one processor communicatively coupled to the at least one non-transitory processor-readable medium;

based at least in part on the features of the first three-dimensional void, fitting a first three-dimensional receiving wireframe model within the first three-dimensional void by the at least one processor;

receiving at least one user input via at least one user interface, the user input indicative of a geometric primitive of the first three-dimensional object;

based at least in part on the user input and the features of the first three-dimensional object, fitting a first three-dimensional packaging wireframe model about the first three-dimensional object by the at least one processor;

determining, in three dimensional space, at least one of an available receiving dimension and an available receiving volume encompassed by the first three dimensional receiving wireframe model;

determining, in three dimensional space, a number of corresponding dimensions of the first three-dimensional object based upon the first three-dimensional packaging wireframe model fitted to the first three-dimensional object, by the at least one processor;

based at least in part on the corresponding dimensions of the first three-dimensional object, specialized shipping requirements associated with the three-dimensional object, and the at least one of the available receiving dimension and available receiving volume, determine at least one of a position and an orientation for the three-dimensional object within the first three-dimensional void; and causing a displaying of an image of the first three-dimensional packaging wireframe model fitted about an image of the first three-dimensional object and within the first three-dimensional void on a display.

2. The method of claim 1, further comprising:
receiving at least one additional user input via the at least one user interface, the additional user input indicative of a change in a position of at least a portion of the displayed image of the first three-dimensional packaging wireframe model relative to the displayed image of the first three-dimensional object; and causing a displaying of an updated image of the first three-dimensional packaging wireframe model fitted about the image of the first three-dimensional object on the display.

3. The method of claim 1, further comprising:
receiving at least one additional user input via the at least one user interface, the user input indicative of a change in a position of at least a portion of the displayed image of the three-dimensional packaging wireframe model relative to the displayed image of the first three-dimensional object;

based at least in part on the received additional user input, fitting a second three-dimensional packaging wireframe model about the first three-dimensional object by the at least one processor, the second three-dimensional packaging wireframe model having a different geometrical shape than the first three-dimensional wireframe model; and causing a displaying of an image of the second three-dimensional packaging wireframe model fitted about the image of the first three-dimensional object on the display.

4. The method of claim 1, further comprising:
receiving at least one additional user input via the at least one user interface, the user input indicative of an identification of a second three-dimensional object, the second three-dimensional object different from the first three-dimensional object;

based at least in part on the received additional user input, fitting a second three-dimensional packaging wireframe model about the second three-dimensional object by the at least one processor; and causing a displaying of an image of the second three-dimensional packaging wireframe model fitted about the image of the second three-dimensional object on the display.

5. The method of claim 4 wherein the at least one processor causes the concurrent displaying of the image of the first three-dimensional packaging wireframe model fitted about the image of the first three-dimensional object on the display and the image of the second three-dimensional packaging wireframe model fitted about the image of the second three-dimensional object on the display.

6. The method of claim 1, further comprising:
receiving at least one additional user input via the at least one user interface user interface, the additional user input indicative of an identification of at least one portion of the first three-dimensional object;

based at least in part on the received additional user input, fitting one three-dimensional packaging wireframe model about a first portion of the first three-dimensional object by the at least one processor;

based at least in part on the received additional user input, fitting one three-dimensional packaging wireframe model about a second portion of the first three-dimensional object by the at least one processor; and causing a concurrent displaying of an image of the three-dimensional wireframe models respectively fitted about the image of the first and the second portions of the first three-dimensional object on the display.

7. The method of claim 1 wherein the at least one processor causes the displaying of the image of the first three-dimensional packaging wireframe model fitted about the image of the first three-dimensional object on the display to rotate about an axis.

8. The method of claim 7, further comprising:
receiving image data of the area from a second point of view by at least one non-transitory processor-readable medium from at least one image sensor, the second point of view different from the first point of view;

determining from the received image data at least one additional feature in three dimensions of the first three-dimensional object by at least one processor;

based on the additional features of the first three-dimensional object, at least one of adjusting the first three-dimensional packaging wireframe model or fitting a second three-dimensional packaging wireframe model about the first three-dimensional object by the at least one processor; and causing a displaying of an image of at least one of the adjusted first three-dimensional packaging wireframe model or the second three-dimensional packaging wireframe model fitted about the image of the first three-dimensional object on the display.

9. The method of claim 1, further comprising:
selecting the first three-dimensional object from a plurality of three-dimensional objects represented in the image data by at least one processor, based at least in part on the user input indicative of the geometric primitive of the first three-dimensional object.

10. The method of claim 9 wherein selecting the first three-dimensional object from a plurality of three-dimensional objects represented in the image data based at least in part on the user input indicative of the geometric primitive of the first three-dimensional object includes determining which of the three-dimensional objects has a geometric primitive that most closely matches the geometric primitive indicated by the received user input.

11. The method of claim 1, further comprising:
receiving at least one additional user input via the at least one user interface, the additional user input indicative of an acceptance of the first three-dimensional packaging wireframe model; and
performing at least a volumetric calculation using a number of dimensions of the selected three-dimensional packaging wireframe model.

12. The method of claim 1, further comprising:
receiving at least one additional user input via the at least one user interface, the additional user input indicative of a rejection of the first three-dimensional packaging wireframe model; and
in response to the received additional user input, fitting a second three-dimensional packaging wireframe model about the first three-dimensional object by the at least one processor, the second three-dimensional packaging wireframe model having a different geometric primitive than the first three-dimensional wireframe model; and
causing a displaying of an image of the second three-dimensional packaging wireframe model fitted about the image of the first three-dimensional object on the display.

13. The method of claim 1, further comprising:
receiving at least one additional user input via the at least one user interface, the additional user input indicative of a second three-dimensional packaging wireframe model, the second three-dimensional packaging wireframe model having a different geometric primitive than the first three-dimensional wireframe model;
in response to the received user input, fitting the second three-dimensional packaging wireframe model about the first three-dimensional object by the at least one processor; and
causing a displaying of an image of the second three-dimensional packaging wireframe model fitted about the image of the first three-dimensional object on the display by the at least one processor.

14. The method of claim 13, further comprising:
causing by the at least one processor a displaying of a plurality of user selectable icons, each corresponding to a respective one of a plurality of three-dimensional packaging wireframe model and selectable by a user to be fitted to the first three-dimensional object.

15. The method of claim 1, further comprising:
receiving at least one additional user input via the at least one user interface, the additional user input indicative of a region of interest of the displayed image of the first three-dimensional object; and
in response to the received additional user input, causing by the at least one processor a displaying of an enlarged image of a portion of the first three-dimensional object corresponding to the region of interest by the display.

16. The method of claim 15, further comprising:
causing by the at least one processor a displaying of a plurality of user selectable icons, each corresponding to a respective one of a plurality of three-dimensional packaging wireframe model and selectable by a user to be fitted to the first three-dimensional object.

17. A volume dimensioning system, comprising:
at least one image sensor communicably coupled to at least one non-transitory processor-readable medium and transmitting image data, depth map data, and intensity image data to said non-transitory processor-readable medium;
at least one processor communicably coupled to the at least one non-transitory processor-readable medium;
a machine executable instruction set stored within at least one non-transitory processor-readable medium, that when executed by the at least one processor causes the at least one processor to:
read image data, depth map data, and intensity image data from the at least one non-transitory processor-readable medium, the image data, depth map data, and intensity image data associated with a first point of view of an area sensed by the at least one image sensor, the area including at least a first three-dimensional object to be dimensioned and a first three-dimensional void, wherein the first three-dimensional void being a visible interior space of a partially or completely empty container;
determine, in three dimensional space, from the received image data, depth map data, and intensity image data a number of features in three dimensions of the first three-dimensional object and the first three-dimensional void;
based at least in part on the determined features of the first three-dimensional void, fit a first three-dimensional receiving wireframe model within the first three-dimensional void by the at least one processor;
based at least in part on the determined features of the first three-dimensional object, and responsive to a user input received by the at least one processor indicative of a geometric primitive of the first three-dimensional object, fit, in three dimensional space, a first three-dimensional packaging wireframe model about the first three-dimensional object;
determine at least one of an available receiving dimension and an available receiving volume encompassed by the first three dimensional receiving wireframe model;
determine volumetric data for the first three-dimensional object based upon the first three-dimensional packaging wireframe model fitted to the first three-dimensional object;
based at least in part on the volumetric data for the three-dimensional object, specialized shipping requirements associated with the three-dimensional object, and the at least one of the available receiving dimension and the available receiving volume, determine at least one of a position and an orientation for the three-dimensional object within the first three-dimensional void; and cause a display of an image of the first three-dimensional packaging wireframe model fitted about an image of the first three-dimensional object and within the first three-dimensional void on a display device.

18. The volume dimensioning system of claim 17 wherein the machine executable instruction set further comprises instructions, that when executed by the at least one processor cause the at least one processor to:

select from a number of defined geometric primitives that define respective volumes and sizing at least one dimension of the selected geometric primitive based on a corresponding dimension of the first three-dimensional object such that the first three-dimensional object is completely encompassed by the selected and sized geometric primitive;

produce a wireframe model of the first three-dimensional object; and cause a concurrent display of the wireframe model of the first three-dimensional object along with the first three-dimensional packaging wireframe model.

19. The volume dimensioning system of claim 17, the machine executable instruction set stored within at least one nontransitory processor-readable medium further comprising instructions, that when executed by the at least one processor cause the at least one processor to:

responsive to a user input received by the at least one processor, change a position of at least a portion of the displayed image of the first three-dimensional packaging wireframe model relative to the displayed image of the first three-dimensional object; and cause a display of an updated image of the first three-dimensional packaging wireframe model fitted about the image of the first three-dimensional object on the display device.

20. The volume dimensioning system of claim 17, the machine executable instruction set stored within at least one nontransitory processor-readable medium further comprising instructions, that when executed by the at least one processor cause the at least one processor to:

responsive to a user input received by the at least one processor, change a position of at least a portion of the displayed image of the first three-dimensional packaging wireframe model relative to the displayed image of the first three-dimensional object;

responsive to a user input received by the at least one processor, fit a second three-dimensional packaging wireframe model about the first three-dimensional object, the second three-dimensional packaging wireframe model having a different geometrical shape than the first three-dimensional wireframe model; and cause a display of an image of the second three-dimensional packaging wireframe model fitted about the image of the first three-dimensional object on the display device.

21. The volume dimensioning system of claim 17, the machine executable instruction set stored within at least one nontransitory processor-readable medium further comprising instructions, that when executed by the at least one processor cause the at least one processor to:

responsive to a user input received by the at least one processor, the user input indicative of an identification of a second three-dimensional object different from the first three-dimensional object, fit a second three-dimensional packaging wireframe model about the second three-dimensional object; and cause a display of an image of the second three-dimensional packaging wireframe model fitted about the image of the second three-dimensional object on the display.

22. The volume dimensioning system of claim 17, the machine executable instruction set stored within at least one nontransitory processor-readable medium further comprising instructions, that when executed by the at least one processor cause the at least one processor to:

responsive to a user input received by the at least one processor, the user input indicative of an identification of at least one portion of the first three-dimensional object, fit a three-dimensional packaging wireframe model about a first portion of the first three-dimensional object;

responsive to a user input received by the at least one processor, the user input indicative of an identification of at least one portion of the first three-dimensional object, fit a three-dimensional packaging wireframe model about a second portion of the first three-dimensional object; and cause a display of an image of the three-dimensional wireframe models fitted about the image of the first and the second portions of the first three-dimensional object on the display device.

23. The volume dimensioning system of claim 17, the machine executable instruction set stored within at least one nontransitory processor-readable medium further comprising instructions, that when executed by the at least one processor cause the at least one processor to:

responsive to a user input received by the at least one processor, the user input indicative of a second three-dimensional packaging wireframe model having a different geometric primitive than the first three-dimensional wireframe model, fit the second three-dimensional packaging wireframe model about the first three-dimensional object by the at least one processor; and cause a display of an image of the second three-dimensional packaging wireframe model fitted about the image of the first three-dimensional object on the display.

24. The volume dimensioning system of claim 17, the machine executable instruction set stored within at least one non-transitory processor-readable medium further comprising instructions, that when executed by the at least one processor cause the at least one processor to:

cause a display of a plurality of user selectable icons on the display device, each user selectable icon corresponding to a respective one of a plurality of three-dimensional packaging wireframe models and selectable by a user to be fitted to the first three-dimensional object.

25. A method of operation of a volume dimensioning system, the method comprising:

receiving image data, depth map data, and intensity image data of an area from a first point of view by at least one non-transitory processor-readable medium from at least one image sensor, the area including at least a first three-dimensional object to be dimensioned and a first three-dimensional void, wherein the first three-dimensional void is a visible interior space of a partially or completely empty container;

determining, in three dimensional space, from the received image data, depth map data, and intensity image data a number of features of the first three-dimensional object and the first three-dimensional void by at least one processor communicatively coupled to the at least one non-transitory processor-readable medium;

based at least in part on the features of the first three-dimensional void, fitting a first three-dimensional receiving wireframe model within the first three-dimensional void by the at least one processor;

based at least in part on the features of the first three-dimensional object, identifying a first portion and at least a second portion of the first three-dimensional object by the at least one processor;

receiving at least one user input via at least one user interface, the user input indicative of at least one geometric primitive of the first three-dimensional object or a portion thereof;

based on the user input and the features of the first three-dimensional object, fitting, in three dimensional space, a first three-dimensional packaging wireframe model about the first portion of the first three-dimensional object by the at least one processor;

based on the user input and the features of the first three-dimensional object, fitting, in three dimensional space, a second three-dimensional packaging wireframe model about the second portion of the first three-dimensional object by the at least one processor;

determining, in three dimensional space, at least one of an available receiving dimension and an available receiving volume encompassed by the first three dimensional receiving wireframe model;

determining, in three dimensional space, a number of corresponding dimensions of the first three-dimensional object based upon the first three-dimensional packaging wireframe model fitted to the first three-dimensional object, by the at least one processor;

based at least in part on the corresponding dimensions of the first three-dimensional object, specialized shipping requirements associated with the three-dimensional object, and the at least one of the available receiving dimension and available receiving volume, determine at least one of a position and an orientation for the three-dimensional object within the first three-dimensional void; and causing a concurrent displaying of an image of the first and the second three-dimensional wireframe models respectively fitted about the image of the first and the second portions of the first three-dimensional object and/or within the first three-dimensional void on a display.

26. The method of claim 25, further comprising:
receiving at least one additional user input via the at least one user interface, the additional user input indicative of a change in a position of at least a portion of the displayed image of at least one of the first three-dimensional packaging wireframe model or the second three-dimensional packaging wireframe model relative to the displayed image of the first and second portions of the first three-dimensional object, respectively; and causing a displaying of an updated image of the first and second three-dimensional packaging wireframe models fitted about the image of the first and second portions of the first three-dimensional object on the display.

27. The method of claim 25, further comprising:
receiving at least one additional user input via the at least one user interface, the user input indicative of a change in a position of at least a portion of the displayed image of at least one of the first three-dimensional packaging wireframe model or the second three-dimensional packaging wireframe model relative to the displayed image of the first three-dimensional object;

based at least in part on the received additional user input, fitting a replacement three-dimensional packaging wireframe model about at least one of the first or second portions of the first three-dimensional object by the at least one processor, the replacement three-dimensional packaging wireframe model having a different geometric primitive than the first or second three-dimensional wireframe model that it replaces; and causing a displaying of an image of at least the replacement three-dimensional packaging wireframe model fitted about the image of the first three-dimensional object on the display.

28. The method of claim 25 wherein the at least one processor causes the displaying of the image of the first and the second three-dimensional packaging wireframe model fitted about the image of the first three-dimensional object on the display to rotate about an axis.

29. The method of claim 28, further comprising:
receiving image data of the area from a second point of view by at least one nontransitory processor-readable medium from at least one image sensor, the second point of view different from the first point of view;

determining from the received image data at least one additional corresponding dimension in three dimensions of the first three-dimensional object by at least one processor;

based on the determined corresponding dimension of the first three-dimensional object, performing at least one of adjusting the first or second three-dimensional packaging wireframe model or fitting a third three-dimensional packaging wireframe model about at least a portion of the first three-dimensional object not discernible from the first point of view by the at least one processor; and causing a displaying of an image of at least one of the adjusted first or second three-dimensional packaging wireframe model or the first, second, and third three-dimensional packaging wireframe models fitted about the image of the first three-dimensional object on the display.

30. The method of claim 25
wherein fitting a second three-dimensional packaging wireframe model about the second portion of the first three-dimensional object by the at least one processor includes:

selecting the second three-dimensional packaging wireframe model from the number of defined geometric primitives that define respective volumes and sizing at least one dimension of the selected geometric primitive based on a corresponding dimension of the second portion of the first three-dimensional object such that the second portion of the first three-dimensional object is completely encompassed by the selected and sized geometric primitive.

31. The method of claim 30, further comprising:
producing a wireframe model of the first three-dimensional object; and causing a concurrently displaying of the wireframe model of the first three-dimensional object along with the first and second three-dimensional packaging wireframe models by the display.

32. The method of claim 25, further comprising:
selecting the first three-dimensional object from a plurality of three-dimensional objects represented in the image data by at least one processor, based at least in part on the user input indicative of the geometric primitive of at least a portion of the first three-dimensional object.

33. The method of claim 32 wherein selecting the first three-dimensional object from a plurality of three-dimensional objects represented in the image data by at least one processor, based at least in part on the user input indicative of the geometric primitive of at least a portion of the first three-dimensional object includes determining which of the three-dimensional objects contains a portion having a geometric primitive that most closely matches the geometric primitive indicated by the received user input.

34. The method of claim 25, further comprising:
receiving at least one additional user input via the at least one user interface, the additional user input indicative of an acceptance of the first three-dimensional packaging wireframe model and the second three-dimensional packaging wireframe model; and
performing at least a volumetric calculation using a number of dimensions of the selected first and second three-dimensional packaging wireframe models.

35. The method of claim 25, further comprising:
receiving at least one additional user input via the at least one user interface, the additional user input indicative of a rejection of at least one of the first three-dimensional packaging wireframe model or the second three-dimensional packaging wireframe model; and
in response to the received additional user input, fitting a replacement three-dimensional packaging wireframe model about the first or second portion of the first three-dimensional object by the at least one processor, the replacement three-dimensional packaging wireframe model having a different geometric primitive than the first or second three-dimensional wireframe model that it replaces; and
causing a displaying of an image of the replacement three-dimensional packaging wireframe model fitted about at least a portion of the image of the first three-dimensional object on the display.

36. The method of claim 25, further comprising:
receiving at least one additional user input via the at least one user interface, the additional user input indicative of a replacement three-dimensional packaging wireframe model, the replacement three-dimensional packaging wireframe model having a different geometric primitive than at least one of the first three-dimensional wireframe model and the second three-dimensional wireframe model;
in response to the received additional user input, fitting the replacement three-dimensional packaging wireframe model about either the first or second portion of the first three-dimensional object by the at least one processor; and
causing a displaying of an image of the replacement three-dimensional packaging wireframe model fitted about the image of the first three-dimensional object on the display by the at least one processor.

37. The method of claim 36, further comprising:
causing by the at least one processor a displaying of a plurality of user selectable options, each user selectable option corresponding to a respective one of a plurality of three-dimensional packaging wireframe model and selectable by a user to be fitted to either the first or second portion of the first three-dimensional object.

38. A volume dimensioning system, comprising:
an image sensor communicably coupled to a nontransitory processor-readable medium;
a processor communicably coupled to the nontransitory processor-readable medium; and
a machine executable instruction set stored within the nontransitory processor-readable medium, that when executed by the processor causes the processor to:
read data comprising image data, depth map data, and intensity image data from the nontransitory processor-readable medium, the data associated with a first point of view of an area sensed by the image sensor, the area including three-dimensional object to be dimensioned and a three-dimensional void, wherein the three dimensional void is a visible interior space of a partially or completely empty container;
determine, in three dimensional space, from the received data a number of features of the three-dimensional object and the three-dimensional void;
based on the features of the three-dimensional object, identify a first portion and a second portion of the first three-dimensional object;
based on the features of the first three-dimensional object, and responsive to a user input received by the processor indicative of at least one geometric primitive of the first three-dimensional object or a portion thereof, fit, in three dimensional space, a first three-dimensional packaging wireframe model about the first portion of the three-dimensional object and
a second three-dimensional packaging wireframe model about the second portion of the first three-dimensional object;
determine at least one of an available receiving dimension and an available receiving volume encompassed by the three dimensional receiving wireframe model;
determine volumetric data for the three-dimensional object based upon the first and second three-dimensional packaging wireframe models fitted to the first three-dimensional object;
based on the volumetric data for the three-dimensional object, specialized shipping requirements associated with the three-dimensional object, and the at least one of the available receiving dimension and the available receiving volume, determine at least one of a position and an orientation for the three-dimensional object within the first three-dimensional void; and
cause a concurrent display of an image of the first and the second three-dimensional wireframe models fitted about the image of the first and the second portions of the first three-dimensional object and within the first three-dimensional void on a display device.

39. The method of claim 38 wherein the first three-dimensional wireframe model is a first geometric primitive; and
wherein the second three-dimensional wireframe model is a second geometric primitive.

* * * * *